(12) United States Patent
Satou et al.

(10) Patent No.: US 6,243,419 B1
(45) Date of Patent: Jun. 5, 2001

(54) SCHEME FOR DETECTING CAPTIONS IN CODED VIDEO DATA WITHOUT DECODING CODED VIDEO DATA

(75) Inventors: Takashi Satou; Yukinobu Taniguchi; Yasuhiro Niikura; Akihito Akutsu; Yoshinobu Tonomura; Hiroshi Hamada, all of Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 08/863,840

(22) Filed: May 27, 1997

(30) Foreign Application Priority Data

| May 27, 1996 | (JP) | P8-131898 |
|---|---|---|
| Oct. 3, 1996 | (JP) | P8-262826 |
| Oct. 4, 1996 | (JP) | P8-264123 |
| Oct. 7, 1996 | (JP) | P8-266019 |

(51) Int. Cl.[7] .................................................. H04B 1/66
(52) U.S. Cl. ....................................................... 375/240.13
(58) Field of Search ........................... 348/415, 416, 348/699, 700, 420, 465, 468, 430, 413, 407, 401.1, 408.1, 461, 564, 384.1; 382/209, 170, 171, 176, 177; 345/328, 443; 375/240.13

(56) References Cited

U.S. PATENT DOCUMENTS

| 5,034,991 | * | 7/1991 | Hagimae et al. | 382/209 |
|---|---|---|---|---|
| 5,121,191 | * | 6/1992 | Cassereau et al. | 348/443 |
| 5,508,754 | * | 4/1996 | Orphan | 348/461 |
| 5,521,841 | * | 5/1996 | Arman et al. | 345/328 |

(List continued on next page.)

FOREIGN PATENT DOCUMENTS

| 92-237284 | 8/1992 | (JP) . |
|---|---|---|
| 96-212231 | 8/1995 | (JP) . |
| 96-331456 | 12/1996 | (JP) . |

OTHER PUBLICATIONS

Article entitled "Automatic Text Recognition in Digital Video", by Lienhart and Stuber, from University of Mannheim, Praktische Informatik IV, 68131 Mannheim, Germany, pp. 1–9.

Article entitled "Video Skimming for Quick Browsing Based on Audio and Image Characterization", by Michael A. Smith and Takeo Kanade, dated Jul. 30, 1995, School of Computer Science, Carnegie Mellon University, Pittsburgh, PA 15213, pp. 1–22.

(List continued on next page.)

*Primary Examiner*—Chris Kelley
*Assistant Examiner*—Gims Philippe
(74) *Attorney, Agent, or Firm*—Banner & Witcoff, Ltd.

(57) ABSTRACT

A video caption detection scheme capable of detecting captions from the coded video data which are coded by using a combination of predictive coding and motion compensation, without requiring the decoding of coded video data into frame images. In this video caption detection scheme, whether each pixel/block in the video data is coded by using inter-frame correlation without using motion compensation or not is judged. Then, a region in the video data at which pixels/blocks that is judged as being coded by using inter-frame correlation without using motion compensation are concentrated time-wise and space-wise, is detected as a caption region. The detection can be realized by counting a frequency of appearance of a pixel/block which is judged as being coded by using inter-frame correlation without using motion compensation, at each pixel/block position of a frame over a prescribed counting period, and then comparing the counted frequency of appearance with a prescribed threshold value.

19 Claims, 48 Drawing Sheets

U.S. PATENT DOCUMENTS

| | | | | |
|---|---|---|---|---|
| 5,583,577 | * | 12/1996 | Tsukagoshi | 348/468 |
| 5,742,352 | * | 4/1998 | Tsukagoshi | 348/468 |
| 5,911,008 | * | 6/1999 | Niikura et al. | 348/384 |
| 5,912,706 | * | 6/1999 | Kikuchi et al. | 348/401 |
| 5,956,088 | * | 9/1999 | Shen et al. | 348/385 |

OTHER PUBLICATIONS

Article entitled "A Magnifier Tool for Video Data", by Mills, et al., Human Interface Group/Advanced Technology Apple Computer, Inc., dated May 3–7, 1992, pp. 93 to 98.

* cited by examiner

FIG. 24
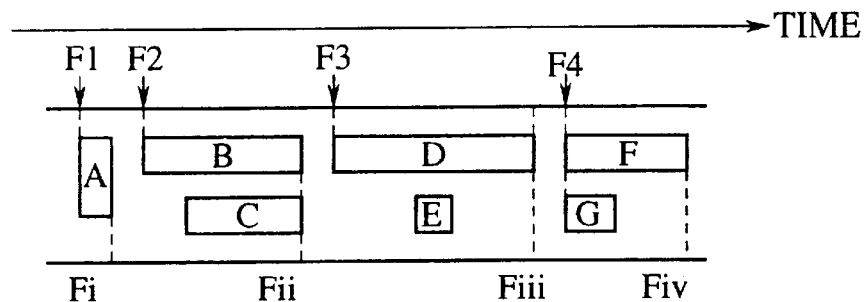
FIG. 25
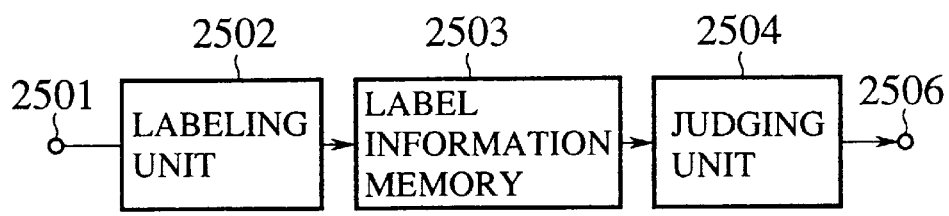
FIG. 26A
| NO. | x | | y | | t | |
|---|---|---|---|---|---|---|
| 1 | $x_0$ | $x_1$ | $y_0$ | $y_1$ | $t_0$ | $t_1$ |
| 2 | | | | | | |
| 3 | | | | | | |
FIG. 26B
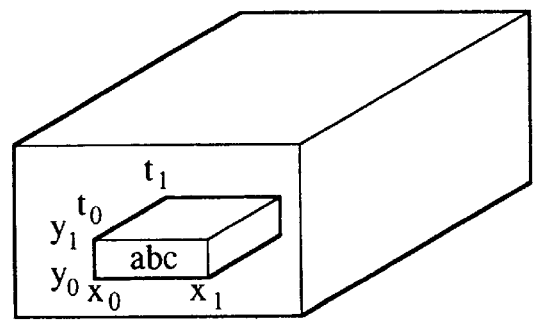
FIG. 27
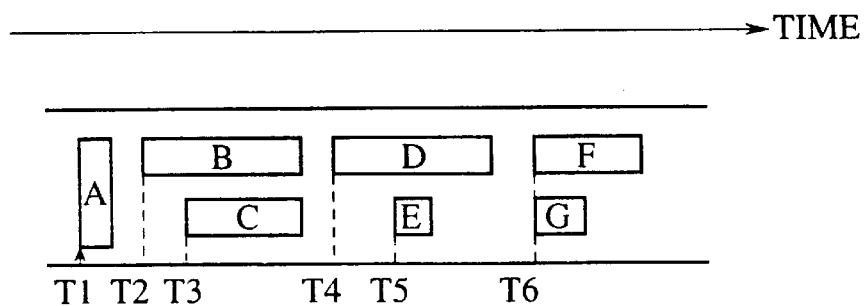

FIG.32
(1) PREVIOUS FRAME
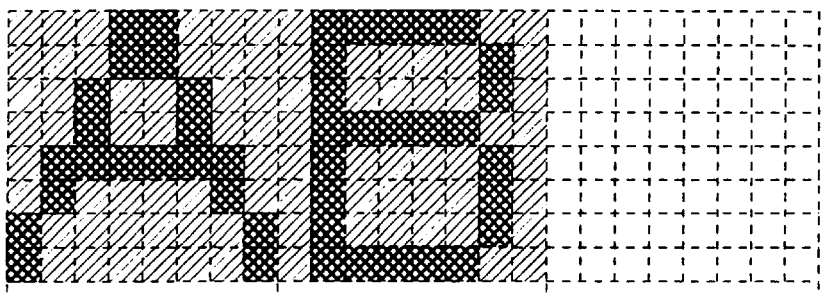
(2) CURRENT FRAME
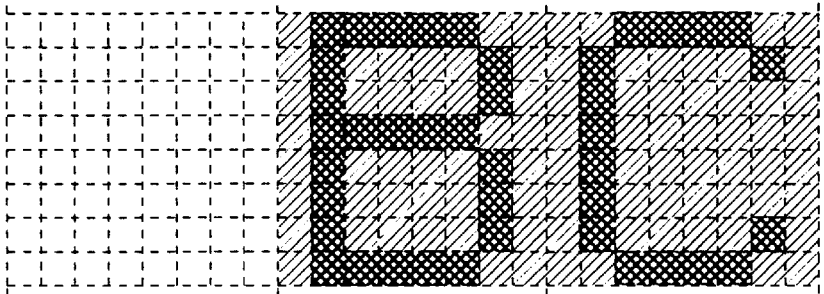
(3) MASK
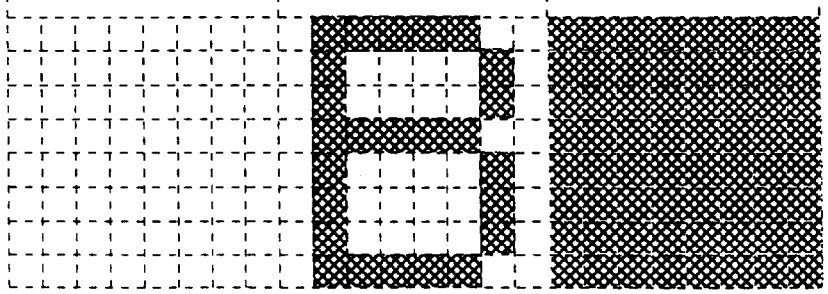
 : 0
 : 1

FIG.45A
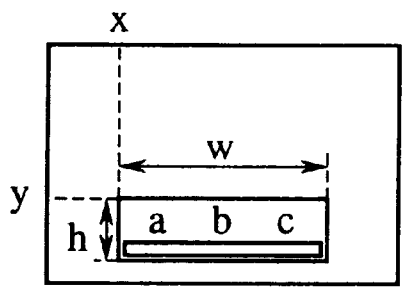
FIG.45B
| 1 | 1 | 1 | 1 |
|---|---|---|---|
| 1 | 1 | 1 | 1 |
FIG.46
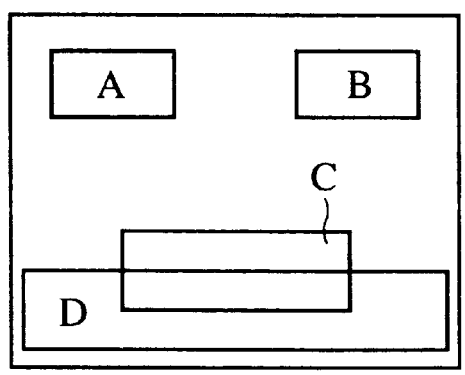
A: TIME
B: LOCATION, DATE
C: NAME, LOCATION
D: TITLE, DESCRIPTION
 WORDS, TRANSLATION

|     |   |   |   |
|-----|---|---|---|
| (1) | TRUE | FALSE | FALSE |
| (2) | TRUE | TRUE | FALSE |

| | |
|---|---|
| TITLE | ------ ▬▬▬▬▬ - ▬▬▬ -------------- |
| NAME | -- ▬▬▬ ---------------------------- |
| LOCATION | ------------ ▬▬ -------------------- |
| TIME | ------------------------------------ |
| LOGO | ▬▬ --------------------------------- |
| UNCLASSIFIED | - ▬▬ --- ▬▬▬ ------------------- |

| | TYPE | SPATIAL POSITION RANGE |
|---|---|---|
| 1 | TITLE | xywh |
| 2 | NAME | ------ |
| ⋮ | ⋮ | ⋮ |
| n | LOGO | ------ |

| BEFORE | AFTER | BEFORE | AFTER | BEFORE | AFTER |
|--------|-------|--------|-------|--------|-------|
| 0001   | 0001  | 0110   | 0110  | 1011   | 1111  |
| 0010   | 0010  | 0111   | 0111  | 1100   | 1100  |
| 0011   | 0011  | 1000   | 1000  | 1101   | 1111  |
| 0100   | 0100  | 1001   | 1111  | 1110   | 1110  |
| 0101   | 0111  | 1010   | 1110  | 1111   | 1111  |

| BEFORE | AFTER | BEFORE | AFTER | BEFORE | AFTER |
|--------|-------|--------|-------|--------|-------|
| 0001 | 0001 | 0110 | 0000 | 1011 | 1011 |
| 0010 | 0000 | 0111 | 0111 | 1100 | 1100 |
| 0011 | 0011 | 1000 | 1000 | 1101 | 1101 |
| 0100 | 0000 | 1001 | 1001 | 1110 | 1110 |
| 0101 | 0001 | 1010 | 1000 | 1111 | 1111 |

SCHEME FOR DETECTING CAPTIONS IN CODED VIDEO DATA WITHOUT DECODING CODED VIDEO DATA

BACKGROUND OF THE INVENTION

1. Field of the Invention

The present invention relates to a scheme for detecting captions in video data, and more particularly, to a scheme for detecting captions in coded video data as well as a video retrieval, a video content indication display, and a video display based on the coded video caption detection.

2. Description of the Background Art

As a method for extracting an information indicative of the video content from the video for the purpose of carrying out a processing based on the video content such as video retrieval or video editing, a method for extracting caption regions from the video has been known. Here, the captions generally include texts, photographs, symbols, patterns, markings, icons, etc., which are made to appear in the video by using a technique such as the superimpose technique, and the caption region is a pixel or a set of pixels which contain such a caption.

The conventionally known methods for automatically extracting caption regions from the video include a method which utilizes the property that the caption region has a relatively high intensity compared with the background region so that its edge can be easily detected (see R. Lienhart et al.: "Automatic text recognition in digital videos", Image and Video Processing IV, Proc. SPIE 2660-20, January 1996, for example), and a method which utilizes the fact that the caption region has large intensity differences at its periphery (see M. A. Smith et al.: "Video Skimming for Quick Browsing based on Audio and Image Characterization", Carnegie Mellon University, Technical Report CMU-CS-95-186, July 1995, for example).

In Lienhart et al., the frame image is segmented by the split and merge algorithm, and a caption region is detected according to a size of a region and its motion between frames. In this method, the segmentation utilizes the fact that the caption has a uniform pixel value so that the caption and the background are effectively separated according to a difference in intensities.

In Smith et al., a caption region is detected by obtaining and smoothing an edge of the image. This method utilizes the fact that the caption has a relatively high contrast compared with the background so that the edge of the caption becomes sharp.

As a modification of the latter type of the conventionally known method, there is also a proposition for improving the precision of the caption extraction by averaging several frames that contain the caption so as to emphasize the caption while reducing an influence of background fluctuations.

Now, in order to extract caption regions from the coded video which is coded by utilizing the inter-frame correlation, if any of the conventionally known methods as described above is to be used, it would be necessary to decode the coded video completely once so as to restore the original frame images, and then carry out the extraction processing as described above with respect to the restored original frame images. However, this provision requires the image decoding processing in addition to the caption region extraction processing, so that the processing cost would be high and the high speed caption region extraction would be difficult.

In addition, in a case of applying the above described method for averaging a plurality of frames to the coded video, it is necessary to carry out the averaging after a plurality of frame images are all decoded, so that the processing cost would be even higher.

Now, the conventional methods for detecting captions from the video have been based on local characteristics obtained from one to several frame images.

For instance, there is a conventional method which utilizes the fact that the caption region has large intensity differences on its edge, in which the caption is detected by finding a frame in which the caption appears, and taking differences of intensity and color with respect to frames before and after the caption appearance.

Also, there is a conventional method which utilizes the property that the caption region has a relatively high intensity compared with the background region so that its edge can be easily detected, in which the caption is detected by using the edge detection based on the first order derivative of the image and the projections of the edge image into vertical and horizontal directions.

Also, there is a conventional method which utilizes the fact that the caption is stationary and has a high intensity, in which a text portion is detected by obtaining a portion which has no motion between two frames and an intensity greater than or equal to a prescribed value (see Japanese Patent Application No. 8-331456 (1996)).

As such, the conventional methods for detecting captions from the video are utilizing the time-wise localized information such as one or two frame images. For this reason, these conventional methods have been associated with a problem that an imaged object other than the caption which has the similar characteristics as the caption, such as the characteristics of being stationary, having a high intensity, and having large high frequency components, could be erroneously detected as the caption.

On the other hand, there has also been a problem that the caption which appears on the video for a long period of time would not be correctly detected as the caption when there is a temporal movement or a contour blurring due to an influence of image degradation, noises, etc. As a consequence, there have been cases in which the single continuous caption is erroneously detected for multiple times as different captions over a plurality of time sections.

In other words, the conventional methods are judging the existence of the caption according to a certain short time section, so that it is difficult to avoid an erroneous detection of an imaged object other than the caption or an erroneous overlooking of the caption due to noises. Consequently, when any of the conventional methods is used for the purpose of obtaining a list of captions from the video, there are cases in which an imaged object other than the caption is erroneously displayed or a single caption is displayed more than once in overlaps.

Now, in conjunction with increasing activities in video distributions such as the television broadcasting, the digital satellite broadcasting, the laser disks, the digital video disks, and the video-on-demand, etc., there are increasing demands for flexible handling of video data. To this end, there have been propositions of techniques which attach various kinds of contents or index information to the video so as to enable the retrieval of and/or the random access to the video. As an information which characterizes the video, the captions which generally include texts, photographs, symbols, patterns, markings, icons, etc., are important as they reflect the meanings or the contents of the video. For this reason, there have been propositions of a method for automatically detecting captions from the video.

For example, there is a conventional method disclosed in Japanese Patent Application No. 8-331456 (1996) mentioned above, which utilizes the fact that the caption is stationary and has a high intensity, in which a text portion is detected by obtaining a portion which has no motion between two frames and an intensity greater than or equal to a prescribed value Also, there is a conventional method which utilizes the property that the caption has a sharp edge and a high intensity, in which a text portion is detected by obtaining a block for which both the edge sharpness and the intensity of the frame image are greater than prescribed thresholds (see Japanese patent Application No. 8-212231 (1996)).

As such, the conventional methods for detecting captions from the video are detecting the caption by utilizing the property of the caption itself such as itsedge sharpness or its intensity so that there has been a problem that an ability for detecting a switching point between captions has been low.

For instance, in Japanese Patent Application No. 8-212231 mentioned above, the frame image is segmented into blocks and the text region data corresponding to the blocks are provided. In the text region data, a value "1" is stored for each block at which the caption exists while a value "0" is stored for each block at which the caption does not exist. Then, a number of blocks with different values in the text region data between two frame images is counted, and when this counted number exceeds a prescribed value, it is judged that a caption is switched to another caption.

However, in this conventional method, no change appears in the text region data when the captions are switched without a break and without a change in their areas, so that it is still impossible to detect a switching point between the captions in such a case.

Now, there are various video retrieval methods based on the video content for the purpose of detecting a desired video portion from a huge amount of video data, and among them, a method which utilizes the caption contained in the video as a retrieval key has been attracting much attentions because the caption is usually formed by characters and symbols which have clear meanings, while there are typical appearance patterns for a position of a caption, so that the caption can reflect the video content quite well.

In the conventional video retrieval method, the desired video portion is retrieved by extracting an image of the caption region from the video, recognizing the characters contained in the caption, and comparing the recognized character information with the retrieval key. In this conventional video retrieval method, the edge extraction based on the first order derivative of the image is carried out, the edge image is projected into vertical and horizontal directions, and a rectangular region in which the caption exists is extracted. Then, the character recognition is carried out by using the feature vector classification techniques.

However, in the conventional video retrieval method described above, it has been impossible to realize the video retrieval based on a position of appearance of the caption. In addition, for the purpose of interpreting the caption by utilizing the character recognition, it has been necessary to carry out a high cost character recognition processing. Moreover, the character recognition rate has not been very high so that the retrieval efficiency has not been very good. Furthermore, the character recognition target image is required to have a high quality so that a high processing cost is also required for extracting the image of the caption region at high quality.

Now, there is a conventionally known system for generating and displaying video content indications, which uses video content indications based on shot boundaries in the video. For example, Japanese Patent Application Laid Open No. 4-237284 (1992) discloses a system in which the shot boundaries in the video are detected by using the inter-frame correlation and utilized as the video content indications. Moreover, in this conventional sytem, the video are segmented into short sections called shots according to the detected shot boundaries, and a representative frame image of each shot is displayed as a video content indication display.

However, this conventional video content indication display system has been associated with a problem that the generated video content indication is in an excessively fine granularity so that the video is cut into pieces too minutely because the video is handled according to the shot boundaries.

On the other hand, M. Mills et al.,: "A Magnifier Tool for Video Data", Proceedings of CHI '92, ACM, pp. 93–98, May 1992, disclose a method in which images obtained by sampling the video at constant time intervals hierarchically according to the temporal resolution of the outlines are displayed in parallel on a video display. In this method, the coarsely sampled images are displayed first, and a specified section is displayed with more finely sampled images in a case of viewing a particular section in further detail.

However, this conventional video content indication display method has been associated with a problem that, when a plurality of shots are integrated into a coarse video section, there is no guarantee that the integrated coarse video section actually reflects the video content well.

Now, in displaying or editing the video by reusing the already used video which contains captions, there can be a case in which the original captions are no longer desirable as their contents are not suitable for a newly intended use of that video. In such a case, the reusability of the video can be increased by displaying the video while obscuring the captions contained in the video.

The conventionally available methods for obscuring a part of the video include various video processing methods such as video tessellation, smoothing, pixel interchanges, noise application, etc. In these video processing methods, the video processing is carried out by specifying a portion to be obscured. Consequently, in order to display the video by obscuring the captions, it is necessary to carry out the video processing by specifying the caption regions.

However, in order to display the video while obscuring the captions by using any of these conventionally known methods for obscuring a part of the video, it is necessary for human workers to manually specify the caption regions to be obscured one by one, and for this reason, the works required for the purpose of increasing the reusability of the video by obscuring the captions become quite tedious and it is difficult to carry out such tedious works at high speed.

SUMMARY OF THE INVENTION

It is therefore an object of the present invention to provide a video caption detection scheme capable of detecting captions from the coded video data which are coded by utilizing the inter-frame correlation, at high speed and low processing cost, without requiring the decoding of coded video data into frame images.

It is another object of the present invention to provide a video caption detection scheme capable of detecting captions from the video data accurately, by merging local detection results and removing an influence of noises by means of a global processing.

It is another object of the present invention to provide a video caption detection scheme capable of detecting a switching point between captions.

It is another object of the present invention to provide a video retrieval scheme based on the video caption detection, which uses the spatial position of a caption on an image field as the retrieval key so that the video retrieval can be realized at a low processing cost according to the spatial position of the caption appearing in the video.

It is another object of the present invention to provide a video content indication display scheme based on the video caption detection, capable of generating the video content indication which is not in an excessively fine granularity and which is reflecting the video content well.

It is another object of the present invention to provide a video display scheme based on the video caption detection, capable of automatically detecting and obscuring captions contained in the video at a time of displaying the video.

According to one aspect of the present invention there is provided a method for detecting a caption region from video data coded by using a combination of predictive coding and motion compensation, comprising the steps of: judging whether each pixel/block in the video data is coded by using inter-frame correlation without using motion compensation or not; and detecting a region in the video data at which pixels/blocks judged by the judging step as being coded by using inter-frame correlation without using motion compensation are concentrated time-wise and space-wise, as a caption region.

According to another aspect of the present invention there is provided an apparatus for detecting a caption region from video data coded by using a combination of predictive coding and motion compensation, comprising: a judgement unit for judging whether each pixel/block in the video data is coded by using inter-frame correlation without using motion compensation or not; and a detection unit for detecting a region in the video data at which pixels/blocks judged by the judgement unit as being coded by using inter-frame correlation without using motion compensation are concentrated time-wise and space-wise, as a caption region.

According to another aspect of the present invention there is provided an article of manufacture, comprising: a computer usable medium having computer readable program code means embodied therein for causing a computer to function as a system for detecting a caption region from video data coded by using a combination of predictive coding and motion compensation, the computer readable program means including: first computer readable program code means for causing the computer to function as a judgement unit for judging whether each pixel/block in the video data is coded by using inter-frame correlation without using motion compensation or not; and second computer readable program code means for causing the computer to function as a detection unit for detecting a region in the video data at which pixels/blocks judged by the first computer readable program code means as being coded by using inter-frame correlation without using motion compensation are concentrated time-wise and space-wise, as a caption region.

Other features and advantages of the present invention will become apparent from the following description taken in conjunction with the accompanying drawings.

BRIEF DESCRIPTION OF THE DRAWINGS

FIG. 24 is a diagram for explaining exemplary timings of representative frames that can be obtained by the apparatus of FIG. 23.

FIG. 25 is a block diagram showing an exemplary configuration of a judgement unit in the apparatus of FIG. 23.

FIG. 26A is a diagram showing a table form used in managing a label information in the judgement unit of FIG. 25.

FIG. 26B is a diagram for explaining coordinate values used in the table form of FIG. 26A.

FIG. 27 is a diagram for explaining exemplary timings of representative frames that can be obtained by the judgement unit of FIG. 25.

FIG. 32 is a diagram for explaining the processing for producing a mask by the mask production unit of FIG. 31.

FIGS. 45A and 45B are diagrams for explaining a third method for expressing a spatial position of a caption on an image field that can be used in the fourth embodiment of the present invention.

FIG. 46 is a diagram for explaining a caption position to be used as a retrieval key in the fourth embodiment of the present invention.

DETAILED DESCRIPTION OF THE PREFERRED EMBODIMENTS

Figure 1:
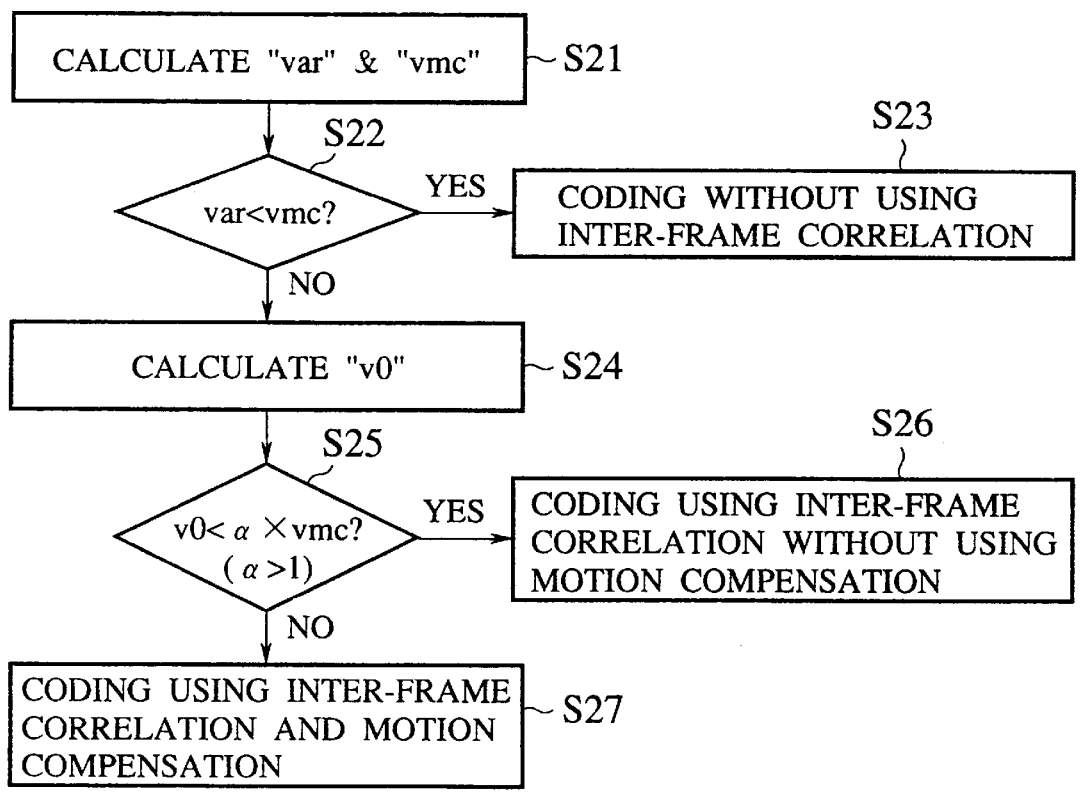
FIG. 1 is a flow chart of an exemplary method for judging a pixel coding type that can be used in coding the video data handled by the video caption detection scheme according to the present invention.

Referring now to FIG. 1 to FIG. 15, the first embodiment of a video caption detection scheme according to the present invention will be described in detail.

In the following, it is assumed that the input data are given in a form of video data coded according to the MPEG scheme as an example of the video data coded by utilizing the inter-frame correlation. However, it is to be noted that the present invention is not limited to such video data alone, and it is equally possible to apply the present invention to video data which are coded by any other coding schemes which utilize the inter-frame correlation and in which a type of coding can be changed pixel by pixel.

Note here that the present specification uses a term pixel as a generic term for representing a picture element or a set of picture elements (a picture element block). Consequently, any reference to a pixel in the following description should be construed as equally valid for a block or a set of pixels in general.

Also, in the following, it is assumed that the pixels are represented in terms of macro-blocks as used in the H.261 and MPEG schemes. However, it is to be noted that the present invention is not limited to such a pixel representation, and it is equally possible to apply the present invention to any other pixel representations.

In the MPEG, the video frames include:

(1) a frame which is coded by using the intra-frame correlation alone without using the inter-frame correlation, and (2) a frame which is coded by using the inter-frame correlation.

Also, in the video frame (2), it is possible to change a type of coding macro-block by macro-block. Here, the available types of coding can be classified by the following criteria:

(a) whether or not to use the inter-frame correlation, and (b) whether or not to use the motion compensation.

Consequently there are four different types of coding available according to these criteria (a) and (b).

Note that the H.261 and MPEG schemes are characterized by the use of both the predictive coding and the motion compensation, and this characteristic of the coding scheme is assumed in the video caption detection scheme according to the present invention. Here, the predictive coding is a coding scheme in which a value of a certain pixel is expressed in terms of values of nearby pixels (which will be referred to as the intra-frame predictive coding) or values at different times (which will be referred to as the inter-frame predictive coding). On the other hand, the motion compensation is a type of inter-frame predictive coding which uses not only values at the identical position within each field but also a value of a difference with respect to a surrounding position with the minimum difference (which is expressed by a motion vector).

Now, the video caption detection scheme according to the present invention is based on the observation that, among the video data which are coded by using the inter-frame correlation, those pixels which are coded by using the inter-frame correlation without using the motion compensation tend to be concentrated at the caption region both time-wise and space-wise. The reasons for justifying this observation will now be described.

First, a method and feature values usually used in judging a pixel coding type will be described. In the coding scheme which utilizes the inter-frame correlation such as H.261 and MPEG, the most efficient pixel coding type is judged by selecting a case which minimizes the variances as much as possible, upon comparison of the following three variances:

(1) a variance of pixel values within a frame (which will be abbreviated hereafter as var), (2) a variance of pixel value differences between frames in a case of using the motion compensation (an inter-frame motion compensation error variance) (which will be abbreviated hereafter as vmc), and (3) a variance of a pixel value difference between frames in a case of not using the motion compensation (an inter-frame error variance) (which will be abbreviated hereafter as v0).

This method will now be described in further detail with reference to the flow chart of FIG. 1.

First, var and vmc are calculated (step S21), and the calculated var and vmc are compared (step S22). When var is smaller, the coding without using the inter-frame correlation is carried out (step S23), whereas otherwise the coding using the inter-frame correlation is to be carried out. In a case of using the inter-frame correlation, v0 is calculated (step S24), and the calculated vmc and v0 are compared (step S25). When v0 is smaller, the coding using the inter-frame correlation without using the motion compensation is carried out (step S26), whereas otherwise the coding using the inter-frame correlation and the motion compensation is carried out (step S27). At the step S25, vmc is multiplied by a bias factor α which is greater than 1 so that the coding without using the motion compensation is given a higher priority when vmc and v0 are nearly equal. The reason for this is that, when these variances are nearly equal, it can be expected that an amount of codes related to the pixel value is almost the same so that a total amount of codes can be reduced advantageously by omitting codes for expressing the motion compensation.

Next, the properties of the video pixels regarding types of coding which tend to be applied to pixels in the caption region and the other non-caption region will be described.

The pixels in the caption region have a property of being stationary at the same positions without any change for a certain period of time, so that vmc tends to be small. In addition, the pixels in the caption region have relatively high contrasts compared with the pixels in the other non-caption region, so that var tends to be large. Consequently, there is a tendency that var becomes larger than vmc and therefore the coding using the inter-frame correlation is applied to the pixels in the caption region.

Moreover, the caption region has a sharp edge and no resembling pixels in its surrounding, so that the motion vector for the pixel between frames becomes 0 or a very small value. Consequently, there is a tendency that vmc and v0 become nearly equal and therefore the coding without using the motion compensation is applied to the pixels in the caption region.

For a moving portion in the other non-caption region, vmc apparently becomes smaller than v0 so that there is a tendency that the coding using the motion compensation is applied to the pixels in such a moving portion.

On the other hand, the pixels which are stationary in the other non-caption region such as those of the stationary background have a tendency of having non-zero v0 in practice because of the flickering of the display and the noises. However, the pixel in the other non-caption region has a not so sharp edge compared with the caption region and the resembling pixel exists in its surrounding, so that there is a tendency for being judged as having a motion to the nearby resembling pixel even when there is actually no motion and vmc tends to become smaller than v0 due to the motion compensation based on that judgement. For this reason, there is a tendency that the coding using the motion compensation is applied to the pixels which are stationary in the other non-caption region.

As for the caption region, there is also a similar tendency of having non-zero v0 because of the flickering of the display and the noises, but the edge is still sharp against the flickering of the display and the noises, and no resembling pixel exists in its surrounding, so that there is a tendency that no motion is detected and therefore vmc takes a not so small value which is nearly equal to v0. Consequently, even when the flickering of the display and the noises are taken into consideration, there is still a tendency that the coding without using the motion compensation is applied to the pixels in the caption region.

As described, because of the different properties of the pixels in the caption region and the other non-caption region, there is a tendency that the coding using the inter-frame correlation without using the motion compensation is applied to the pixels in the caption region, while the other types of coding are applied to the pixels in the other non-caption region. Thus it can be said that, among the video data which are coded by using the inter-frame correlation, those pixels which are coded by using the inter-frame correlation without using the motion compensation tend to be concentrated at the caption region both time-wise and space-wise, as asserted above.

In view of this observation, the video caption detection scheme according to the present invention extracts a portion in the coded video data at which the pixels coded by using the inter-frame correlation without using the motion compensation are concentrated time-wise and space-wise as the caption region.

Now, various specific implementations of this first embodiment of the video caption detection scheme according to the present invention will be described in detail.

Figure 2:
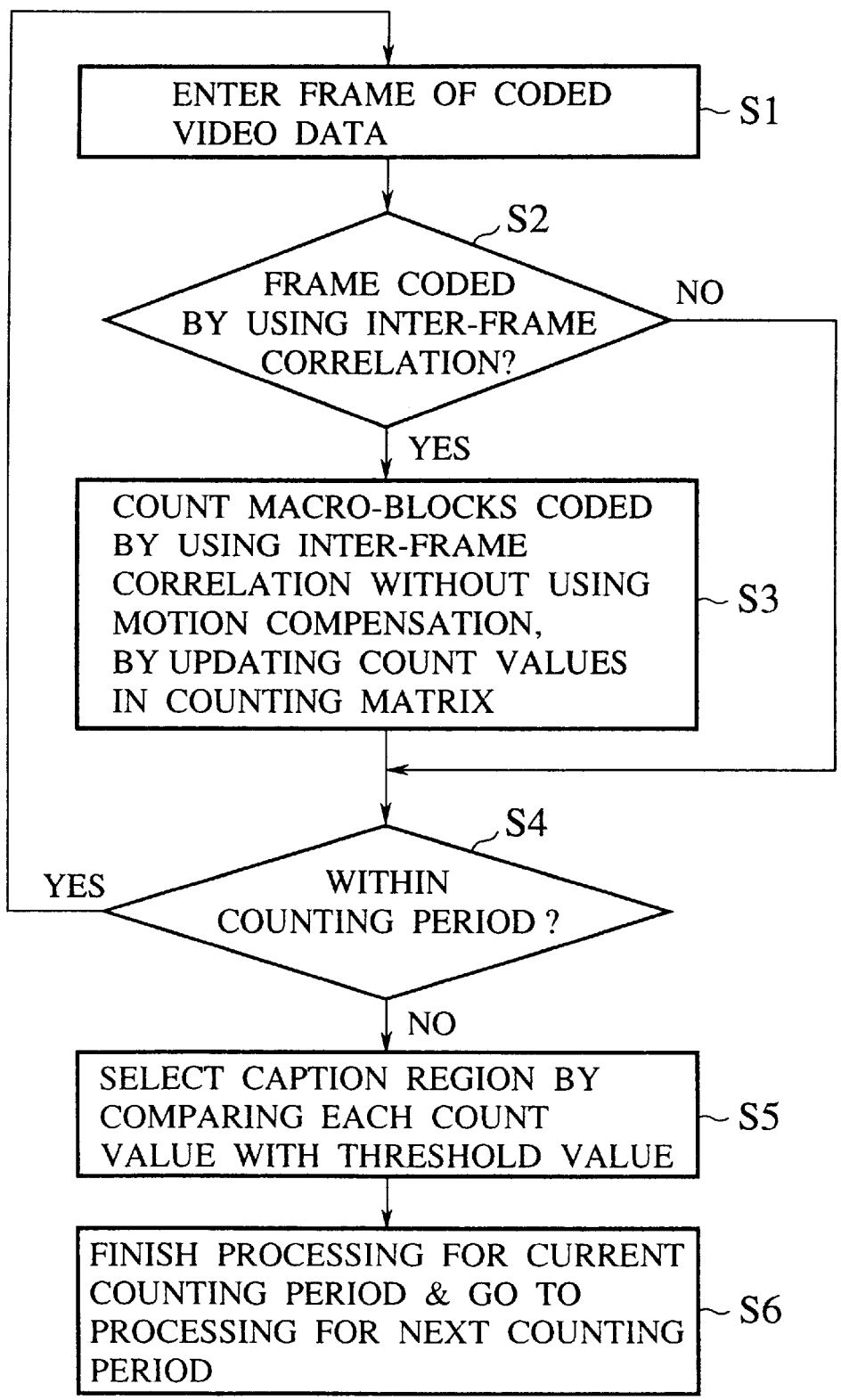
FIG. 2 is a flow chart for the first specific implementation of the video caption detection scheme in the first embodiment of the present invention.

FIG. 2 shows the flow chart for the first specific implementation of the video caption detection scheme according to the present invention, which operates as follows.

First, the video data coded by the MPEG or H.261 are entered frame by frame (step S1). Then, whether each entered frame is a frame which is coded by using the inter-frame correlation or not is judged (step S2). A frame which is judged as being coded without using the inter-frame correlation will not be applied with any processing in this first specific implementation, although such a frame may be utilized in the other specific implementations. A frame which is judged as being coded by using the inter-frame correlation will be entered into the next counting step S3 in units of macro-blocks.

At the counting step S3, whether each entered macro-block is a macro-block which is coded by using the inter-frame correlation without using the motion compensation or not is judged, and an appearance of a macro-block coded by using the inter-frame correlation without using the motion compensation at each macro-block position is counted according to this judgement result, by updating a count value in a corresponding element of a two-dimensional counting matrix which is provided in correspondence to positions of the macro-blocks. The further detail of this counting step will be described below.

These operations of the steps S1 to S3 are then repeated within a prescribed counting period (step S4), so that a frequency of appearance of a macro-block coded by using the inter-frame correlation without using the motion compensation at each macro-block position within the prescribed counting period is counted by the repeated execution of the steps S1 to S3.

When the counting within the prescribed counting period is completed, the operation proceeds to the next selection step S5 at which the count values in the counting matrix are compared with a prescribed threshold value so as to select the caption region. The further detail of this selection step will be described below.

The operations up to this point constitute a processing for one counting period, so that the processing for the current counting period is finished and the operation proceeds to the processing for the next counting period at the step S6 according to the need.

Note that the counting matrix is to be initialized before this processing of FIG. 2, although not explicitly indicated in FIG. 2.

In the processing of FIG. 2 described above, the counting step S3 can be realized in any of the following three realizations.

Figure 3:
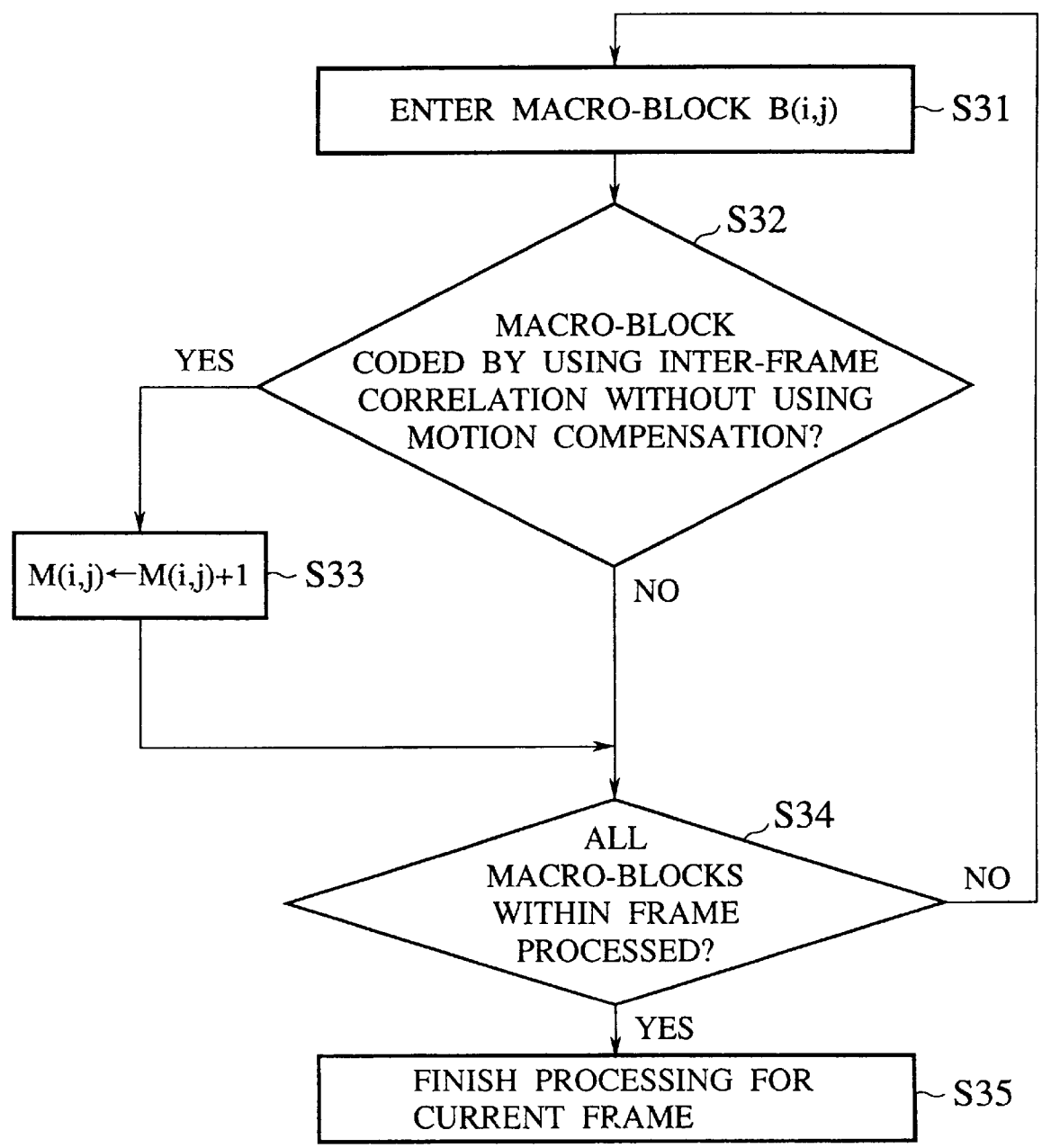
FIG. 3 is a flow chart for the first realization a counting step in the processing of FIG. 2.

FIG. 3 shows the flow chart for the first realization of the counting step S3 in the processing of FIG. 2.

In the counting step realization of FIG. 3, a macro-block B(i, j) is entered from each frame (step S31), and whether each entered macro-block is a macro-block which is coded by using the inter-frame correlation without using the motion compensation or not is judged (step S32). When it is a macro-block which is coded by using the inter-frame correlation without using the motion compensation, a value "1" is added to a corresponding element of the counting matrix according to the position of the macro-block (step S33). The operations of the steps S31 to S33 are then repeated for all the macro-blocks within the frame (step S34). When this processing is completed for all the macro-blocks within the frame, the processing of the counting step for the current frame is finished (step S35).

Denoting the counting matrix as M and the macro-block as B, this counting step of FIG. 3 can be expressed as follows.

$M(i, j) \leftarrow M(i, j)+1$: when $B(i, j)$ is a macro-block coded by using the inter-frame correlation without using the motion compensation $M(i, j) \leftarrow M(i, j)$: otherwise In this counting step realization of FIG. 3, a position at which the macro-block that is coded by using the inter-frame correlation without using the motion compensation has appeared at least once is extracted as the caption region, so that there is a possibility for erroneously extracting a pixel which would not be judged as a part of the caption region by a human judgement, but there is an advantage that a possibility for overlooking any part of the caption region can be reduced.

Figure 4:
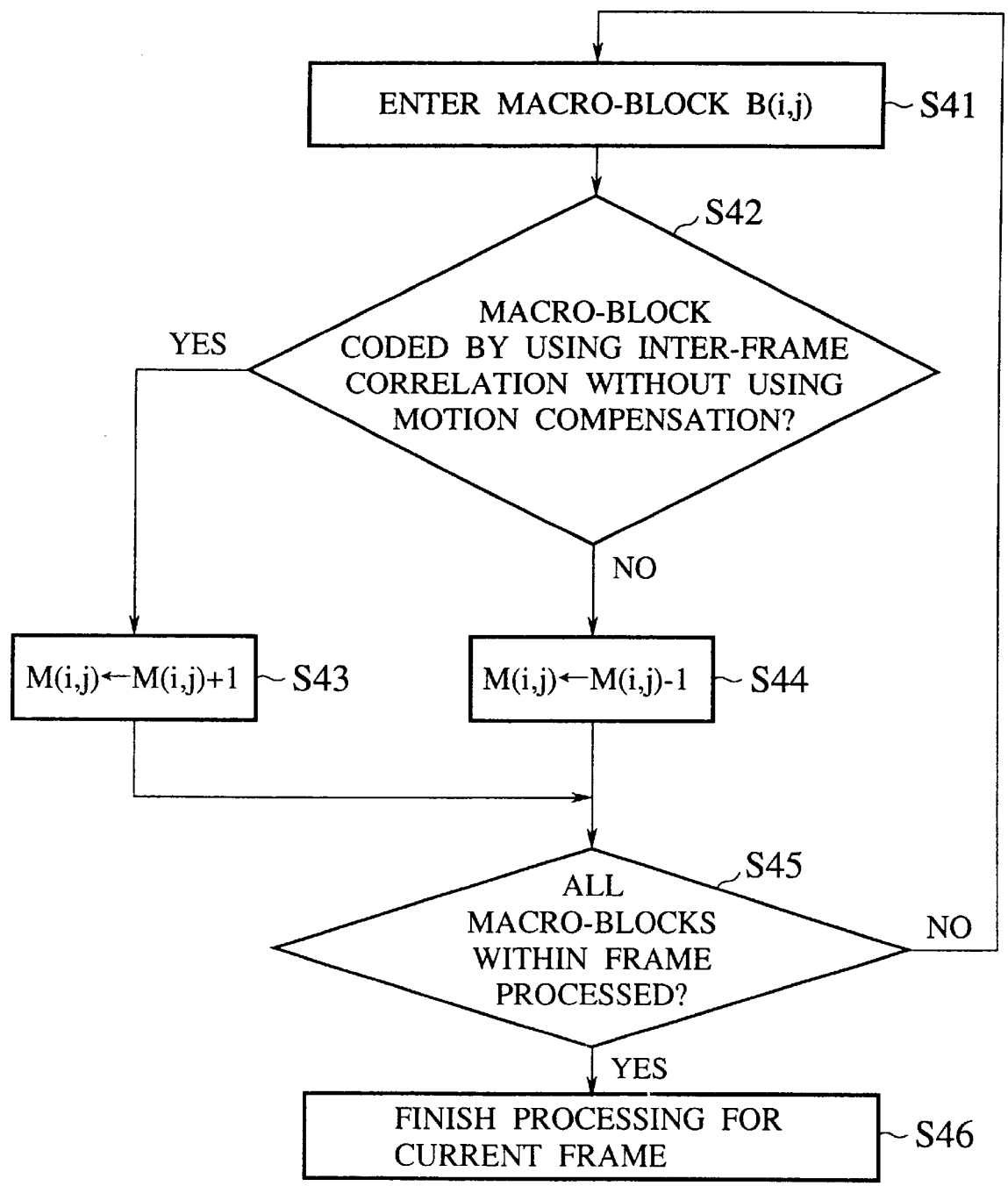
FIG. 4 is a flow chart for the second realization a counting step in the processing of FIG. 2.

FIG. 4 shows the flow chart for the second realization of the counting step S3 in the processing of FIG. 2.

In the counting step realization of FIG. 4, a macro-block $B(i, j)$ is entered from each frame (step S41), and whether each entered macro-block is a macro-block which is coded by using the inter-frame correlation without using the motion compensation or not is judged (step S42). When it is a macro-block which is coded by using the inter-frame correlation without using the motion compensation, a value "1" is added to a corresponding element of the counting matrix according to the position of the macro-block (step S43), while a value "1" is subtracted from a corresponding element of the counting matrix according to the position of the macro-block otherwise (step S44). The operations of the steps S41 to S44 are then repeated for all the macro-blocks within the frame (step S45). When this processing is completed for all the macro-blocks within the frame, the processing of the counting step for the current frame is finished (step S46).

Denoting the counting matrix as M and the macro-block as B, this counting step of FIG. 4 can be expressed as follows.

$M(i, j) \leftarrow M(i, j)+1$: when $B(i, j)$ is a macro-block coded by using the inter-frame correlation without using the motion compensation $M(i, j) \leftarrow M(i, j)-1$: otherwise In this counting step realization of FIG. 4, a case of erroneously judging a non-caption pixel as a part of the caption region can be cancelled out by a case of correctly judging that non-caption pixel as not a part of the caption region, so that there is an advantage that a possibility for the erroneous video caption detection can be reduced compared with the first counting step realization of FIG. 3 described above.

Figure 5:
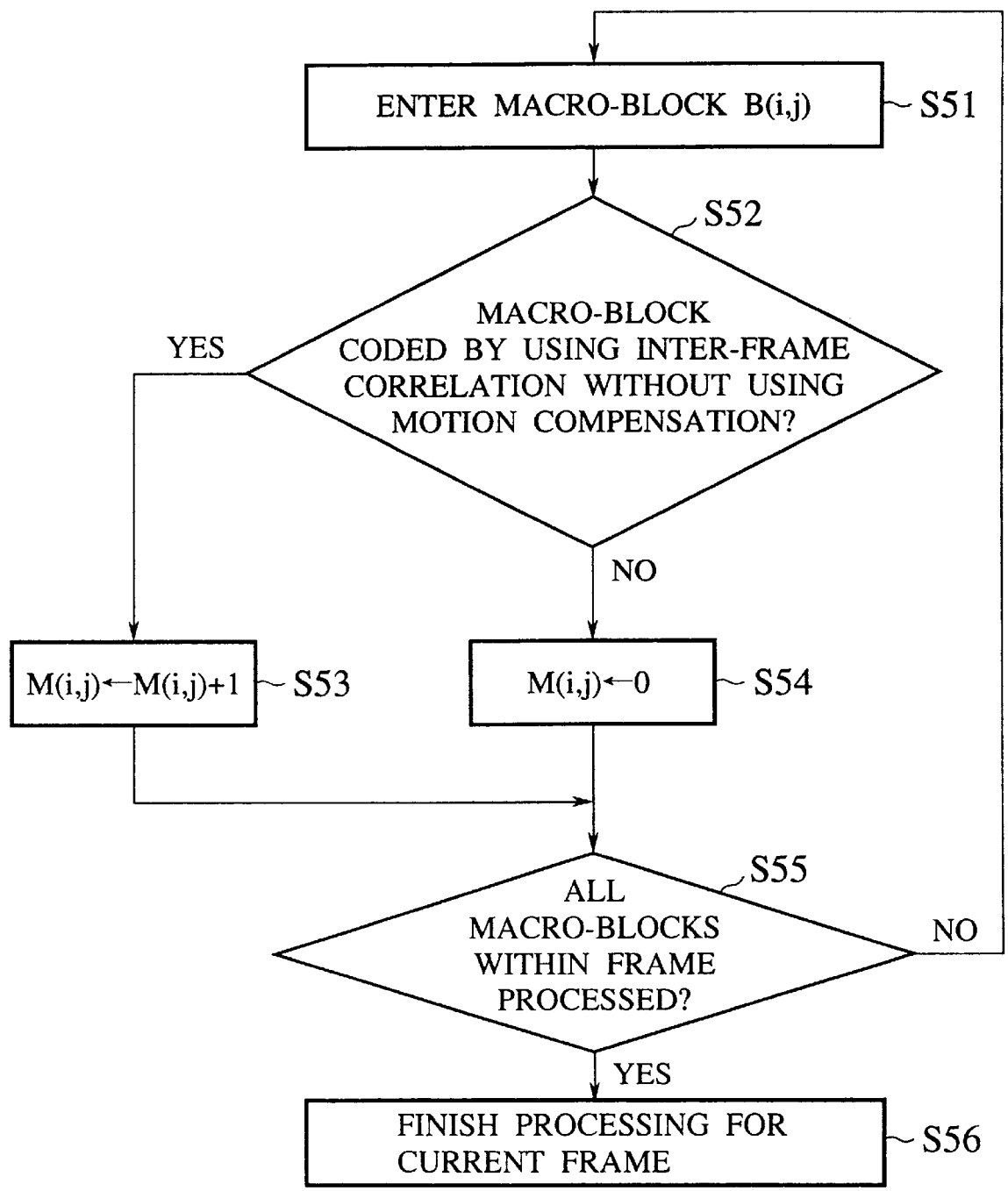
FIG. 5 is a flow chart for the third realization a counting step in the processing of FIG. 2.

FIG. 5 shows the flow chart for the third realization of the counting step S3 in the processing of FIG. 2.

In the counting step realization of FIG. 5, a macro-block $B(i, j)$ is entered from each frame (step S51), and whether each entered macro-block is a macro-block which is coded by using the inter-frame correlation without using the motion compensation or not is judged (step S52). When it is a macro-block which is coded by using the inter-frame correlation without using the motion compensation, a value "1" is added to a corresponding element of the counting matrix according to the position of the macro-block (step S53), while a value of a corresponding element of the counting matrix is set equal to "0" otherwise (step S54). The operations of the steps S51 to S54 are then repeated for all the macro-blocks within the frame (step S55). When this processing is completed for all the macro-blocks within the frame, the processing of the counting step for the current frame is finished (step S56).

Denoting the counting matrix as M and the macro-block as B, this counting step of FIG. 4 can be expressed as follows.

$M(i, j) \leftarrow M(i, j)+1$: when $B(i, j)$ is a macro-block coded by using the inter-frame correlation without using the motion compensation $M(i, j) \leftarrow 0$: otherwise In this counting step realization of FIG. 5, a case of erroneously judging a non-caption pixel as a part of the caption region can be cancelled out by a case of correctly judging that non-caption pixel as not a part of the caption region, so that there is also an advantage that a possibility for the erroneous video caption detection can be reduced compared with the first counting step realization of FIG. 3 described above.

In the processing of FIG. 2 described above, the selection step S5 can be realized in any of the following four realizations.

Figure 6:
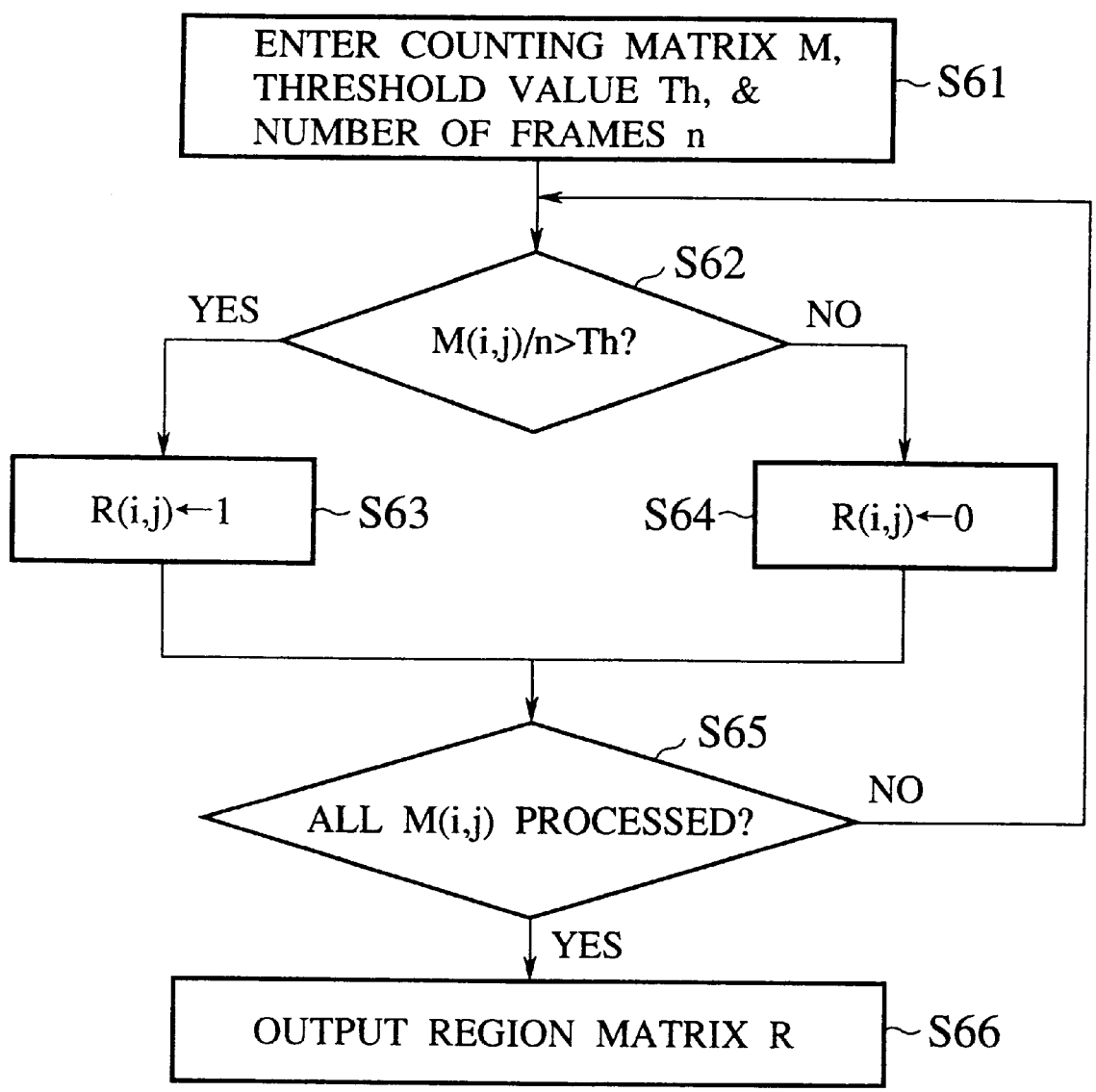
FIG. 6 is a flow chart for the first realization of a selection step in the processing of FIG. 2.

FIG. 6 shows the flow chart for the first realization of the selection step S5 in the processing of FIG. 2.

In the selection step realization of FIG. 6, the counting matrix M, a threshold value Th, and a number of frames n used in the counting processing are entered (step S61). Then, the values of the elements $M(i, j)$ of the counting matrix M divided by the number of frames n is compared with the threshold value Th (step S62) so as to determine a portion for which the value of the element of the counting matrix M divided by the number of frames n is greater than the threshold value Th as a caption region (step S62). Then, by denoting a two-dimensional region matrix for indicating the existence of the caption region as R, a value of an element of this region matrix R corresponding to a position at which the caption region exists is set to "1" (step S63), while a value of an element of this region matrix R corresponding to a position at which the caption region does not exist is set to "0" (step S64).

The operations of the steps S62 to S64 are repeated for all the elements of the counting matrix M (step S65), and the eventually obtained region matrix R is outputted (step S66).

This selection step of FIG. 6 can be expressed as follows.

$R(i, j)=1$: when $M(i, j)/n > Th$ $R(i, j)=0$: otherwise

Note that the threshold value Th may be a prescribed constant value, or a variable value. For example, it is possible to vary the threshold value Th adaptively for each counting period so that a number of caption regions extracted within each counting period does not exceeds a prescribed number.

Figure 7:
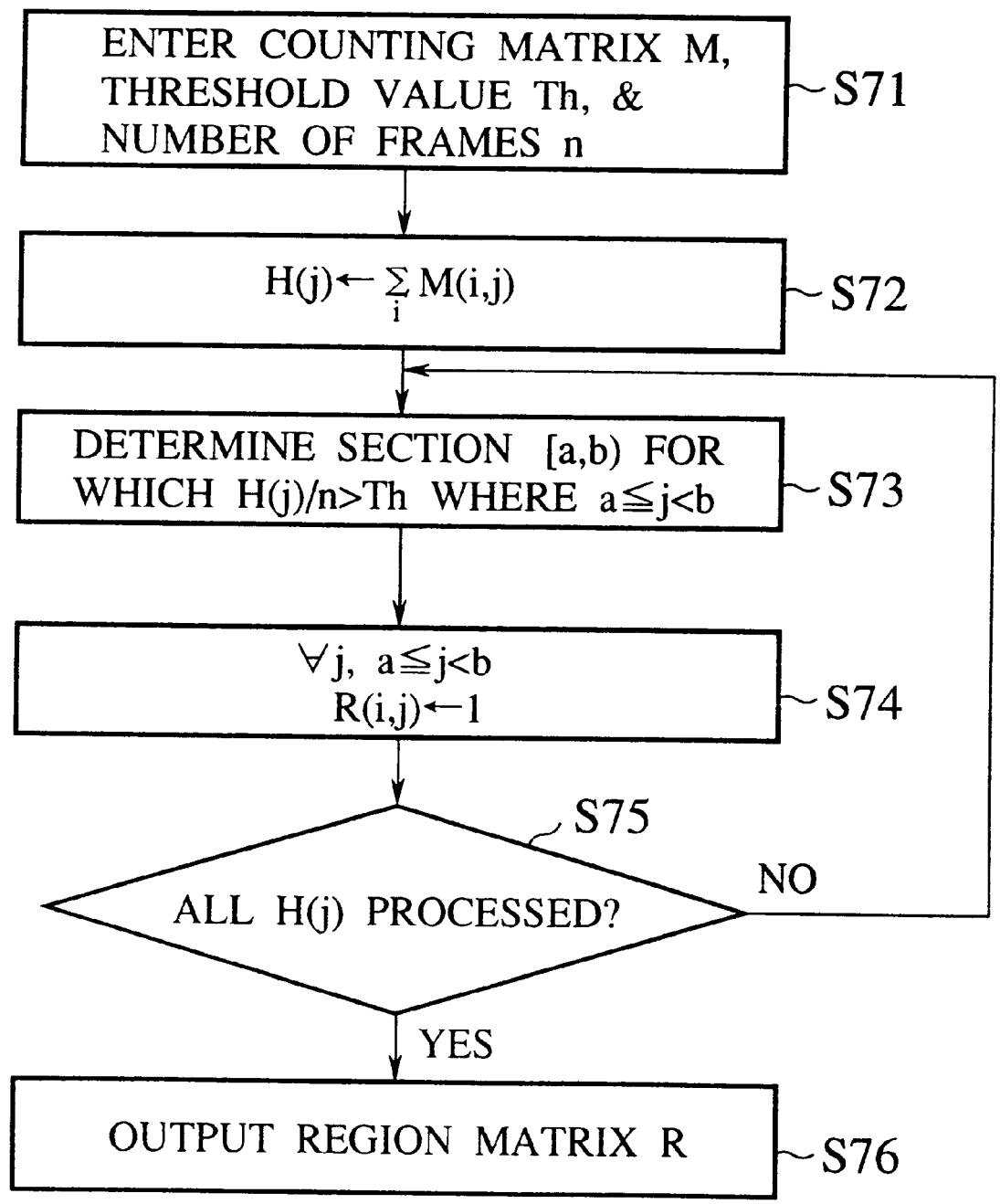
FIG. 7 is a flow chart for the second realization of a selection step in the processing of FIG. 2.

FIG. 7 shows the flow chart for the second realization of the selection step S5 in the processing of FIG. 2.

The selection step realization of FIG. 7 includes a projecting step for producing a one-dimensional histogram by projecting the counting matrix entered from the counting step into a vertical or horizontal direction, and a selecting step for selecting a section with histogram values greater than a prescribed threshold value as the caption region.

In FIG. 7, the counting matrix M, a threshold value Th, and a number of frames n used in the counting processing are entered (step S71). Then, the counting matrix M is projected into the horizontal direction to produce a projection histogram H (step S72). Then, a section [a, b) in which the value of the projection histogram H divided by the number of frames n is greater than the threshold value Th is determined (step S73), and values of elements of the region matrix R corresponding to the determined section [a, b) are set to "1" (step S74). Here, the section [a, b) indicates a range of a value x defined as: a≦x<b. These steps S73 and S74 are repeated until all the elements of the projection histogram H are compared with the threshold value Th (step S75), and the eventually obtained region matrix R is outputted (step S76).

Note that FIG. 7 shows an exemplary case of using the projection into the horizontal direction, but the projection into the vertical direction may be used similarly.

Figure 8:
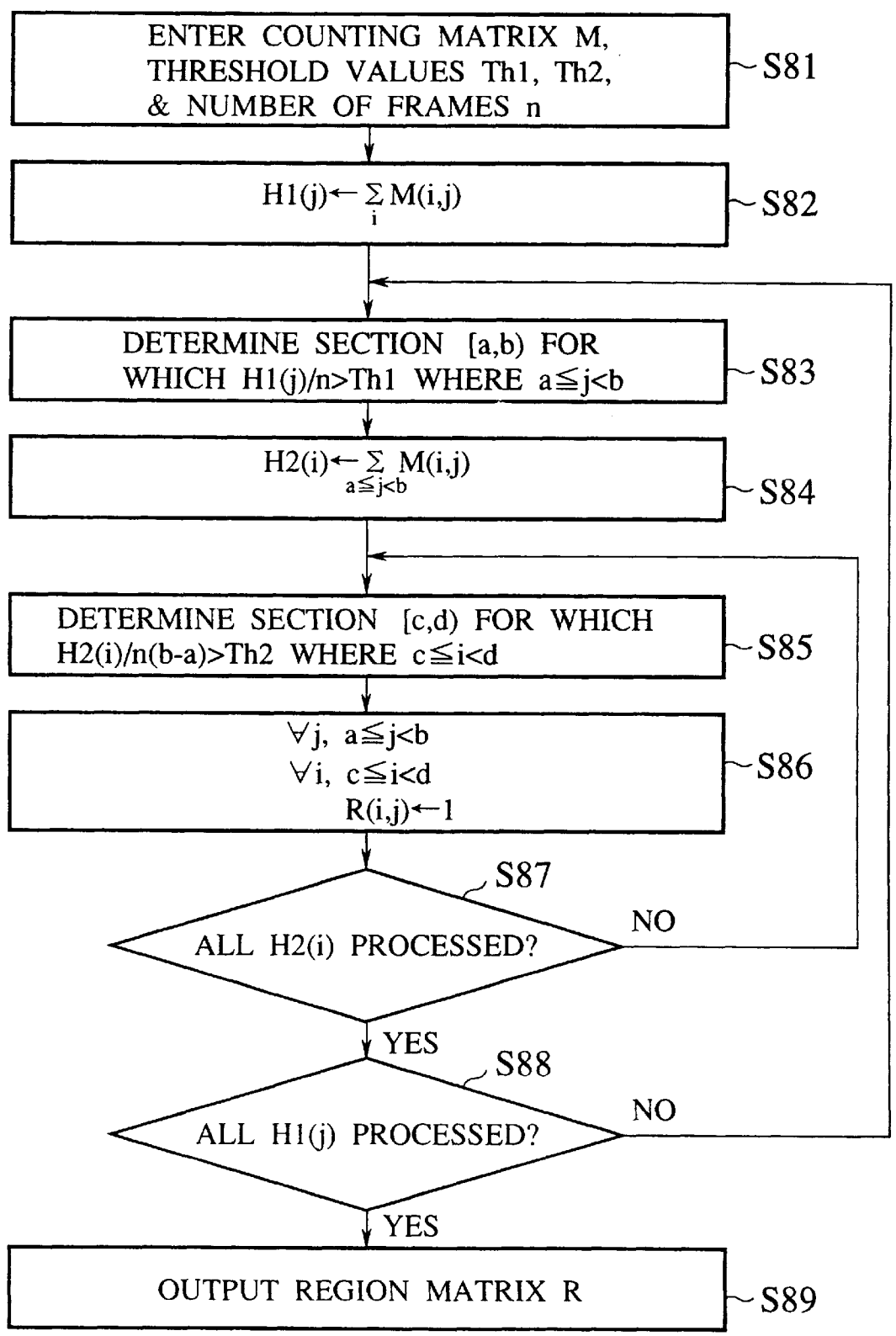
FIG. 8 is a flow chart for the third realization of a selection step in the processing of FIG. 2.

FIG. 8 shows the flow chart for the third realization of the selection step S5 in the processing of FIG. 2.

In the selection step realization of FIG. 8, the projection histogram H of the second realization of FIG. 7 is further projected into another projection direction which is not used in the second realization of FIG. 7, and a section with histogram values greater than a prescribed threshold value is selected as the caption region.

In FIG. 8, the counting matrix M, two threshold values Th1 and Th2, and a number of frames n used in the counting processing are entered (step S81). Then, the counting matrix M is projected into the horizontal direction to produce a projection histogram H1 (step S82). Then, a section [a, b) in which the value of the projection histogram Hi divided by the number of frames n is greater than the threshold value Th1 is determined (step S83). Next, the section [a, b) of the counting matrix M is further projected into the vertical direction to produce a projection histogram H2 (step S85). Then, a section [c, d) in which the value of the projection histogram H2 divided by the number of frames n and a size (b-a) of the section [a, b) is greater than the threshold value Th2 is determined (step S85). Then, values of elements of the region matrix R corresponding to the determined sections [a, b) and [c, d) are set to "1" (step S86). These steps S83 to S86 are repeated until all the elements of the projection histograms H1 and H2 are compared with the respective threshold values Th1 and Th2 (steps S87 and S88), and the eventually obtained region matrix R is outputted (step S89).

Note that FIG. 8 shows an exemplary case of using the projection into the horizontal direction first and the projection into the vertical direction next, but the order of the projection into the horizontal direction and the projection into the vertical direction may be interchanged if desired. This third realization of FIG. 8 can detect the caption region at a higher accuracy than the second realization of FIG. 7.

Figure 9:
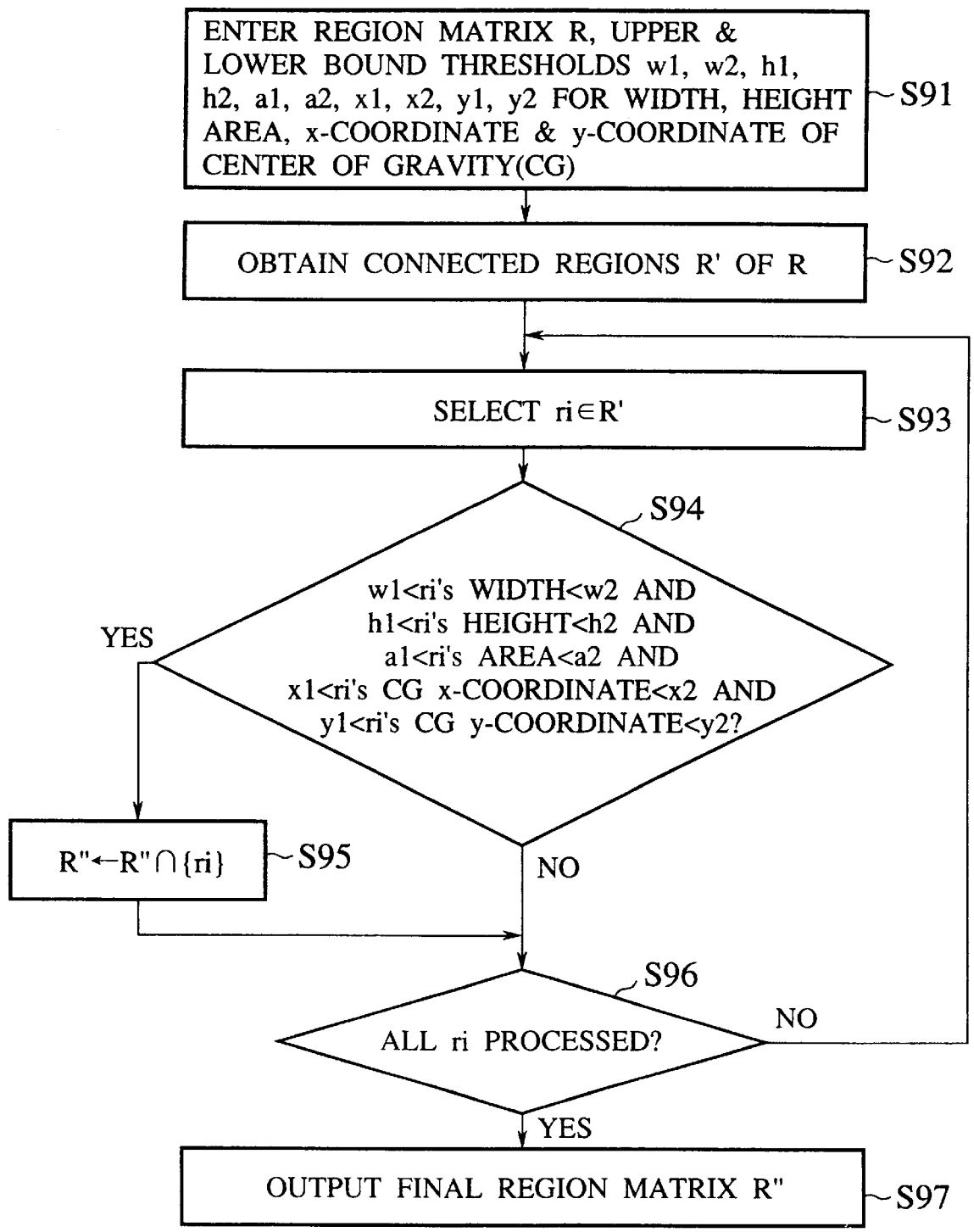
FIG. 9 is a flow chart for the fourth realization of a selection step in the processing of FIG. 2.

FIG. 9 shows the flow chart for the fourth realization of the selection step S5 in the processing of FIG. 2, in which the selection result obtained by any of the first to third realizations of FIG. 6 to FIG. 8 is further narrowed down.

In FIG. 9, the region matrix R obtained by any of the first to third realizations of FIG. 6 to FIG. 8 is entered along with upper and lower bound thresholds (w1, w2, h1, h2, a1, a2, x1, x2, y1, y2) for various region features (width, height, area, x-coordinate of a center of gravity, y-coordinate of a center of gravity) (step S91). Then, connected regions R' of the region matrix R are obtained (step S92). Here, the connected region is a region which connects those elements of the region matrix R which have values "1" and which are contiguous. As for directions of the contiguity, it is possible to use the four nearest neighbor connection which adopts four directions of up, down, left, and right, or the eight nearest neighbor connection which adopts four directions of upper right, upper left, lower right, and lower right in addition to the four directions of the four nearest neighbor connection. The processing for obtaining the connected region is also referred to as the labeling.

Next, an element ri of the connected regions R' which by itself is a connected region is selected (step S93), and its width, height, area, and center of gravity position are obtained. Then, whether the obtained width, height, area, x-coordinate of a center of gravity, and y-coordinate of a center of gravity are satisfying the respective upper and lower bound thresholds or not is checked (step S94). Then, a portion occupied by an element ri whose width, height, area, x-coordinate of a center of gravity, and y-coordinate of a center of gravity are all satisfying the respective upper and lower bound thresholds is added to a final region matrix R" (step S95). These operations of the steps S93 and S94 are then repeated for all the elements of the connected regions R' (step S96), and the eventually obtained final region matrix R" is outputted (step S97).

Note that the region features to be used in selecting the elements of the final region matrix R" may be different from those described above. For instance, the other region features such as a ratio of width and height, a circumference length of a region, etc., may be used.

In this fourth realization of FIG. 9, when appropriate thresholds prepared in accordance with the typical usages of the captions are used, it is possible to remove a non-caption region which is erroneously detected as the caption region, so that there is an advantage that an accuracy of the caption region detection can be improved.

Figure 10:
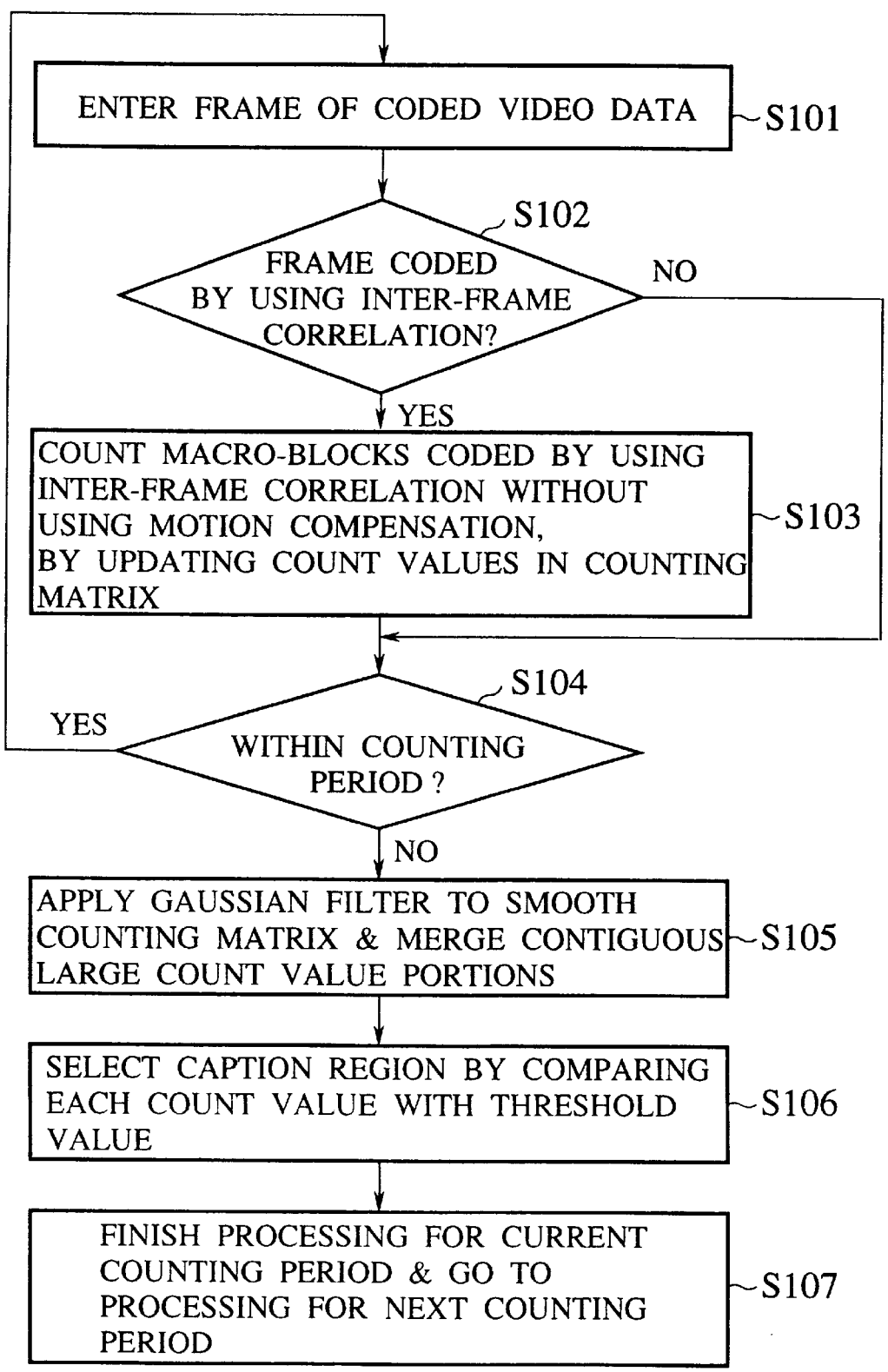
FIG. 10 is a flow chart for the second specific implementation of the video caption detection scheme in the first embodiment of the present invention.

FIG. 10 shows the flow chart for the second specific implementation of the video caption detection scheme according to the present invention, which differs from the first specific implementation of FIG. 2 by incorporating a merging step for merging the count values stored in the counting matrix, which is provided between the counting step and the selection step.

In FIG. 10, the steps S101 to S104, S106 and S107 are substantially the same as the steps S1 to S6 of FIG. 2 respectively. For the counting step S103, any of the three realizations of FIG. 3 to FIG. 5 can be used. For the selection step S106, any of the four realizations of FIG. 6 to FIG. 9 can be used.

At the merging step S105, the Gaussian filter is applied to the counting matrix for the purpose of smoothing the count values so that the smaller value portions become less likely to be selected while the contiguous larger value portions are merged together.

The processing of this merging step S105 can be expressed as:

$$M \leftarrow G*M(x, y) = \Sigma_v \Sigma_u G(u, v) \cdot M(x-u, y-v)$$

where * is the convolution operator and G is the Gaussian filter given by:

$$G(i, j) = (1/2\pi\sigma^2)\exp(-(i^2+j^2)/2\sigma^2).$$

Note that the method for merging regions is not necessarily limited to that which uses the Gaussian filter as described above, and any other smoothing method or region merging method may be used instead.

In this second specific implementation of FIG. 10, the scattered caption regions can be collected together spatially, so that there is an advantage that a problem of excessive region segmentation can be resolved.

Figure 11:
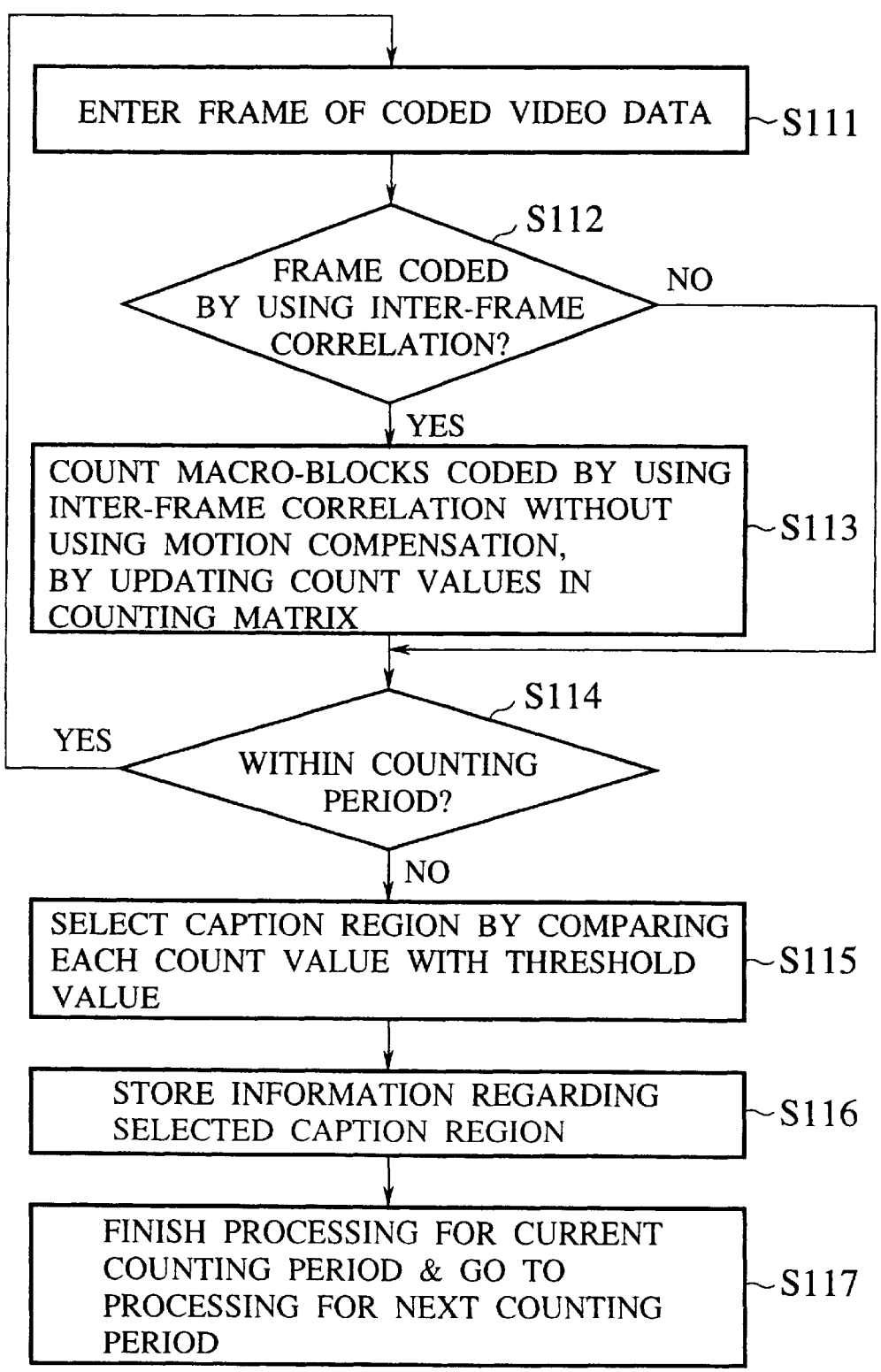
FIG. 11 is a flow chart for the third specific implementation of the video caption detection scheme in the first embodiment of the present invention.

FIG. 11 shows the flow chart for the third specific implementation of the video caption detection scheme according to the present invention, which differs from the first specific implementation of FIG. 2 by incorporating a storing step for storing an information regarding the caption region, which is provided after the selection step.

In FIG. 11, the steps S111 to S115 and S117 are substantially the same as the steps S1 to S6 of FIG. 2 respectively. For the counting step S113, any of the three realizations of FIG. 3 to FIG. 5 can be used. For the selection step S115, any of the four realizations of FIG. 6 to FIG. 9 can be used. Note that the storing step S116 may similarly be incorporated into the second specific implementation of FIG. 10.

The storing step S116 stores an information which is one or any combination of an index of a frame used in the extraction, the counting matrix, the region matrix, the projection histogram, an individual caption region information such as width, height, area, and a center of gravity position of an individual caption region.

The stored information regarding the caption region can then be utilized for various purposes such as the retrieval and editing or the decoding of the video using the caption region.

A period for storing the stored information can be set variously according to the need. For example, for the purpose of the retrieval and editing, a period for storing the stored information can be set equal to that of the video. Also, when the primary purpose is the decoding of the caption region from the video so that there is no need for a long term storing, a period for storing the stored information can be set equal to a minimum period required by the decoding.

Also, when the captions occupying the identical region are repeatedly extracted, an information regarding the overlapping captions may be not stored in duplication in order to reduce an amount of stored information.

Figure 12:
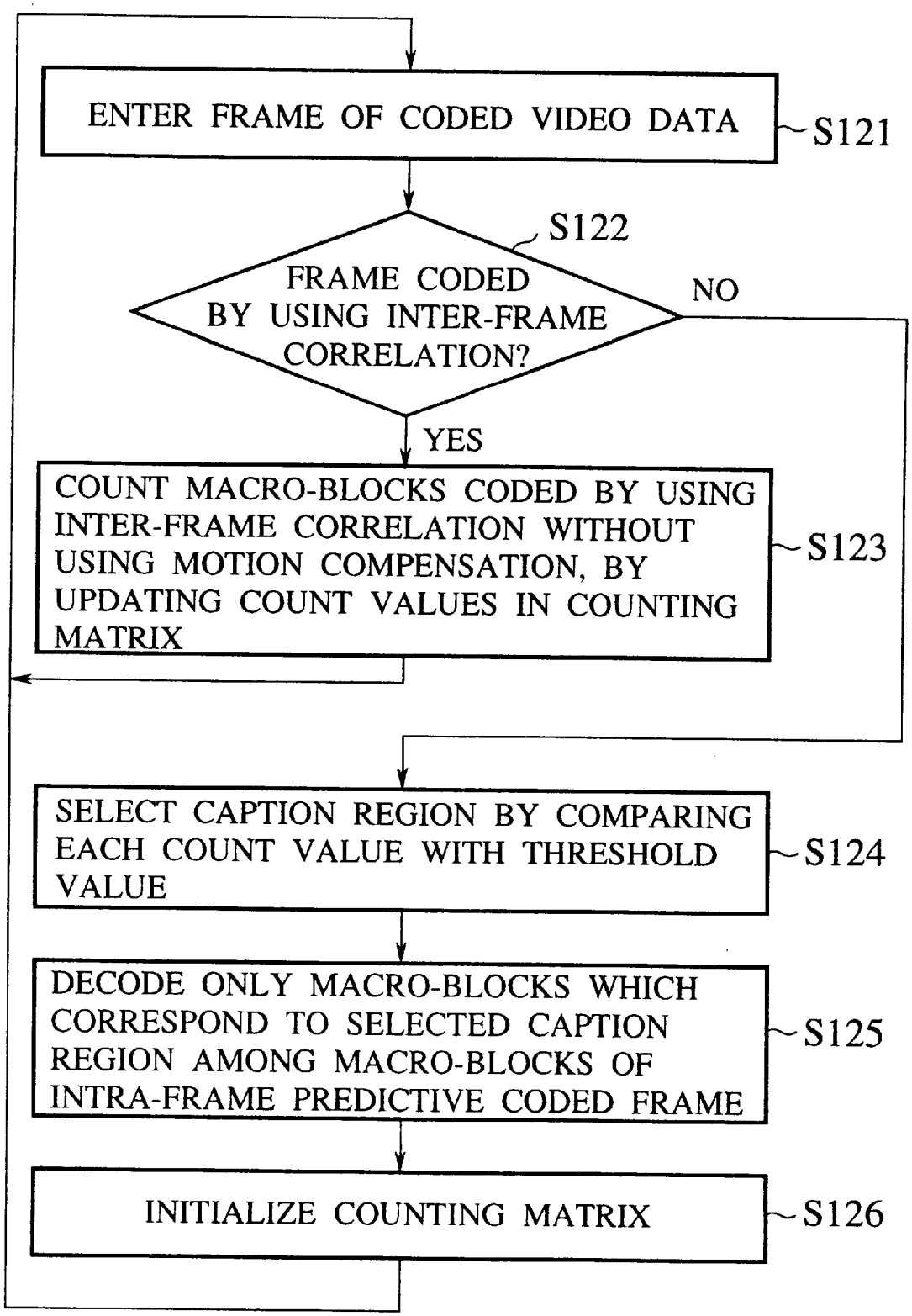
FIG. 12 is a flow chart for the fourth specific implementation of the video caption detection scheme in the first embodiment of the present invention.

FIG. 12 shows the flow chart for the fourth specific implementation of the video caption detection scheme according to the present invention, which differs from the first specific implementation of FIG. 2 by incorporating a decoding step for decoding only the caption region, which is provided after the selection step.

In FIG. 12, the steps S121 to S124 are substantially the same as the steps S1 to S3 and S5 of FIG. 2 respectively. A step corresponding to the step S4 of FIG. 2 is omitted in FIG. 12. For the counting step S123, any of the three realizations of FIG. 3 to FIG. 5 can be used. For the selection step S124, any of the four realizations of FIG. 6 to FIG. 9 can be used. Note that the decoding step S125 may similarly be incorporated into the second specific implementation of FIG. 10 or the third specific implementation of FIG. 11.

In the fourth specific implementation of FIG. 12, the caption region is extracted by setting a period between two frames which are coded by using the intra-frame predictive coding as the counting period at the steps S122 and S123. In order to decode the caption region, the decoding step S125 decodes only those macro-blocks which correspond to the caption region selected by the selection step S124 among those macro-blocks which constitute the intra-frame predictive coded frame immediately after the counting period.

Note that the decoding of the caption region is carried out by using the intra-frame predictive coded frame immediately after the counting period in FIG. 12, but it is also possible to use the intra-frame predictive coded frame immediately before the counting period or the inter-frame predictive coded frames instead.

After the decoding step S125, the counting matrix is initialized at the step S126 and the operation returns to the step S121.

Figure 13:
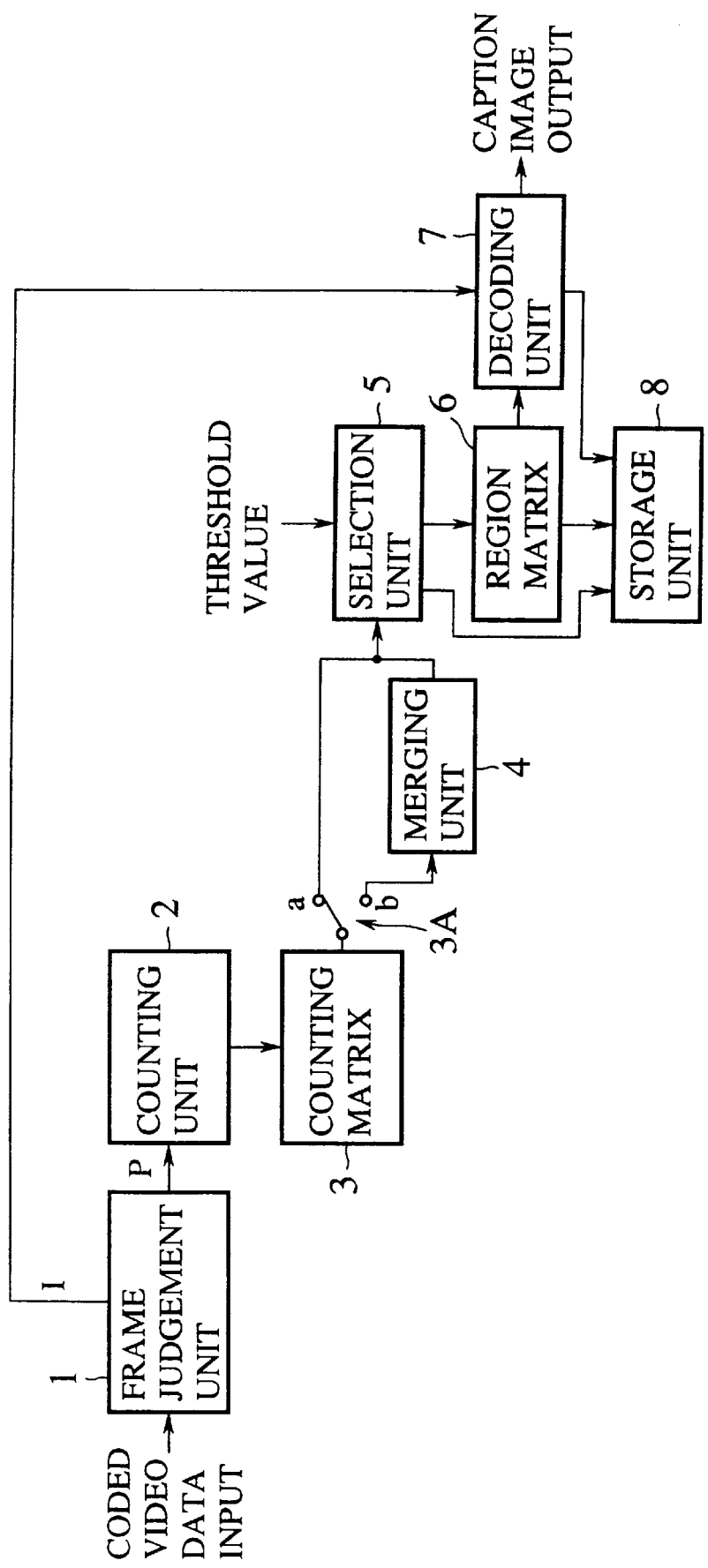
FIG. 13 is a block diagram showing an exemplary configuration of a video caption detection apparatus for realizing the first embodiment of the video caption detection scheme according to the present invention.

FIG. 13 shows an exemplary configuration of a video caption detection apparatus for realizing the first embodiment of the video caption detection scheme according to the present invention.

Here, it is assumed that the input coded video data are given in a form of video data coded according to the MPEG scheme as an example of the video data coded by utilizing the inter-frame correlation. The coded video data can be any of data stored in the storage media such as video tapes or magnetic disks, data transmitted by the radio or wire broadcasting, or data transmitted through the LAN or telephone network.

In the apparatus of FIG. 13, frames which are coded by the inter-frame predictive coding (P frames) and frames which are coded by the intra-frame predictive coding (I frames) are judged at a frame judgement unit 1. The P frames are then given to a counting unit 2 for producing a counting matrix 3. A detail of this counting unit 2 will be described below with reference to FIG. 14.

The counting matrix 3 can be selectively given to a merging unit 4 by the function of a switch 3A. When the switch 3A is set to a switch position b, the counting matrix 3 is given to the merging unit 4 which carries out the merging by using the Gaussian filter as described in the second specific implementation of FIG. 10.

The counting matrix 3 or the output of the merging unit 4 is then given to a selection unit 5 for producing a region matrix 6 by using the comparison with the threshold value. A detail of this selection unit 5 will be described below with reference to FIG. 15.

The region matrix 6 is then given to a decoding unit 7 which decodes the macro-blocks at positions where the region matrix 6 have values "1" within the intra-frame predictive coded frame outputted from the frame judgement unit 1 and outputs the decoded result as the caption image.

Also, a storage unit 8 stores an information regarding the caption region and the region matrix 6 outputted by the selection unit 5 along with the caption image outputted by the decoding unit 7.

Next, with reference to FIG. 14, a detail of the counting unit 2 in the apparatus of FIG. 13 will be described.

Figure 14:
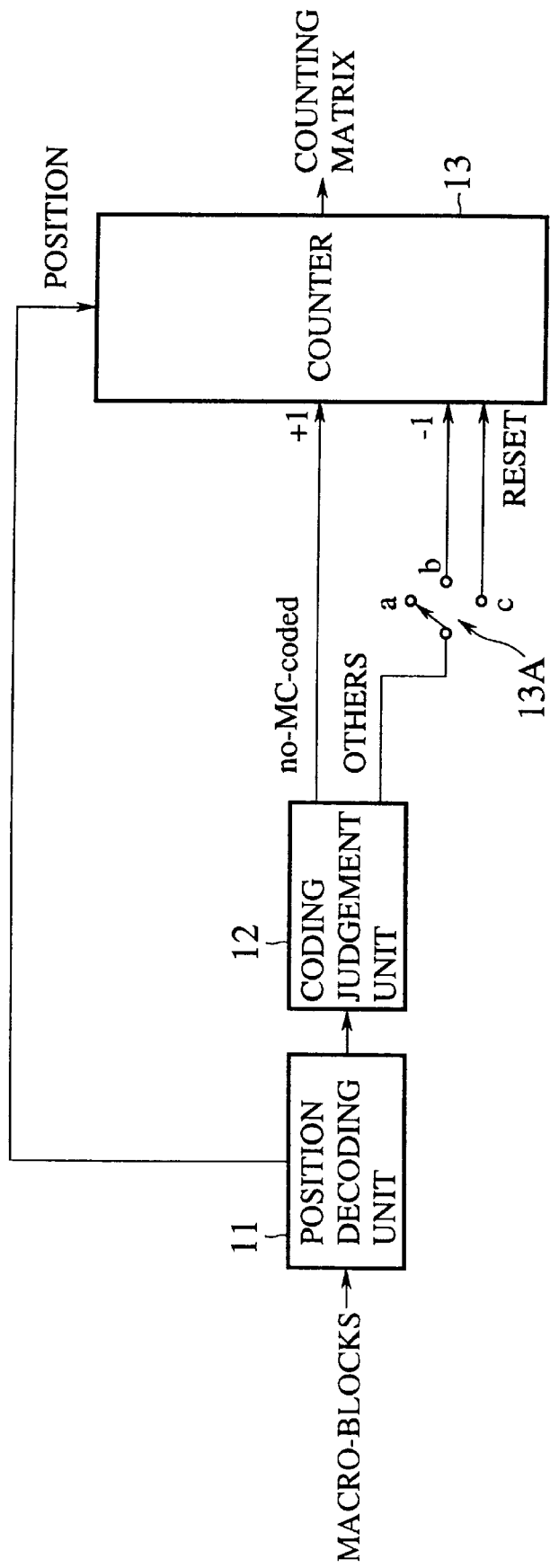
FIG. 14 is a block diagram showing a detailed configuration of a counting unit in the apparatus of FIG. 13.

To the counting unit shown in FIG. 14, the macro-blocks are sequentially entered. First, only a symbol indicating a position of the macro-block is decoded by a position decoding unit 11 as a counter position information to be given to a counter 13. Then, a type of coding is judged at a coding judgement unit 12, so as to judge whether it is coded by using the inter-frame correlation without using the motion compensation (denoted as "no-MC-coded" in FIG. 14) or not. This judgement result is used for incrementing/decrementing or resetting the counter 13. By using switch positions a, b or c of a switch 13A, it is possible to realize a desired one of the three realizations of FIG. 3 to FIG. 5 described above. Finally, a counter value obtained by the counter 13 is outputted as the counting matrix.

Next, with reference to FIG. 15, a detail of the selection unit 5 in the apparatus of FIG. 13 will be described.

Figure 15:
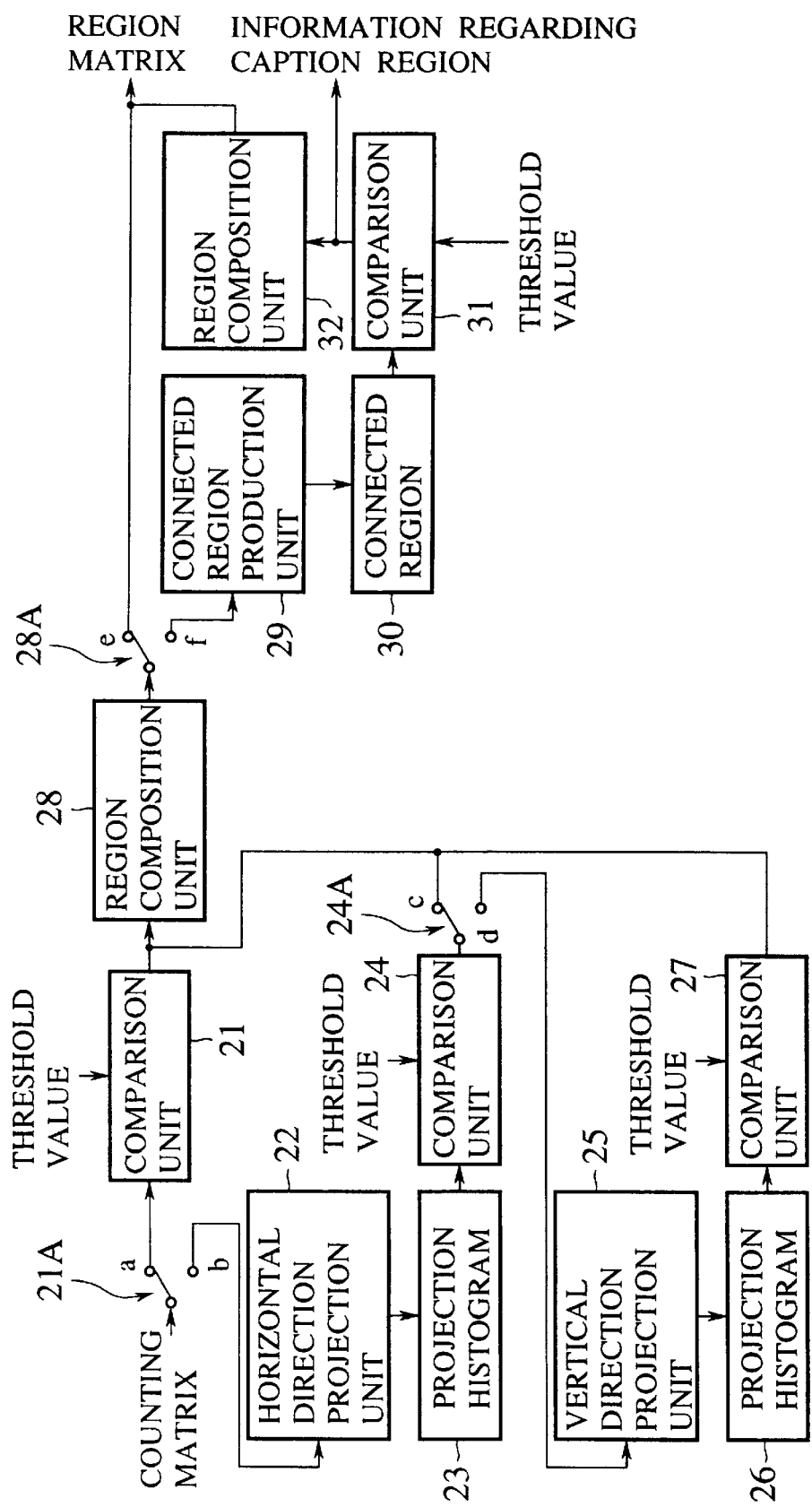
FIG. 15 is a block diagram showing a detailed configuration of a selection unit in the apparatus of FIG. 13.

To the selection unit shown in FIG. 15, the counting matrix is entered. When a switch 21A is at a switch position a, the count values in the counting matrix and the threshold value are compared at a comparison unit 21 according to the first realization of FIG. 6 described above, and a region matrix is produced at a region composition unit 28.

When the switch 21A is at a switch position b, the counting matrix is handled according to the second or third realization of FIG. 7 or FIG. 8 described above. In this case, the counting matrix is projected into the horizontal direction at a horizontal direction projection unit 22 to produce a projection histogram 23, and the obtained projection histogram value and the threshold value are compared at a comparison unit 24.

When a switch 24A is at a switch position c, the comparison result obtained by the comparison unit 24 is directly entered into the region composition unit 28 for producing the region matrix according to the second realization of FIG. 7. When the switch 24A is at a switch position d, the projection histogram 23 is further projected into a vertical direction by a vertical direction projection unit 25 to produce a projection histogram 26. Then, the obtained projection histogram value and the threshold value are compared at a comparison unit 27, and the comparison result obtained by the comparison unit 27 is entered into the region composition unit 28 for producing the region matrix according to the third realization of FIG. 8.

Next, when a switch 28A is at a switch position e, the region matrix produced by the region composition unit 28 is directly outputted. When the switch 28A is at a switch position f, connected regions 30 are produced by a connected region production unit 29 according to the fourth realization of FIG. 9 described above. The individual connected region is then compared with the threshold value at a comparison unit 31, and according to the comparison result obtained by the comparison unit 31, a final region matrix is produced and outputted by a region composition unit 32. In addition, the information regarding the caption region is also outputted and given to the storage unit 8 of FIG. 13 according to the comparison result obtained by the comparison unit 31.

It is to be noted here that the first embodiment described above can be modified by setting the counting period variously. For example, the counting period can be set equal to a period of a scene between one shot boundary and another shot boundary, or to a constant time interval.

It is also possible to use a configuration for improving the caption detection accuracy by using the conventionally known caption detection scheme after the caption region is decoded according to the first embodiment.

It is also possible to use a configuration for carrying out the text recognition after the caption region is decoded according to the first embodiment.

It is also possible to store a decoded original image data for the individual caption region as an information regarding the individual caption region to be stored at the storing step.

When the caption represents characters, it is also possible to store character recognition results obtained from the caption region as an information regarding the individual caption region to be stored at the storing step.

As described, according to the first embodiment, a portion in the coded video data at which the pixels coded by using the inter-frame correlation without using the motion compensation are concentrated time-wise and space-wise is extracted as the caption region, so that it is possible to detect the caption region without decoding the coded video data into frame images. Consequently, it becomes possible to detect the caption region from the coded video data at high speed and low processing cost.

In addition, according to the first embodiment, the information regarding the caption region can be stored while extracting the caption region at high speed and low processing cost without decoding the coded video data into frame images, so that it becomes easier to carry out the processing such as retrieval and editing based on the video content while detecting the caption region at high speed without decoding the coded video data into frame images, and it also becomes possible to produce the image data in which only the caption region is decoded from the coded video data.

Referring now to FIG. 16 to FIG. 27, the second embodiment of a video caption detection scheme according to the present invention will be described in detail.

Figure 16:
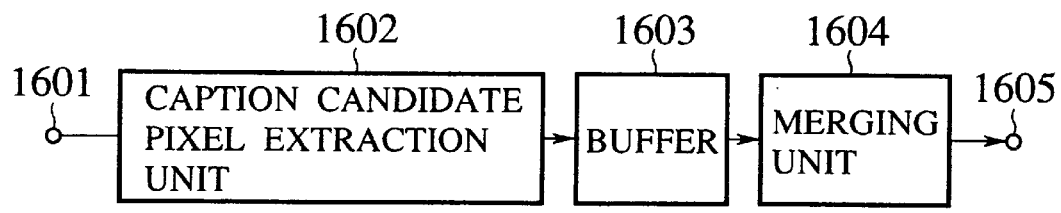
FIG. 16 is a block diagram showing one exemplary schematic configuration of a video caption detection apparatus in the second embodiment of the video caption detection scheme according to the present invention.

FIG. 16 shows one exemplary schematic configuration of a video caption detection apparatus in the second embodiment of a video caption detection scheme according to the present invention.

In this video caption detection apparatus of FIG. 16, the video data are entered at an input 1601, and a caption candidate pixel extraction unit 1602 detects each pixel or set of pixels which is a candidate for the caption region from the entered video data. For example, 8×8 or 16×16 block can be used for a set of pixels.

Figure 17:
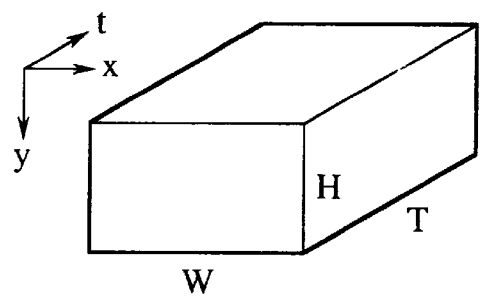
FIG. 17 is a diagram for explaining three axes defining a three-dimensional buffer used in the apparatus of FIG. 16.

The extracted caption candidate pixel is then stored in a buffer 1603. The buffer 1603 is a three-dimensional storage expressed in terms of spatial axes x and y which run parallel to the image field and a time axis t which runs perpendicular to the image field as indicated in FIG. 17. For example, in a case of using 16×16 block in the image field of 720×480 pixels, the buffer 1603 has a width W=45 and a height H=30. The thickness T of the buffer 1603 is set equal to a time of a video to be handled divided by a time resolution. For example, in a case of processing the video lasting for 10 minutes at 0.5 second interval, the buffer 1603 has the thickness T=1200. By means of this buffer 1603, it becomes possible to handle the video which is longer than what can be handled conventionally.

Then, a merging unit 1604 merges the caption candidate pixels stored in the buffer 1603 space-wise as well as time-wise and a merged caption candidate pixel is outputted from an output 1605. By means of this merging unit 1604, it becomes possible to remove an influence of noises by ignoring short and minute changes.

Figure 18:
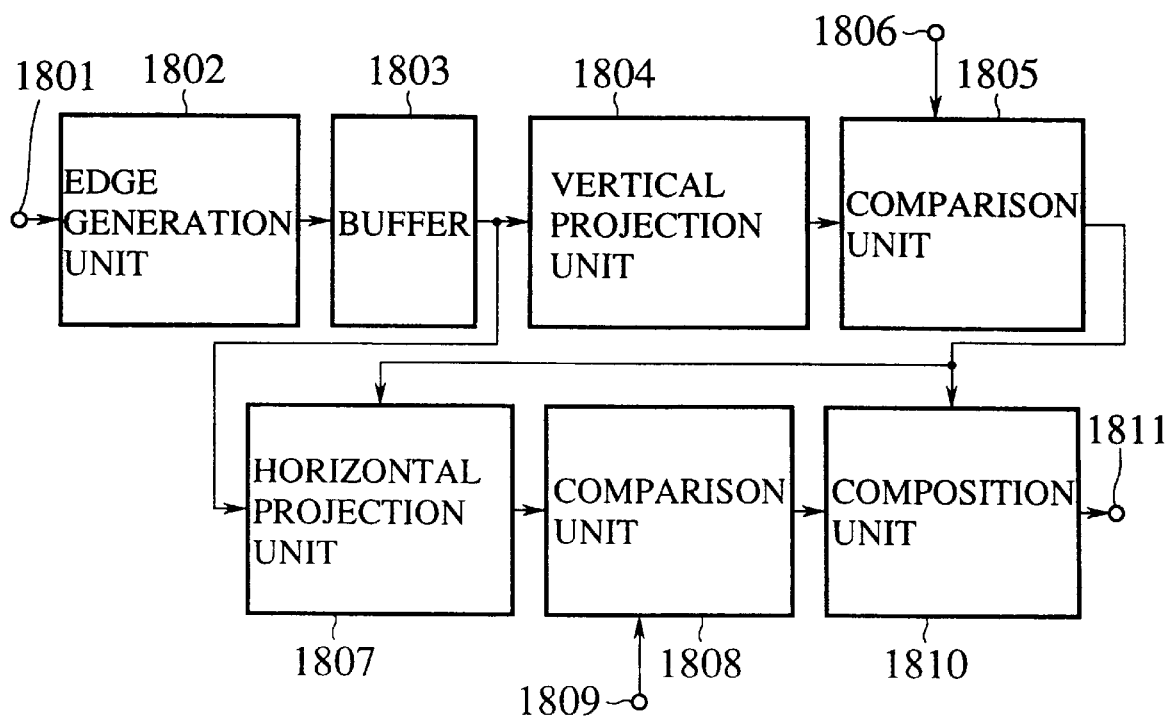
FIG. 18 is a block diagram showing one exemplary configuration of a caption candidate pixel extraction unit in the apparatus of FIG. 16.

FIG. 18 shows one exemplary configuration of the caption candidate pixel extraction unit 1602 in the video caption detection apparatus of FIG. 16.

In this caption candidate pixel extraction unit of FIG. 18, the video data are entered from an input 1801, and an edge generation unit 1802 obtains an edge image from the entered video data and stores the obtained edge image in a buffer 1803. Here, in order to obtain the edge image, it is possible to use the first or second order derivative operators, such as Sobel, Roberts, Laplacian, etc. For example, the Roberts operator is defined as:

$$e(x, y) = |s(x, y) - s(x+1, y+1)| + |s(x+1, y) - s(x, y+1)|$$

where $e(x, y)$ and $s(x, y)$ are pixel values of the edge image and the source image at the position $(x, y)$, respectively. By means of this edge generation unit 1802, it is possible to obtain the edge image in which edges are concentrated around the caption, in accordance with the characteristic that the caption has large high frequency components.

Figure 19:
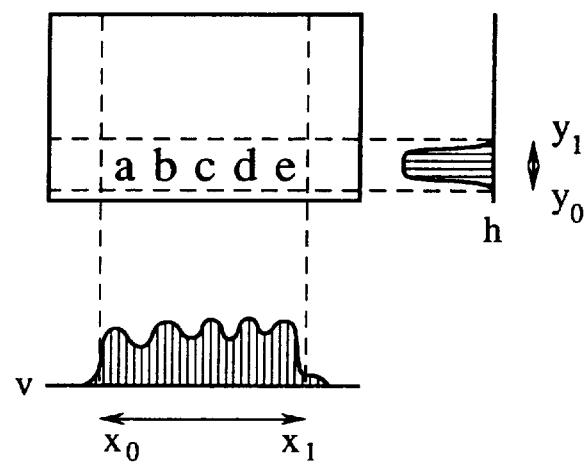
FIG. 19 is a diagram for explaining projection operations used in the caption candidate pixel extraction unit of FIG. 18.

Next, a vertical projection unit 1804 projects the edge image into the vertical direction so as to obtain the projection counts which are high for portions at which edges are concentrated as indicated in FIG. 19. The obtained projection counts are then compared with a prescribed threshold value 1806 at a comparison unit 1805, so as to obtain a range (x0 to x1) for which the projection counts are greater than or equal to the prescribed threshold value.

Next, only with respect to the range (x0 to x1), a horizontal projection unit 1807 projects the edge image into the horizontal direction so as to obtain the projection counts. The obtained projection counts are then compared with a prescribed threshold 1809 at a comparison unit 1808, so as to obtain a range (y0 to y1) for which the projection counts are greater than or equal to the prescribed threshold value.

In this manner, it becomes possible to evaluate the level of concentration of edges one-dimensionally.

Then, a composition unit 1810 obtains a caption candidate pixel as a portion at which edges are concentrated, by setting a pixel value of a portion within the obtained ranges (x0 to x1) and (y0 to y1) as "1" and a pixel value for any other portion as "0", and outputs the obtained caption candidate pixel from an output 1811.

Note that when the vertical projection produces more than one ranges for which the projection counts are greater than or equal to the prescribed threshold value, the horizontal projection is to be carried out with respect to each one of these more than one ranges.

It is also to be noted that an order of the vertical projection unit 1804 and the horizontal projection unit 1807 may be interchanged if desired.

Figure 20:
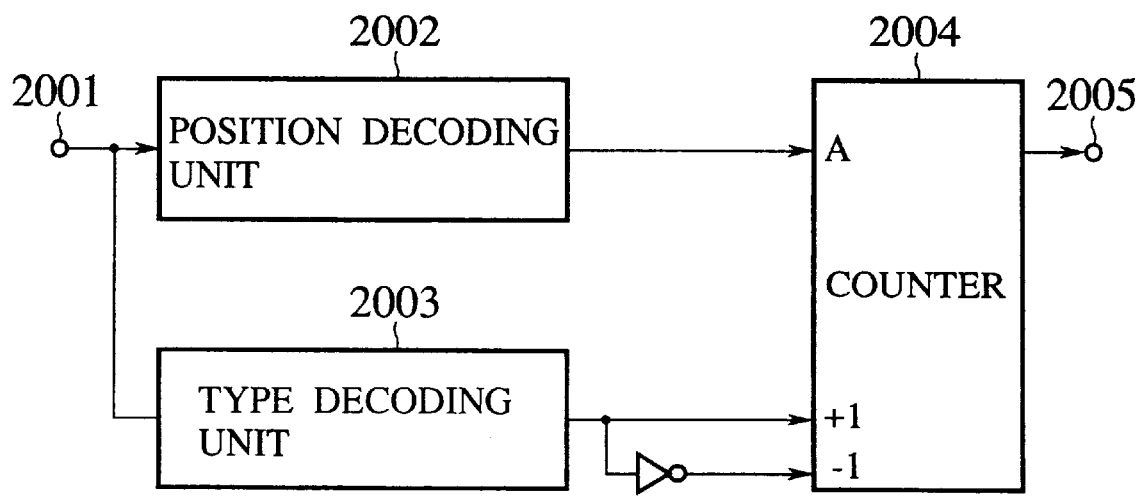
FIG. 20 is a block diagram showing another exemplary configuration of a caption candidate pixel extraction unit in the apparatus of FIG. 16.

FIG. 20 shows another exemplary configuration of the caption candidate pixel extraction unit 1602 in the video caption detection apparatus of FIG. 16. This caption candidate pixel extraction unit of FIG. 20 is suitable for handling the video data coded by using the inter-frame correlation such as those of MPEG.

In this caption candidate pixel extraction unit of FIG. 20, the coded video data are entered from an input 2001, and a position decoding unit 2002 decodes a position of each pixel and the obtained pixel position is entered into an address (A) terminal of a counter 2004.

Similarly, a type decoding unit 2003 decodes a type of coding of each pixel. In this type decoding unit 2003, a value "1" is outputted only when a pixel is coded by using the inter-frame correlation without using the motion compensation, and a value "0" is outputted otherwise. The output signal of the type decoding unit 2003 controls increment/decrement of the counter 2004.

Each count value of the counter 2004 is incremented/decremented within the counting period, and the resulting count value is directly outputted as the caption candidate pixel from an output 2005. After the caption candidate pixel is outputted, all the count values of the counter 2004 are reset to "0".

Thus, in this caption candidate pixel extraction unit of FIG. 20, a number of pixels which are coded by using the inter-frame correlation without using the motion compensation is counted at each pixel position within a prescribed counting period, from the video data coded by using the inter-frame correlation. The caption has a property that pixels coded by using the inter-frame correlation without using the motion compensation tend to be concentrated at the caption, so that the obtained count value is large for the pixels of the caption. Consequently, it is possible to obtain the caption candidate pixel which has a larger count value for a higher likelihood of actually being the caption pixel.

Next, one exemplary implementation of the merging unit 1604 in the video caption detection apparatus of FIG. 16 which uses the three-dimensional smoothing filter will be described in detail.

In this case, as a three-dimensional smoothing filter, the three-dimensional Gaussian filter defined by:

$$G(x, y, z) = \frac{1}{(2\pi\sigma^2)^{1.5}} \exp\left(-\frac{x^2 + y^2 + z^2}{2\sigma^2}\right)$$

can be used.

This three-dimensional Gaussian filter is to be convoluted with respect to a pixel B(x, y, t) in the three-dimensional buffer 1603 as follows:

$$Bg(x, y, t) = \sum_{i=-W}^{E} \sum_{j=-H}^{H} \sum_{k=-T}^{T} B(x - i, y - j, t - k) \cdot G(i, j, k)$$

where W is a half width, H is a half height, and T is a half time-wise depth, of the Gaussian filter.

Alternatively, it is also possible to use the one-dimensional Gaussian filter defined by:

$$g(a) = \frac{1}{(2\pi\sigma^2)^{0.5}} \exp\left(-\frac{a^2}{2\sigma^2}\right)$$

which is to be sequentially convoluted in three directions of axes x, y and t, as follows.

$$Bx(x, y, t) = \sum_{i=-W}^{W} B(x - i, y, t) \cdot g(i)$$

$$Bxy(x, y, t) = \sum_{i=-H}^{H} Bx(x, y - i, t) \cdot g(i)$$

$$Bg(x, y, t) = \sum_{i=-T}^{T} Bxy(x, y, t - i) \cdot g(i)$$

By smoothing the caption candidate pixels using the three-dimensional smoothing filter in this manner, it is possible to merge the neighboring caption candidate pixels, while eliminating isolated small caption candidate pixels.

Next, another exemplary implementation of the merging unit 1604 in the video caption detection apparatus of FIG. 16 which uses the dilation processing and the erosion processing will be described in detail.

The dilation processing sets a value of a pixel B(x, y, t) as a maximum value contained in a vicinity R(x, y, t) of that pixel B(x, y, t). Namely, a value of the pixel B(x, y, t) is set equal to a value of the pixel Bd(x, y, t) defined as follows.

Bd(x, y, t)=Max{B(i,j,k)|B(i,j,k) ⊂ R(x,y,t)}

This dilation processing functions to fill in a gap or a hole for which any of width, height, and thickness is smaller than R. For example, when four nearest neighbor dilation processing (using four pixels contiguous to a pixel of interest in up, down, left, and right directions) is applied to an exemplary case depicted in a part (1) of FIG. 21, the result is as depicted in a part (2) of FIG. 21 in which a gap between two shaded regions disappeared and a hole in one shaded region is also filled in.

The erosion processing sets a value of a pixel B(x, y, t) as a minimum value contained in a vicinity R(x, y, t) of that pixel B(x, y, t). Namely, a value of the pixel B(x, y, t) is set equal to a value of the pixel Be(x, y, t) defined as follows.

Be(x, y, t)=Min{B(i,j,k)|B(i,j,k) ⊂ R(x,y,t)}

This erosion processing functions to delete a region for which any of width, height, and thickness is smaller than R. For example, when four nearest neighbor erosion processing is applied to an exemplary case depicted in a part (1) of FIG. 21, the result is as depicted in a part (3) of FIG. 21 in which shaded rectangular regions with a height equal to "2" disappeared.

Figure 21:
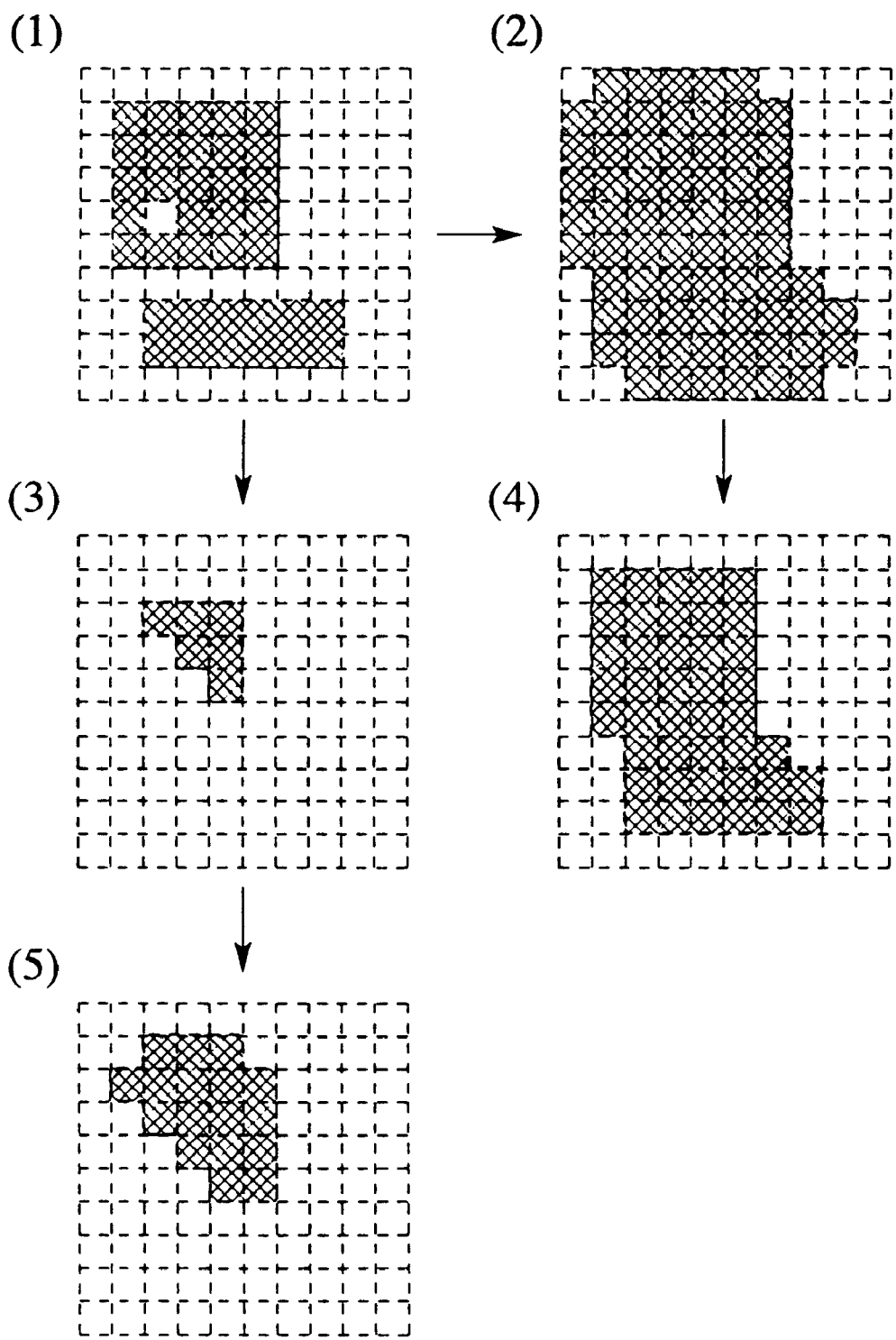
FIG. 21 is a diagram for explaining a dilation processing and an erosion processing that can be used by a merging unit in the apparatus of FIG. 16.

Also, when the erosion processing is applied to the dilation processing result depicted in a part (2) of FIG. 21, the result is as depicted in a part (4) of FIG. 21. When a part (1) and a part (4) of FIG. 21 are compared, it can be seen that a hole and a gap are eliminated while maintaining an overall size. In other words, the dilation and erosion processing functions to supplement missing pixels such as those of a hole and a gap.

Also, when the dilation processing is applied to the erosion processing result depicted in a part (3) of FIG. 21, the result is as depicted in a part (5) of FIG. 21. When a part (1) and a part (5) of FIG. 21 are compared, it can be seen that small regions are eliminated while maintaining an overall size. In other words, the erosion and dilation processing functions to remove noises.

Figure 22:
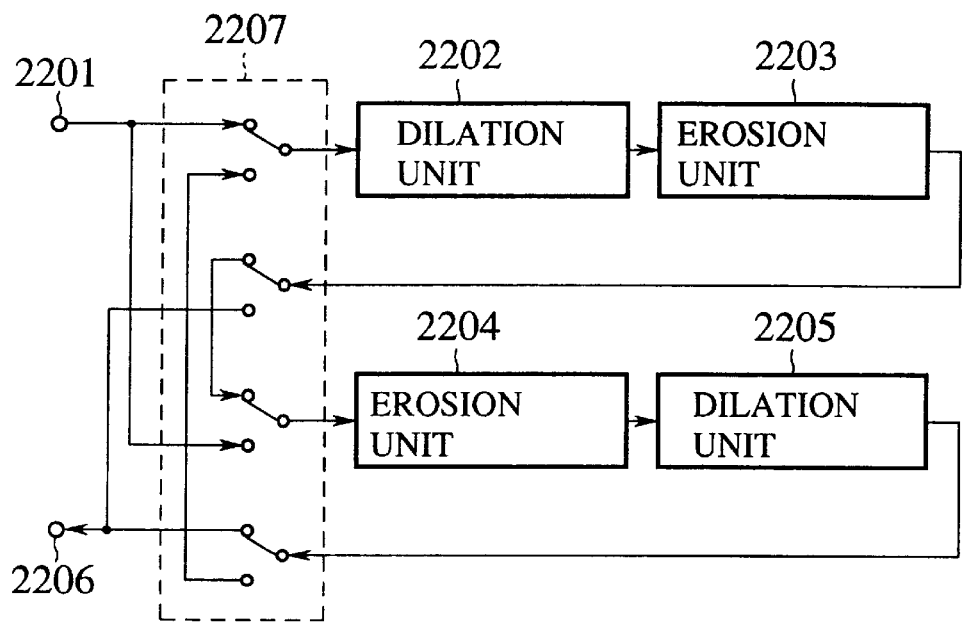
FIG. 22 is a block diagram showing an exemplary configuration of a merging unit in the apparatus of FIG. 16.

In this implementation of the merging unit 1604, a configuration shown in FIG. 22 is to be used so that an order of the dilation and erosion processing and the erosion and dilation processing can be interchanged. Namely, the caption candidate pixel entered from an input 2201 is processed by dilation units 2202 and 2205 and erosion units 2203 and 2204 through four cooperating switches 2207, and outputted from an output 2206. When the switches 2207 are at upper positions, the dilation and erosion processing is carried out first and the erosion and dilation processing is carried out next. When the switches 2207 are at lower positions, the order is reversed so that the erosion and dilation processing is carried out first and the dilation and erosion processing is carried out next.

By carrying out the dilation and erosion processing first, the supplementing of missing pixels can be given a higher priority, whereas by carrying out the erosion and dilation processing first, the removal of noises can be given a higher priority.

By combining the dilation processing and the erosion processing in this manner, it is possible to merge the neighboring caption candidate pixels, while eliminating isolated small caption candidate pixels.

Figure 23:
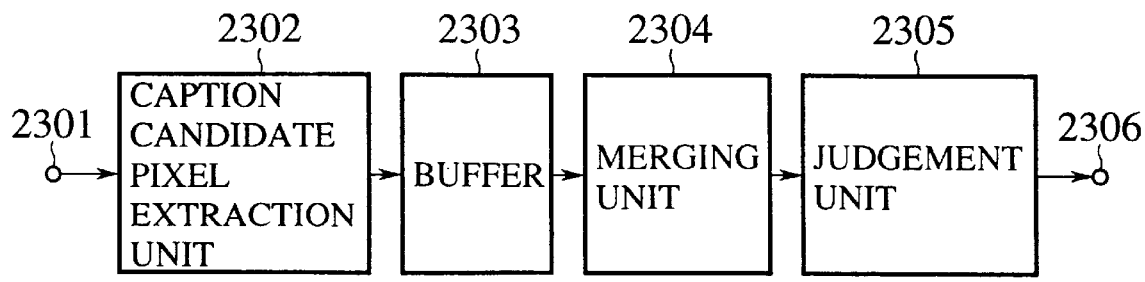
FIG. 23 is a block diagram showing another exemplary schematic configuration of a video caption detection apparatus in the second embodiment of the video caption detection scheme according to the present invention.

FIG. 23 shows another exemplary schematic configuration of a video caption detection apparatus in the second embodiment of a video caption detection scheme according to the present invention, in which a judgement unit is added to a configuration of FIG. 16.

In this video caption detection apparatus of FIG. 23, the video data are entered at an input 2301, and a caption candidate pixel extraction unit 2302 detects each pixel or set of pixels which is a candidate for the caption region from the entered video data. The extracted caption candidate pixel is then stored in a buffer 2303, and a merging unit 2304 merges the caption candidate pixels stored in the buffer 2303. Then, a representative frame for representing the caption is judged from the merged caption candidate pixel at a judgement unit 2305, and outputted from an output 2306.

Next, one exemplary implementation of the judgement unit 2305 in the video caption detection apparatus of FIG. 23 will be described in detail.

In this implementation, a frame immediately before or after a time section in which no caption candidate pixel exists is to be judged as a representative frame for representing the caption.

For example, suppose that captions A to G are arranged in time as depicted in FIG. 24, in which a horizontal axis represents a time axis (t-axis) and a vertical axis represents a space axis (x-axis or y-axis). In FIG. 24, F1 to F4 indicate frames immediately after time sections in which no caption candidate pixel exists, while Fi to Fiv indicate frames immediately before time sections in which no caption candidate pixel exists.

By using F1 to F4 as the representative frames, the captions A, B, D, F and G can be reflected in the representative frames but the captions C and E which appear while the other caption is appearing will not be reflected in the representative frames. On the other hand, by using Fi to Fiv as the representative frames, the captions A, B, C, D and F can be reflected in the representative frames but the captions E and G which disappear while the other caption is still appearing will not be reflected in the representative frames.

The detection of the time section at which no caption candidate pixel exists can be realized relatively easily, so that this implementation has an advantage of being simple and easy.

Next, another exemplary implementation of the judgement unit 2305 in the video caption detection apparatus of FIG. 23 which uses the labeling will be described in detail.

FIG. 25 shows an exemplary configuration of the judgement unit in this implementation, in which the caption candidate pixel is entered at an input 2501, and a connected component with respect to neighboring pixels is obtained and labeled by a labeling unit 2502 and stored in a label information memory 2503 as a label information. By means of this labeling unit 2502, it becomes possible to identify each caption individually.

The label information is managed in a table form shown in FIG. 26A, where a position of a label is expressed in terms of coordinate values of a circumscribing rectangular parallelepiped as indicated in FIG. 26B.

Then, a judging unit 2504 selects a time t within a range of $t0 \leq t \leq t1$ as a time of the representative frame, which is outputted from an output 2506.

For example, suppose that captions A to G are arranged in time as depicted in FIG. 27, similarly as in FIG. 24. In this implementation, it is possible to identify each one of the captions A to G and obtain a corresponding time range. In FIG. 27, T1 to T6 indicate timings of the representative frames for the captions A to G, each of which is obtained by selecting a frame (t0) at which each caption appears. Consequently, it is possible to obtain the representative frames for representing the individual captions accurately in this implementation.

Note that a frame (t1) immediately before each caption disappears or an intermediate frame between t0 and t1 may be used as the representative frame instead of t0.

It is also to be noted that the second embodiment of a video caption detection scheme can be further modified to display the representative frames and produce a list of the video captions according to the caption detection result.

As described, according to the second embodiment, it is possible to eliminate an erroneous detection due to a brief appearance of an imaged object which resembles the caption, and the temporal caption detection overlooking due to the image quality degradation or noises can be compensated, so that the captions can be detected accurately from the video.

Referring now to FIG. 28 to FIG. 41, the third embodiment of a video caption detection scheme according to the present invention will be described in detail.

Figure 28:
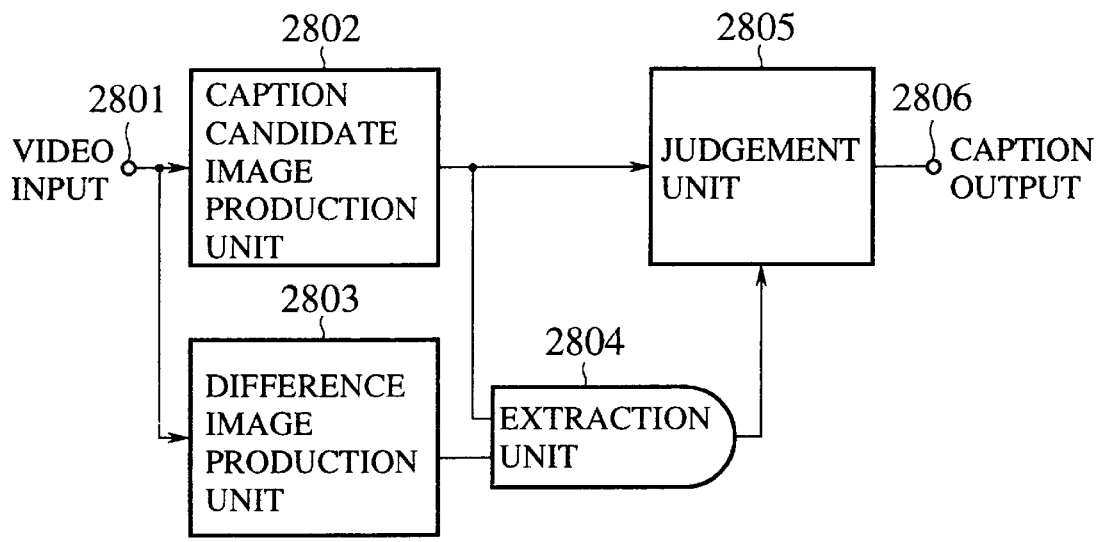
FIG. 28 is a block diagram showing one exemplary schematic configuration of a video caption detection apparatus in the third embodiment of the video caption detection scheme according to the present invention.
Figure 29:
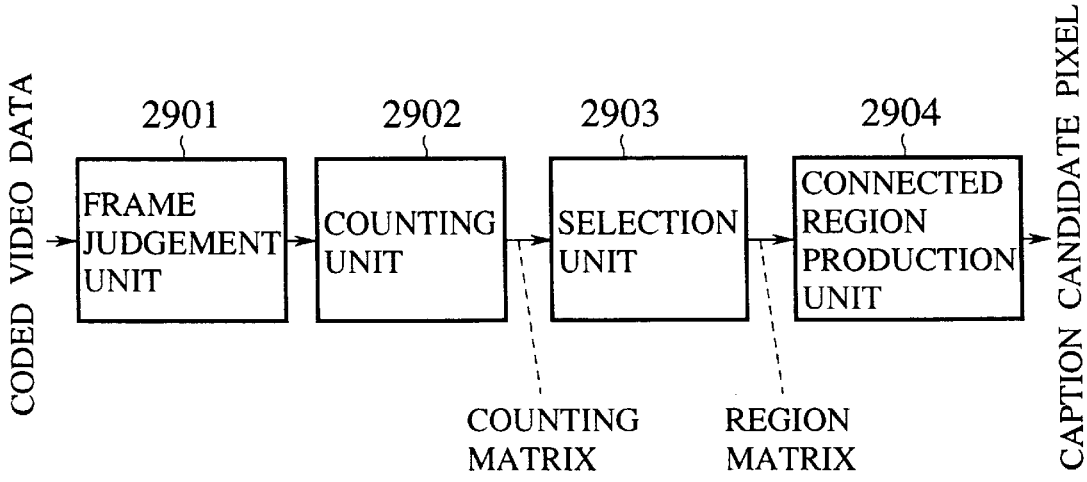
FIG. 29 is a block diagram showing an exemplary configuration of a caption candidate image production unit in the apparatus of FIG. 28.

FIG. 28 shows one exemplary schematic configuration of a video caption detection apparatus in the third embodiment of a video caption detection scheme according to the present invention.

In this video caption detection apparatus of FIG. 28, the video data are entered at an input 2801, and a caption candidate image production unit 2802 produces a caption candidate image from the entered video data, by setting a value of each pixel at which the caption exists as "1" and a value of any other pixel as "0".

On the other hand, a difference image production unit 2803 produces a difference image by setting a value of each pixel as an absolute value of a difference between two time-wise separated frame images. Here, the frame interval between frames used in obtaining a difference may be an interval between adjacent frames, or an interval between frames which are separated by a plurality of frames.

Then, an extraction unit 2804 calculates a logical product between the caption candidate image and the difference image so as to set a value "0" to portions of the difference image at which the caption candidate image has a value "0". Note here that the values other than "0" and "1" used in this embodiment may be given to the caption candidate image, as long as these values have the same meanings as the values "0" and "1" used in this embodiment.

Then, a judgement unit 2805 judges an existence of the caption according to the caption candidate image outputted from the caption candidate image production unit 2802 and the difference image outputted from the extraction unit 2804, and the caption is outputted from an output 2806.

This third embodiment has an advantage in that the difference image is evaluated only at portions at which the caption candidate image exists, so that it becomes possible to detect a switching point between captions.

Note that, for the caption candidate detection at the caption candidate image production unit 2802, it is possible to utilize the video caption detection scheme of the first embodiment described above such as that shown in FIG. 2. In such a case, the caption candidate detection can be realized by a configuration shown in FIG. 29, in which a frame judgement unit 2901 extracts a frame which is coded by using the inter-frame correlation from the coded video data. A counting unit 2902 then counts a frequency of appearances of a macro-block coded by using the inter-frame correlation without using the motion compensation at each macro-block position within a prescribed counting period among the macro-blocks of the extracted frame, so as to obtain the counting matrix. The obtained counting matrix is then entered into a selection unit 2903 which obtains the region matrix for representing the caption region by comparing the count values in the counting matrix with a prescribed threshold value. Then, a connected region production unit 2904 obtains connected regions in the region matrix, and outputs each connected region as the caption candidate image.

Figure 30:
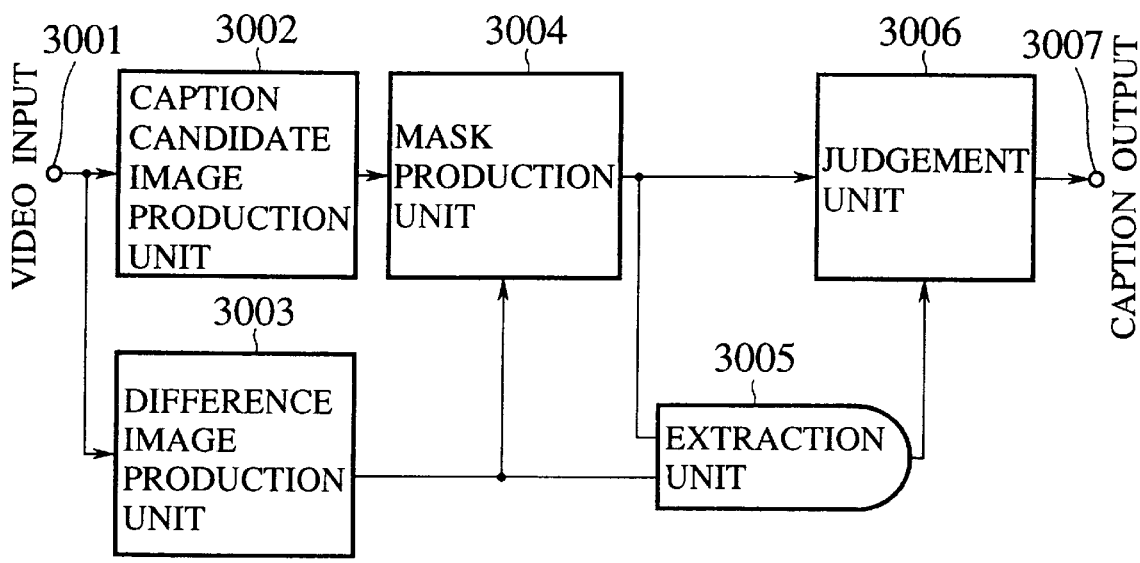
FIG. 30 is a block diagram showing another exemplary schematic configuration of a video caption detection apparatus in the third embodiment of the video caption detection scheme according to the present invention.

FIG. 30 shows another exemplary schematic configuration of a video caption detection apparatus in the third embodiment of a video caption detection scheme according to the present invention.

This video caption detection apparatus of FIG. 30 differs from that of FIG. 28 by further incorporating a mask production unit 3004. In FIG. 30, the input 3001, the caption candidate image production unit 3002, the difference image production unit 3003, the extraction unit 3005, the judgement unit 3006, and the output 3007 are substantially similar to 2801 to 2806 of FIG. 28.

The mask production unit 3004 produces a mask by using the caption candidate image and the difference image by setting a value "1" to regions at which the difference image is to be evaluated or a value "0" to any other regions.

This configuration of FIG. 30 has an advantage over the configuration of FIG. 28 in that regions at which the difference image is to be evaluated can be narrowed down further. For example, when the caption candidate image covers a wider region than a region at which the caption actually exists, it is possible to produce the mask for limiting the region for evaluating the difference image to a region at which the caption actually exists. By means of this, it becomes possible to realize the more accurate caption detection by reducing an influence of the background of the caption.

Figure 31:
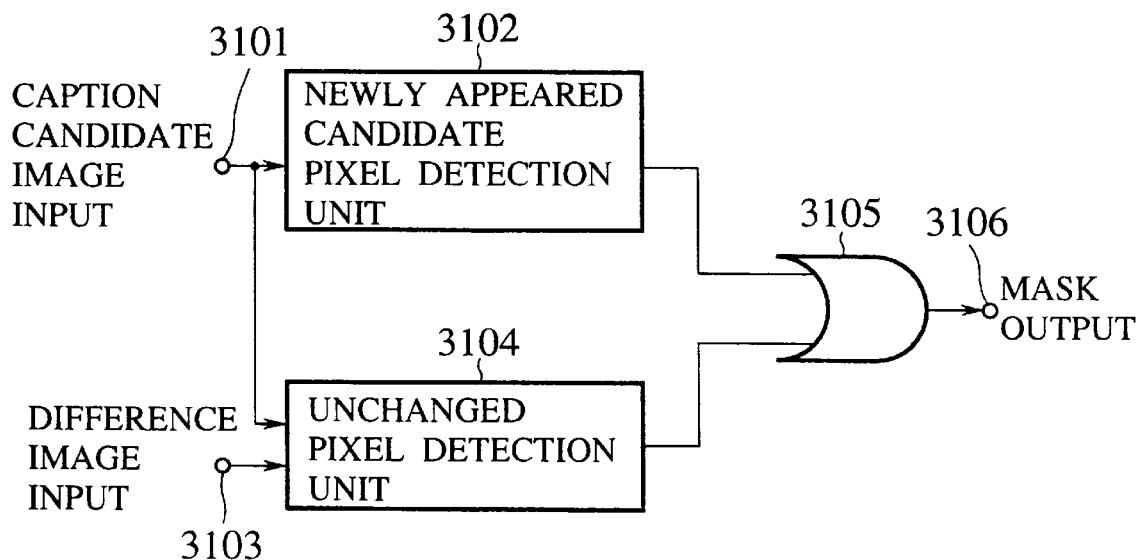
FIG. 31 is a block diagram showing one exemplary configuration of a mask production unit in the apparatus of FIG. 30.

FIG. 31 shows one exemplary configuration of the mask production unit 3004 in the video caption detection apparatus of FIG. 30.

In this mask production unit of FIG. 31, the caption candidate image is entered at an input 3101, and a newly appeared candidate pixel detection unit 3102 compares the entered caption candidate image with the previous frame to extract newly appeared caption candidate pixels. Here, the frame interval used in obtaining a change in the caption candidate image may be an interval between adjacent frames, or an interval between frames which are separated by a plurality of frames, but it is suitable to use the same frame interval as in a case of obtaining the difference image.

On the other hand, the difference image is entered at an input 3103, and an unchanged pixel detection unit 3104 extracts only those pixels for which a pixel value in the difference image is less than a prescribed threshold value and a pixel value in the corresponding caption candidate image is "1".

Then, an OR circuit 3105 calculates OR of the outputs of the newly appeared candidate pixel detection unit 3102 and the unchanged pixel detection unit 3104 so as to produce the mask by setting a value "1" to those pixels for which at least one of the newly appeared candidate pixel detection result and the unchanged pixel detection result has a value "1", and a value "0" to any other pixels. The produced mask is then outputted at an output 3106.

This processing of the mask production unit of FIG. 31 will now be described with reference to FIG. 32. In FIG. 32, parts (1) and (2) indicate the caption candidate image including pixels which constitute the actual caption, which changed in time from a previous frame shown in a part (1) to a current frame shown in a part (2), where lightly shared portions enclosed by solid lines indicate the caption candidate image portions while darkly shared regions indicate the pixels constituting the actual caption. Between (1) and (2), the caption candidate pixels around "C" in the right half of the caption candidate image for a current frame will be detected by the newly appeared candidate pixel detection unit 3102, so that an entire rectangular region on the right side part of the mask shown in a part (3) has a value "1".

Also, between (1) and (2), when a change of pixels in the background portion of "B" is large, only those pixels which constitute the actual caption are detected by the unchanged pixel detection unit 3104, so that a central part of the mask shown in a part (3) has a value "1" only at a portion corresponding to the pixels constituting the caption.

As for "A" in the left half of the caption candidate image for a previous frame, this caption disappears by the timing of (2), so that the corresponding left side part of the mask shown in a part (3) has a value "0".

In this manner, the mask can be produced by setting a value "1" to portions corresponding to the pixels which constitute the caption in a region where the caption does not change, and to portions for which the caption candidate image has a value "1" in a region where the caption newly appeared.

Figure 33:
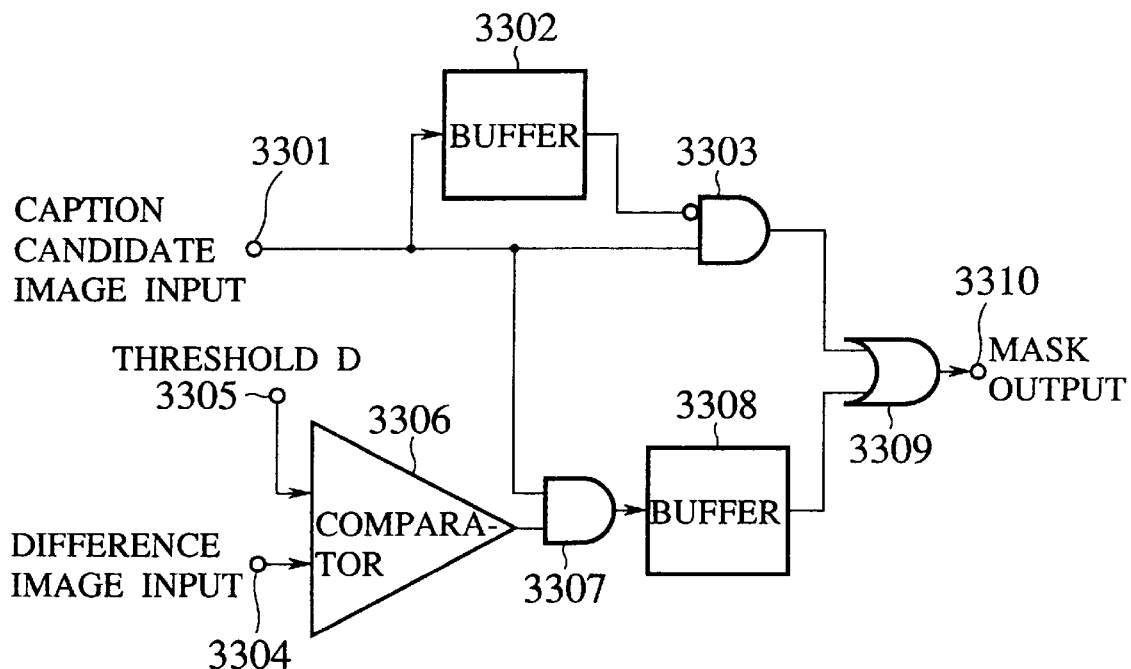
FIG. 33 is a block diagram showing another exemplary configuration of a mask production unit in the apparatus of FIG. 30.

FIG. 33 shows another exemplary configuration of the mask production unit 3004 in the video caption detection apparatus of FIG. 30.

In this mask production unit of FIG. 33, elements 3301 to 3303 constitute the newly appeared candidate pixel detection unit 3102 of FIG. 31, where the caption candidate image is entered at an input 3301, and one frame part of the entered caption candidate image is stored in a buffer 3302. Then, an AND circuit 3303 compares the caption candidate image of the current frame with the caption candidate image of the previous frame as stored in the buffer 3302. Here, a value "1" is outputted when the caption candidate exists only in the current frame and not in the previous frame while a value "0" is outputted otherwise.

On the other hand, elements 3304 to 3308 constitute the unchanged pixel detection unit 3104 of FIG. 31, where the difference image entered at an input 3304 is compared with a threshold D entered at an input 3305 by a comparator 3306. Here, the difference image is compared with the threshold D pixel by pixel, and a value "1" is outputted when the threshold D is greater while a value "0" is outputted otherwise. Then, an AND circuit 3307 sets a value "0" to those pixels which are not in the caption candidate image. One frame part of an output of the AND circuit 3307 is then stored in a buffer 3308.

Then, an OR circuit 3309 calculates OR of an output of the AND circuit 3303 and an output of the buffer 3308 so as to obtain a mask output to be outputted at an output 3310 by setting a value "1" when at least one of the OR circuit inputs has a value "1" and a value "0" when both of the OR circuit inputs has a value "0".

Figure 34:
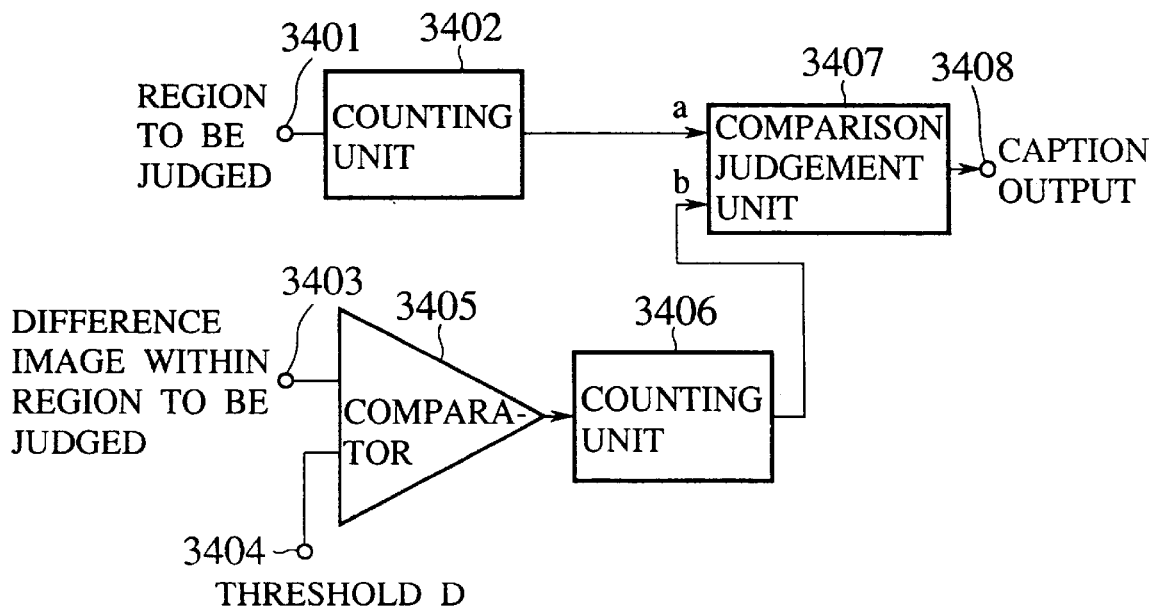
FIG. 34 is a block diagram showing one exemplary configuration of a judgement unit in the apparatus of FIG. 28 or FIG. 30.

FIG. 34 shows one exemplary configuration of the judgement unit 2805 in the video caption detection apparatus of FIG. 28 or the judgement unit 3006 in the video caption detection apparatus of FIG. 30.

In this judgement unit of FIG. 34, an image of a region to be judged is entered at an input 3401, and a counting unit 3402 counts a number of pixels for which a pixel value is "1" in the entered region to be judged. Here, the image of a region to be judged is an image of the caption candidate image produced by the caption candidate image production unit 2802 in a case of the video caption detection apparatus of FIG. 28, or an image of the mask produced by the mask production unit 3004 in a case of the video caption detection apparatus of FIG. 30. By means of this counting unit 3402, an area of the region to be judged is obtained.

On the other hand, a difference image within a region to be judged is entered at an input 3403. Here, the output of the extraction unit 2804 of FIG. 28 or the extraction unit 3005 of FIG. 30 is entered. Then, a comparator 3405 compares a pixel value of each pixel of the entered difference image with a threshold D entered at an input 3404, and outputs a value "1" when the pixel value is greater than the threshold D while outputting a value "0" otherwise. Then, a counting unit 3406 counts a number of value "1" in the output of the comparator 3405. By means of the comparator 3405 and the counting unit 3406, an area of a portion for which the difference is greater than the threshold D within the region to be judged is obtained.

Then, a comparison judgement unit 3407 receives an output of the counting unit 3402 as an input "a" and an output of the counting unit 3406 as an input "b", and outputs a result of comparison between "a" and "b" at an output 3408.

Figure 35:
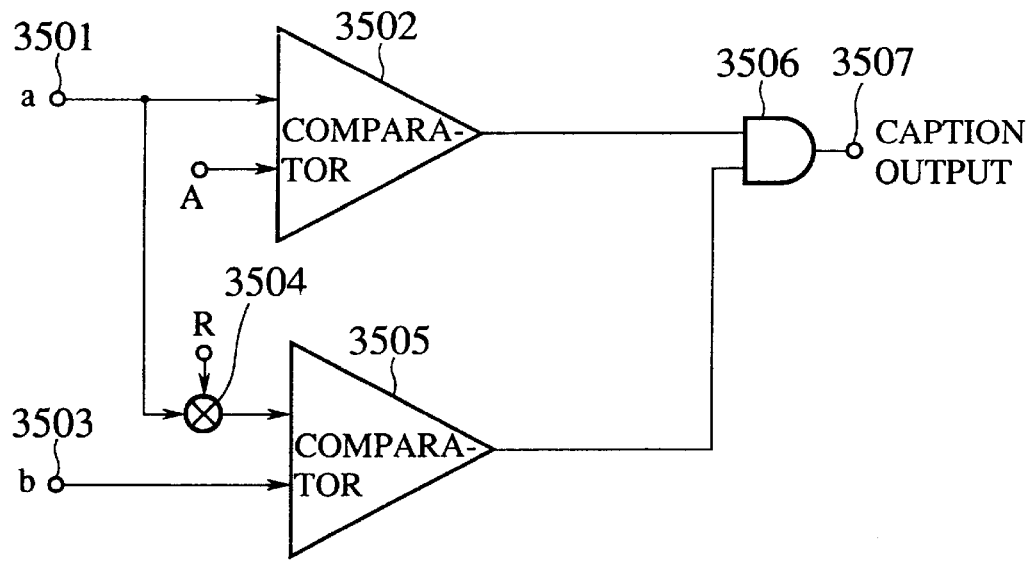
FIG. 35 is a block diagram showing one exemplary configuration of a comparison judgement unit in the judgement unit of FIG. 34.

FIG. 35 shows one exemplary configuration of the comparison judgement unit 3407 in the judgement unit of FIG. 34.

In this comparison judgement unit of FIG. 35, an area "a" of the region to be judged is entered at an input 3501 while an area "b" of a portion for which the difference is greater than the threshold D within the region to be judged is entered at an input 3503. A comparator 3502 compares the area "a" with a prescribed threshold A, and outputs a value "1" when the area "a" is greater than the threshold A while outputting a value "0" otherwise.

On the other hand, a multiplier 3504 multiplies the area "a" with a prescribed value R. Then, a comparator 3505 compares the area "b" with a value "aR" obtained by the multiplier 3504, and outputs a value "1" when a value "aR" is greater than the area "b" while outputting a value "0" otherwise.

Then, an AND circuit 3506 calculates a logical product of the outputs of the comparators 3502 and 3505 so as to output a value "1" when both of the outputs of the comparators 3502 and 3505 are "1" or a value "0" otherwise at an output 3507.

In this comparison judgement unit of FIG. 35, a value "1" is outputted when a>A and aR>b, that is, when the area of the region to be judged in which the caption exists and a change in the frame image is to be checked is sufficiently large, and a change in the frame image within the region to be judged is sufficiently small, while a value "0" is outputted otherwise. When the frame image is largely changed within the region to be judged as captions are switched, the output becomes "0". Consequently, the value "1" is outputted while a certain caption is appearing continuously, and the value "0" is outputted when the caption does not exist or when the captions are switched.

Figure 36:
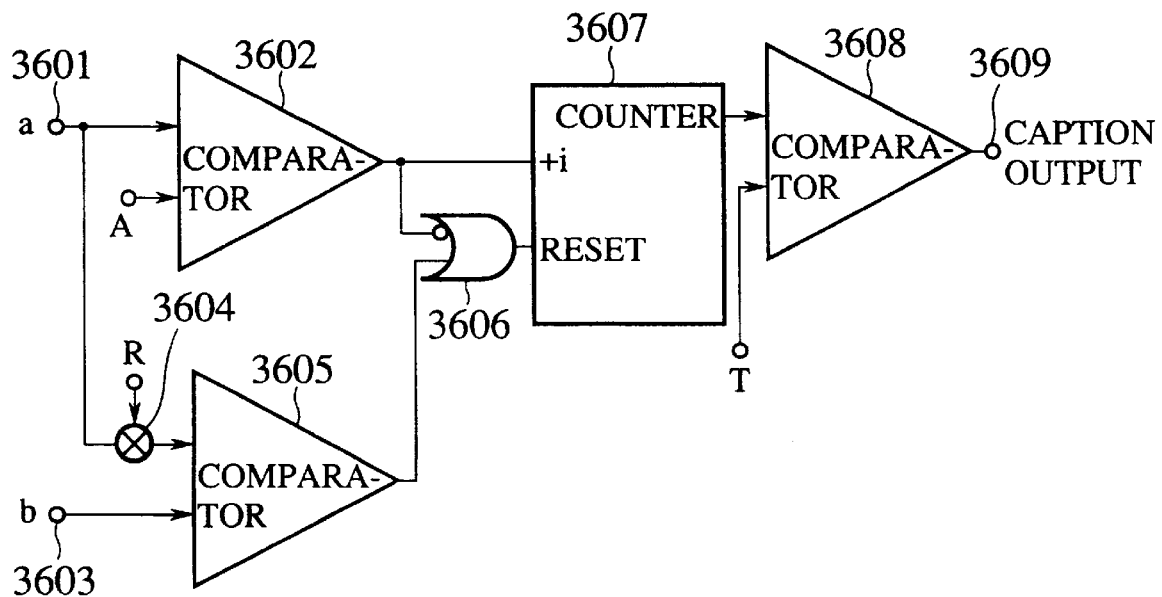
FIG. 36 is a block diagram showing another exemplary configuration of a comparison judgement unit in the judgement unit of FIG. 34.

FIG. 36 shows another exemplary configuration of the comparison judgement unit 3407 in the judgement unit of FIG. 34, which is characterized by incorporating a timer mechanism on the output side.

In this comparison judgement unit of FIG. 36, elements 3601 to 3605 are substantially the same as 3501 to 3505 of FIG. 35, while elements 3606 to 3608 constitute the timer mechanism. An output of the comparator 3602 is entered as an increment signal to a counter 3607, while outputs of the comparators 3602 and 3605 are entered into an OR circuit 3606 which outputs a value "1" when the output of the comparator 3602 is "0" or the output of the comparator 3605 is "1" while outputting a value "0" otherwise. The output of the OR circuit 3606 is entered as a reset signal to the counter 3607. The value of the counter 3607 is compared with a prescribed threshold T by a comparator 3608, which outputs a value "1" when the counter value is greater than the threshold T while outputting a value "0" otherwise at an output 3609.

In this comparison judgement unit of FIG. 36, the counter value is incremented by one when a>A and aR>b, that is, when the area of the region to be judged in which the caption exists and a change in the frame image is to be checked is sufficiently large, and a change in the frame image within the region to be judged is sufficiently small, while the counter value is reset otherwise. When the frame image is largely changed within the region to be judged as captions are switched, the counter is reset. Consequently, the counter value is incremented one by one while a certain caption is appearing continuously, and the counter value is reset when the caption does not exist or when the captions are switched. In other words, the counter 3607 functions to measure a period of time for which the caption continues to appear.

In addition, the comparator 3608 outputs a value "1" when the caption continues over a certain period of time. In this manner, it becomes possible to eliminate the caption which only exists for a short period of time. Even when an imaged object other than the caption erroneously becomes the caption candidate, such an imaged object can be eliminated as long as it continues to appear only for a short period of time.

Figure 37:
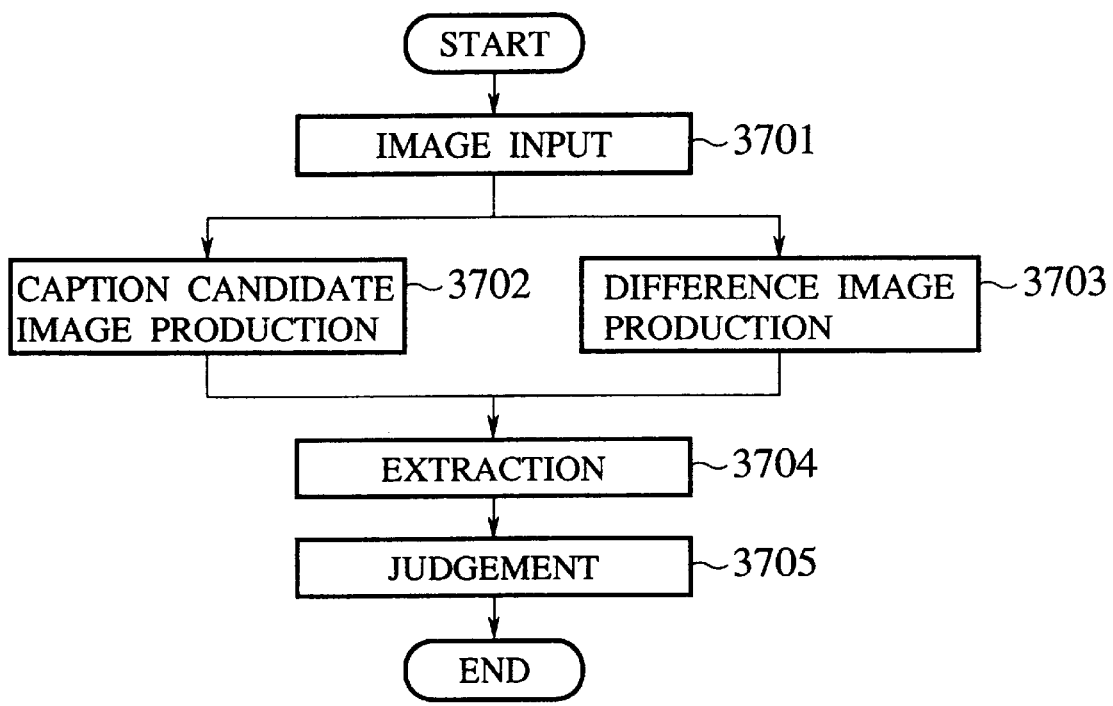
FIG. 37 is a flow chart of the processing in the third embodiment of a video caption detection scheme according to the present invention.

FIG. 37 shows the flow chart of the processing in the third embodiment of a video caption detection scheme according to the present invention.

First, the image in entered at an image input step 3701, and the caption candidate is detected and a caption candidate image which has a value "1" for pixels at which the caption exists and a value "0" for any other pixels is produced at a caption candidate image production step 3702, while a difference image which has pixel values equal to an absolute value of a difference between two time-wise separated frame images is produced at a difference image production step 3703. Here, the frame interval between frames used in obtaining a difference may be an interval between adjacent frames, or an interval between frames which are separated by a plurality of frames. Note that either one of the caption candidate image production step 3702 and the difference image production step 3703 may be executed first.

Then, an extraction step 3704 sets a value "0" to portions of the difference image at which the caption candidate image has a value "0", and a judgement step 3705 judges an existence of the caption.

At this point, various variables used in the following description of the further detail of the processing of FIG. 37 will be described.

The input image is entered into an array "scr", and its individual pixel is denoted as "scr[p]" which is specified by a pixel number "p". A block is formed by one pixel or a set of more than one pixels and specified by a block number "b". The caption candidate image is managed in units of blocks, and denoted as "tel[b]", where tel[b]=1 if it is the caption candidate and tel[b]=0 otherwise. Also, the caption candidate image of the frame in the previous processing step is denoted as "pretel[b]". The difference image is managed in units of pixels, and denoted as "diff[p]". Also, the difference image of the frame in the previous processing step is denoted as "prediff[p]".

Figure 38:
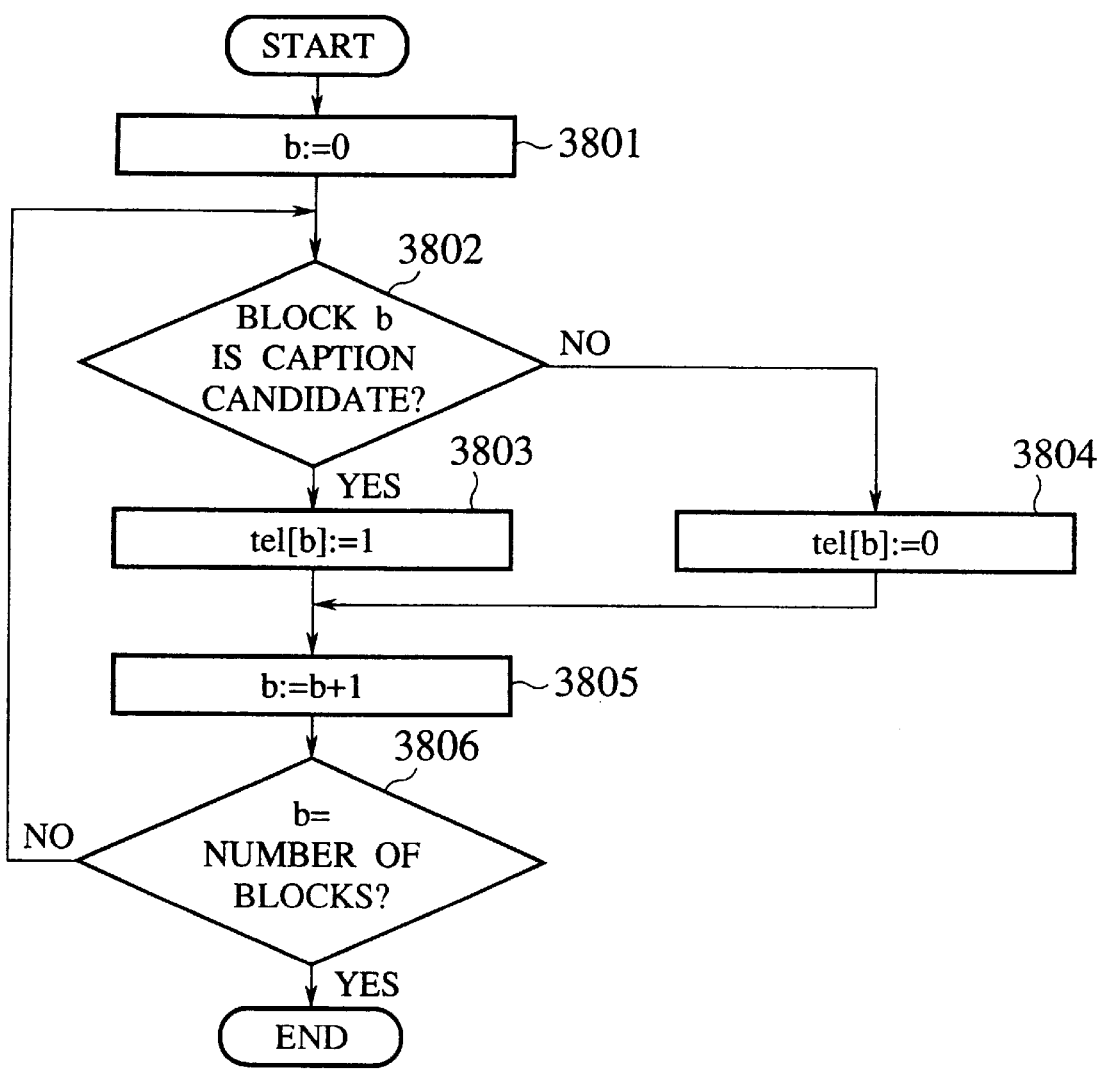
FIG. 38 is a flow chart of a caption candidate image production step in the processing of FIG. 37.

FIG. 38 shows the flow chart of the caption candidate image production step 3702 in the processing of FIG. 37.

First, the block number b is initialized to "0" at the step 3801. Then, whether the block specified by the block number b is the caption candidate or not is checked at the step 3802. When this block is the caption candidate, a value "1" is entered into tel[b] at the step 3803, whereas otherwise a value "0" is entered into tel[b] at the step 3804. Note that, for the caption candidate detection, it is possible to utilize the video caption detection scheme of the first embodiment described above such as that shown in FIG. 2.

Next, a value of the block number b is incremented by one at the step 3805, and whether the block number b is equal to a total number of blocks or not is judged at the step 3806. The processing from the step 3802 to the step 3805 is then repeated until the block number b becomes equal to a total number of blocks. By this procedure of FIG. 38, the caption candidate image tel[b] is produced.

Figure 39:
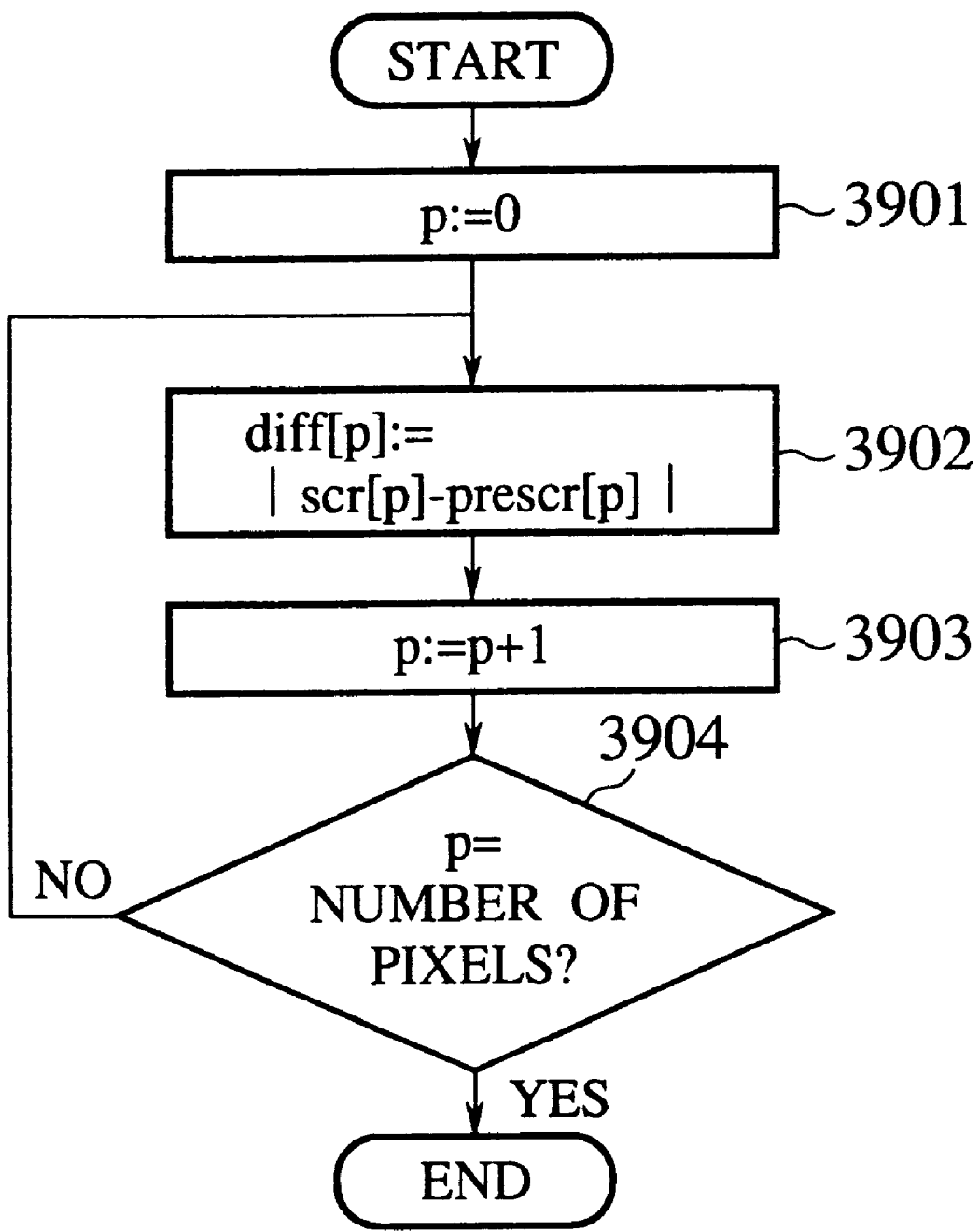
FIG. 39 is a flow chart of a difference image production step in the processing of FIG. 37.

FIG. 39 shows the flow chart of the difference image production step 3703 in the processing of FIG. 37.

First, the pixel number p is initialized to "0" at the step 3901. Then, an absolute value of a difference between a pixel value scr[p] of the current frame and a pixel value prescr[p] of the previous frame is stored into a pixel value diff[p] of the difference image at the step 3902.

Then, the pixel number p is incremented by one at the step 3903, and whether the pixel number p is equal to a total number of pixels or not is judged at the step 3904. The processing from the step 3902 to the step 3903 is then repeated until the pixel number p becomes equal to a total number of pixels. By this procedure of FIG. 39, the difference image diff[p] is produced.

Figure 40:
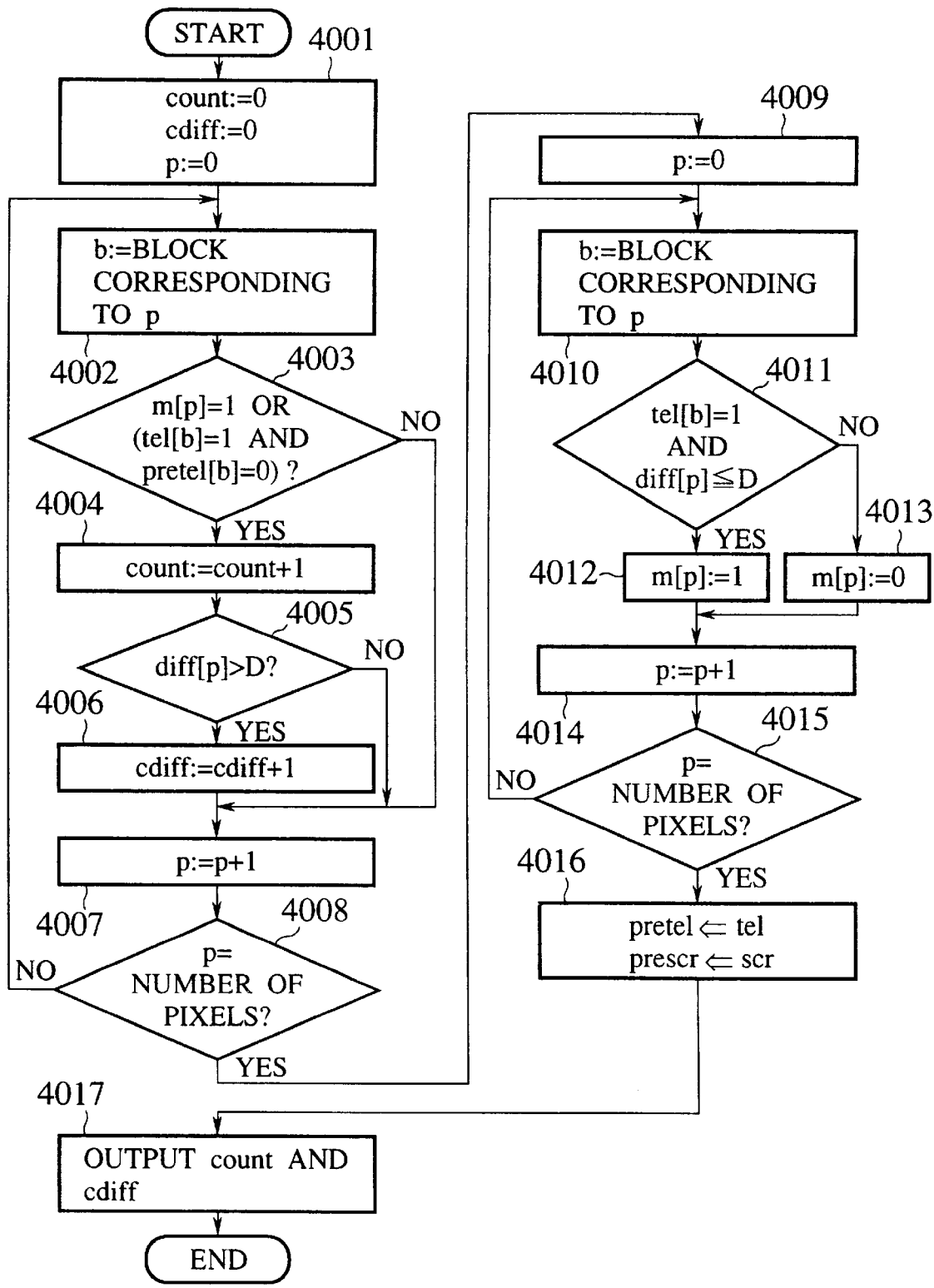
FIG. 40 is a flow chart of an extraction step in the processing of FIG. 37.

FIG. 40 shows the flow chart of the extraction step 3704 in the processing of FIG. 37.

In short, in this third embodiment, a set of either the unchanged pixels or pixels that have newly become the caption candidate among the input images is taken as a region to be judged, and the difference image contained in the region to be judged is extracted. Then, an area "count" of the region to be judged as well as an area "cdiff" of a portion for which the difference image within the region to be judged is large, that is, a portion in which the frame image has changed, are calculated and outputted. Within the region to be judged, the unchanged pixel is denoted as m[p].

First, "count", "cdiff" and the pixel number p are all initialized to "0" at the step 4001. Then, for each pixel number p, the following processing is carried out.

The block number b corresponding to the pixel number p is obtained at the step 4002, and either a condition of m[p]=1 (it is the unchanged pixel) or a condition of both tel[b]=1 and pretel[p]=0 (it is the block of the block number b which is the caption candidate in the current frame but not in the previous frame) holds is judged at the step 4003. If so the processing proceeds to the step 4004 whereas otherwise the processing proceeds to the step 4007. This step 4003 judges whether it is either the unchanged pixel or the pixel which has newly become the caption candidate, or not.

Then, a value of "count" is incremented by one at the step 4004, and whether a pixel value diff[p] of the difference image for the pixel number p is greater than a prescribed threshold D or not is checked at the step 4005. When diff[p] is greater than D, the processing proceeds to the step 4006 at which a value of "cdiff" is incremented by one whereas otherwise the processing proceeds to the step 4007.

Then, a value of the pixel number p is incremented by one at the step 4007, and whether the pixel number p is equal to a total number of pixels or not is judged at the step 4008. The processing from the step 4002 to the step 4007 is then repeated until the pixel number p becomes equal to a total number of pixels.

By the procedure up to this point, it is possible to obtain the area "count" of the region to be judged in which the caption exists and a change in the frame image is to be checked as well as the area "cdiff" of a portion in which the frame image has changed within the region to be judged.

Next, by the processing from the step 4009 to the step 4015, the unchanged pixel m[p] is obtained, and "pretel" and "prescr" are produced. First, the pixel number p is initialized to "0" at the step 4009, and the block number b corresponding to the pixel number p is obtained at the step 4010. Then, whether tel[b]=1 (the block of the block number b is the caption candidate) and diff[p]≦D (the pixel value for the pixel of the pixel number p in the difference image is less than or equal to the threshold D, or not is judged at the step 4011. If so, the processing proceeds to the step 4012 at which the value of m[p] is set equal to "1", whereas otherwise the processing proceeds to the step 4013 at which the value of m[p] is set equal to "0".

Then, a value of the pixel number p is incremented by one at the step 4014, and whether the pixel number p is equal to a total number of pixels or not is judged at the step 4015. The processing from the step 4010 to the step 4014 is then repeated until the pixel number p becomes equal to a total number of pixels.

By the procedure up to this point, it is possible to obtain the unchanged pixel m[p]. This unchanged pixel value will be used in the next extraction step.

Then, the values of "tel" and "scr" for the current frame are copied to "pretel" and "prescr" at the step 4016 as a preparation for the next processing step, and the values of "count" and "cdiff" obtained by the above processing are outputted at the step 4017.

Figure 41:
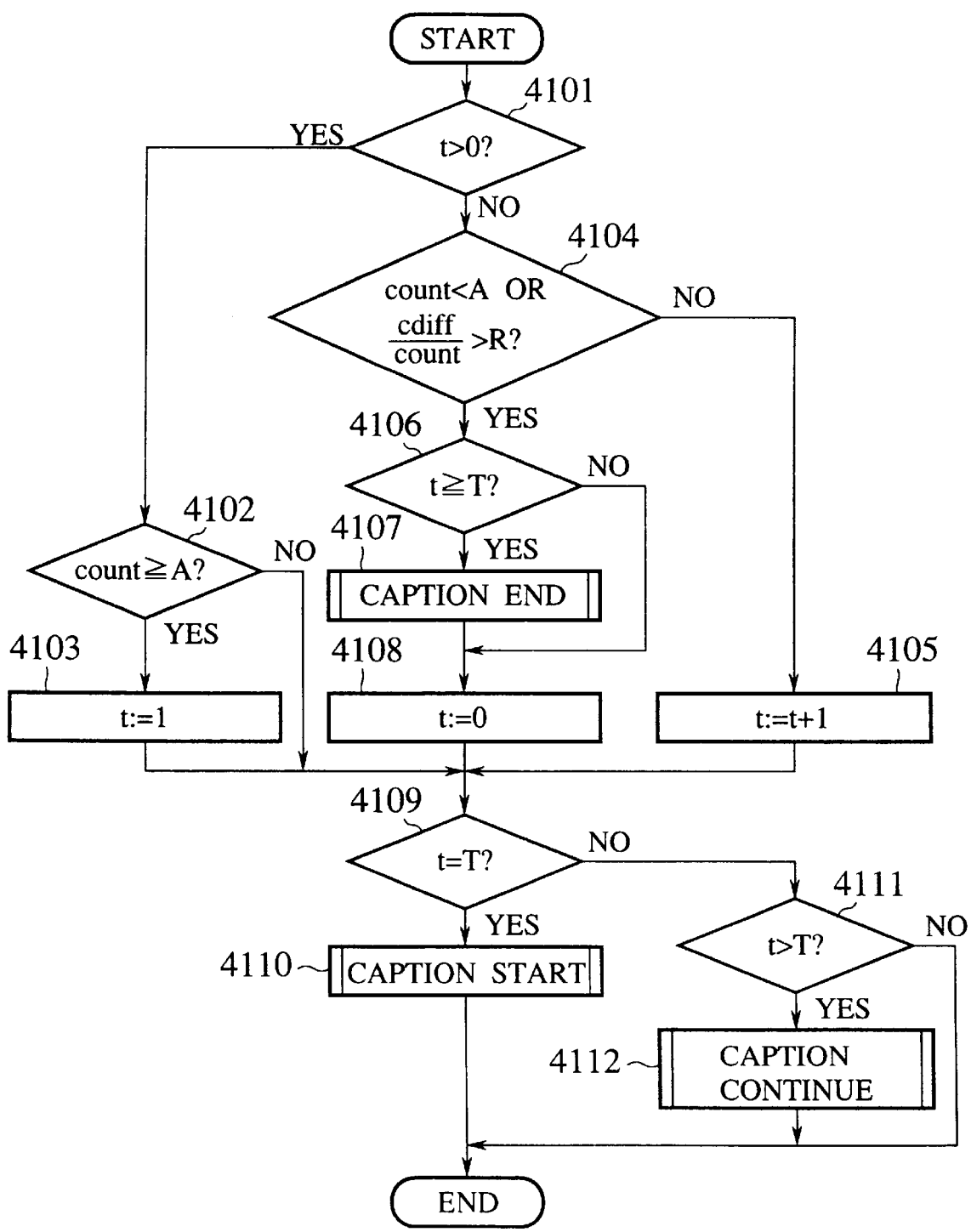
FIG. 41 is a flow chart of a judgement step in the processing of FIG. 37.

FIG. 41 shows the flow chart of the judgement step 3705 in the processing of FIG. 37.

In short, in this third embodiment, the area "count" of the region to be judged in which the change of the frame image is to be checked and the area "cdiff" of a portion in which the frame image has changed within the region to be judged are entered as inputs. A variable t denotes a period of time for which the caption continues to appear, and takes an integer value. The "count" and "cdiff" are compared, and a value of the variable t is incremented one by one while the caption continues to appear, whereas a value of the variable t is reset to "0" when the caption does not exist or the captions are switched. In order to remove the noise appearing for a short period of time, only the caption which lasted longer than a prescribed threshold T is recognized. To this end, the threshold T and the variable t are compared and each case is judged as one of "caption start", "caption continue" and "caption end", so as to execute the corresponding sub-routine.

Here, the sub-routines are not defined specifically in this embodiment, but can be defined depending on the application. For example, to display the status of detection on the screen, drawing functions can be defined as the sub-routines.

First, whether the variable t is greater than "0" or not is checked at the step 4101. When t is greater than "0", that is, when the caption does not exists at a current timing, the processing proceeds to the step 4102, whereas otherwise the processing proceeds to the step 4104.

At the step 4102, the "count" is compared with the threshold A, and only when the "count" is greater than the threshold A, the value of the variable t is set equal to "1" at the step 4103, so as to indicate the start of the caption.

At the step 4104, the "count" is compared with the threshold A while the "cdiff" divided by the "count" is compared with the threshold R, and when either a condition of count <A or a condition of cdiff/count>R holds, the processing proceeds to the step 4106, whereas otherwise the processing proceeds to the step 4105. At this step 4104, whether it is a case in which the caption does not exists or a case in which the image change within the region to be judged is large, or not is checked. At the step 4105, the value of the variable t is incremented by one, as both of the conditions of the step 4104 do not hold, that is, the caption continues to appear.

At the step 4106, either one of the conditions of the step 4104 holds, that is, the caption disappeared or switched, so that whether the variable t is greater than or equal to the threshold T or not is checked. When this condition holds, the "caption start" sub-routine to be described below has already been called, so that the corresponding sub-routine "caption end" is executed at the step 4107. In either case, the value of the variable t is then reset to "0" at the step 4108. The procedure up to this point constitutes the processing for changing the value of the variable t according to the comparison result between the "count" and the "cdiff".

Next, by the processing from the step 4109 to the step 4112, the variable t is compared with the threshold T and the sub-routine "caption start" or "caption continue" is called. First, whether a value of the variable t is equal to the threshold T or not is checked at the step 4109. When they are equal, the sub-routine "caption start" is executed. When they are not equal, whether the variable t is greater than the threshold T is checked at the step 4111, and if so, the sub-routine "caption continue" is called.

It is also to be noted that the third embodiment of a video caption detection scheme can be further modified to output the frame images and produce a list of the video captions according to the finally obtained caption judgement result.

As described, according to the third embodiment, the caption is detected according to the change of the frame images in the region at which the caption exists, so that it is possible to detect a switching point between captions.

Also, according to the third embodiment, the region in which the change of the frame images is to be checked can be limited to the region at which the caption exists, so that it becomes harder to receive an influence of the change in the background of the caption, and it becomes possible to detect a switching point between captions accurately.

Also, according to the third embodiment, it is possible to produce a mask which has a value "1" at a portion corresponding to a pixel which constitutes the continuously appearing caption and a portion of the newly appeared caption where the caption candidate image has a value "1".

Also, according to the third embodiment, a value "1" is outputted while a certain caption is appearing continuously, while a value "0" is outputted when the caption does not exist or the captions are switched. Thus it becomes possible to detect the existence and the switching of the caption according to an area of the caption candidate image and a size of the inter-frame difference.

Also, according to the third embodiment, a period of time for which the caption continues to appear can be measured, and the caption which appears only for a short period of time can be eliminated, so that even when an imaged object other than the caption erroneously becomes the caption candidate, such an imaged object can be eliminated as long as it continues to appear only for a short period of time, so that it becomes possible to detect the caption more accurately.

Referring now to FIG. 42 to FIG. 56, the fourth embodiment of a video caption detection scheme according to the present invention will be described in detail. This fourth embodiment is directed to a case of utilizing the video caption detection scheme of the present invention as described above for the purpose of video retrieval.

First, three methods for expressing the spatial position of a caption on an image field will be described.

Figure 43:
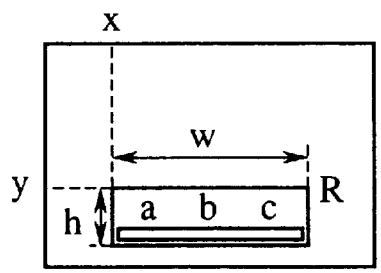
FIG. 43 is a diagram for explaining a first method for expressing a spatial position of a caption on an image field that can be used in the fourth embodiment of the present invention.

FIG. 43 shows the first method for expressing the spatial position of a caption on an image field. This is a method in which each caption is expressed by a combination of coordinates of an upper left corner of a circumscribing rectangle of each caption with width and height sizes of a circumscribing rectangle of each caption. In FIG. 43, a rectangle R which circumscribes the caption is used, and the caption is expressed by a combination (x, y, w, h) given in terms of coordinates (x, y) of the upper left corner, a width w, and a height h of the rectangle R. The advantage of this expression is that a single caption can be expressed by four numerical values. The disadvantage of this expression is that the unnecessary region outside the caption have to be included in a case of the caption in a complicated shape.

Figures 44A, 44B:
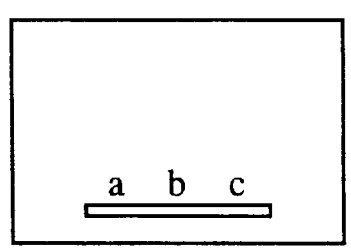
FIGS. 44A and 44B are diagrams for explaining a second method for expressing a spatial position of a caption on an image field that can be used in the fourth embodiment of the present invention.

FIGS. 44A and 44B show the second method for expressing the spatial position of a caption on an image field. This is a method using a bit map in which each caption is expressed by setting a value "1" to each block at which the caption exists and a value "0" to any other block. For example, the caption image shown in FIG. 44A is divided into M×N blocks and a bit map formed by M×N elements is formed as shown in FIG. 44B. Then, a bit value "1" is assigned to a bit corresponding to each block at which the caption exists while a bit value "0" is assigned to any other block. The advantage of this expression is that the caption can be expressed more accurately by using smaller block size. The disadvantage of this expression is that larger amount of memory for storing the bit map is required for a case of using smaller block size.

FIGS. 45A and 45B show the third method for expressing the spatial position of a caption on an image field. This is a method in which the first and second methods described above are combined. Namely, a small bit map corresponding to the circumscribing rectangle is formed, and a bit value "1" is assigned to each block at which the caption exists while a bit value "0" is assigned to any other block in the bit map. For example, the caption is expressed in terms of the circumscribing rectangle of the caption expressed by (x, y, w, h) as shown in FIG. 45A and a small bit map (of 4×2 blocks in this example) corresponding to this circumscribing rectangle as shown in FIG. 45B. The advantage of this expression is that the caption can be expressed more accurately than the first method, and a required memory capacity is smaller than the second method.

In the following, unless otherwise stated, any of these three methods for expressing the spatial position of a caption on an image field can be used.

Note that it is also possible to consider a method using a combination of coordinates of an upper left corner and coordinates of a lower right corner, but such a method is essentially the same as the methods described above.

Next, the caption position to be used as the retrieval key according to this fourth embodiment will be described.

The way in which the video captions appear has a certain tendency due to a custom and a consensus among video creators. Namely, as shown in FIG. 46, there is a general tendency that a time is displayed at an upper left portion A of the image field, a location or a date is displayed at an upper right portion B of the image field, a name or a location is displayed at a lower center portion C of the image field, and a title, a description, words or translated words are displayed at a lower portion D of the image field. In this fourth embodiment, the video is retrieved by utilizing this tendency of the video caption appearances.

Figure 42:
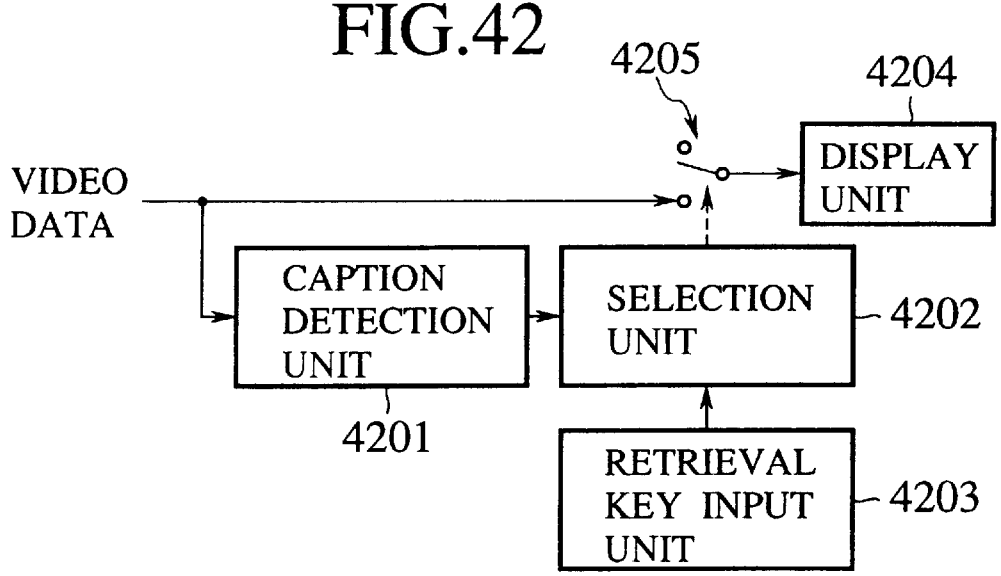
FIG. 42 is a block diagram showing one exemplary schematic configuration of a video caption detection apparatus in the fourth embodiment of the video caption detection scheme according to the present invention.

Now, FIG. 42 shows one exemplary schematic configuration of a video caption detection apparatus in the fourth embodiment of a video caption detection scheme according to the present invention, which incorporates the video retrieval function. Here, the input video data can be the continuous frame images or the video data coded according to H.261 or MPEG.

In the apparatus of FIG. 42, a caption detection unit 4201 detects captions from the input video data, and outputs caption region data. On the other hand, a retrieval key input unit 4303 enters a spatial position range of a desired caption to be retrieved as the retrieval key.

Then, a selection unit 4302 compares the spatial position of each caption on an image field according to the caption region data with the retrieval key, and controls a switch 4205 according to the comparison result so as to supply only a part of the video data corresponding to the desired caption to be retrieved to a display unit 4204. The display unit 4204 then displays the supplied video data.

For the caption detection by the caption detection unit 4201, it is possible to use a method which utilizes the caption information given to the video data in advance, or a method which automatically detects the caption region by processing the video data using the image processing and image recognition techniques. For the latter method, the video caption detection scheme of any of the first to third embodiments described above can be used. In a case of using the video caption detection scheme of FIG. 2 described above, the caption detection unit 4201 can be realized in a configuration of FIG. 29 described above.

Figure 47:
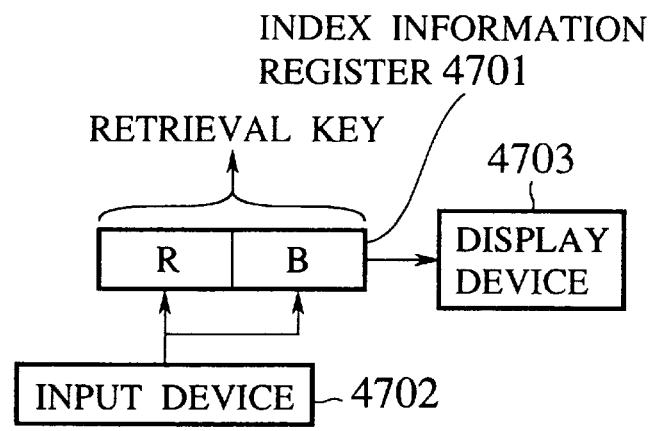
FIG. 47 is a block diagram showing one exemplary configuration of a retrieval key input unit in the apparatus of FIG. 42.

FIG. 47 shows one exemplary configuration of the retrieval key input unit 4203 in the apparatus of FIG. 42.

In this retrieval key input unit of FIG. 47, an input device 4702 is assumed to be in a form of a pointing device such as a mouse, a digitizer, a joystick, or a touch panel. Using this input device 4702, a user depicts a figure of a rectangle or a closed curve in arbitrary shape at a desired position on an image field. Then, a combination of upper left corner coordinates (x, y), a width w and a height h of a circumscribing rectangle of the depicted figure is stored into a circumscribing rectangle field R of an index information register 4701. In addition, the bit values which are "1" inside the depicted figure and "0" outside the depicted figure are registered into a bit map field B of the index information register 4701. These values stored in the index information register 4701 constitute the actual retrieval key.

Note that, depending on a method for expressing the spatial position of a caption on an image field to be used as the retrieval key, it is also possible to omit either one of the circumscribing rectangle field R and the bit map field B in the index information register 4701. It is also possible to express the retrieval key visually by displaying the bit map on the display device 4204 such as a CRT device.

Figure 48:
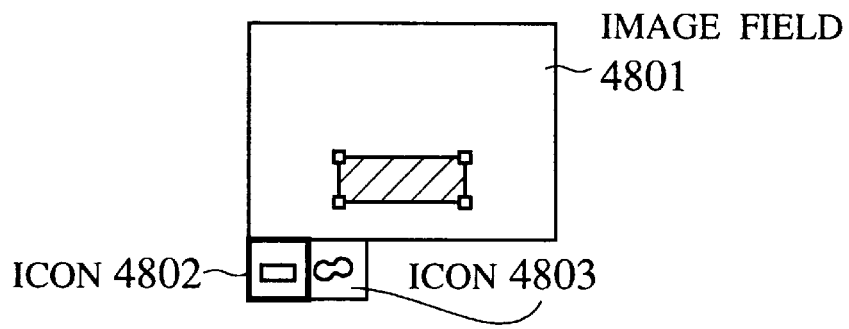
FIG. 48 is a diagram showing one exemplary display of a retrieval key entered at the retrieval key input unit of FIG. 47.
Figure 49:
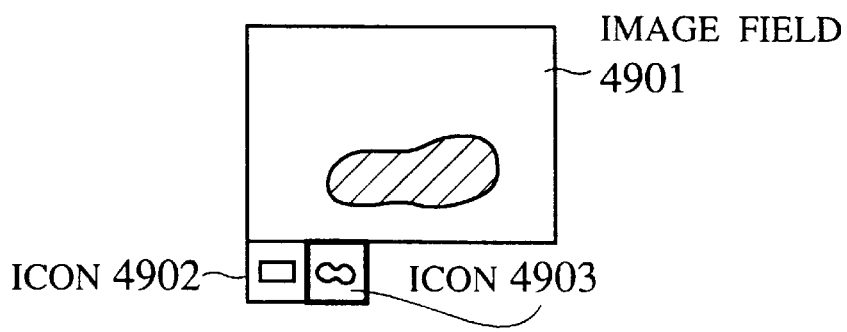
FIG. 49 is a diagram showing another exemplary display of a retrieval key entered at the retrieval key input unit of FIG. 47.

FIG. 48 and FIG. 49 show two exemplary displays of the retrieval key entered at the retrieval key input unit 4203. FIG. 48 shows an exemplary retrieval key in a form of a rectangle (shaded in FIG. 48) depicted on the image field 4801, while FIG. 49 shows an exemplary retrieval key in a form of a closed curve (shaded in FIG. 49) depicted on the image field 4901. Here, it is possible to depict a rectangle or a closed curve on the image field 4801 or 4901 freely be means of the pointing device. In FIG. 48 and FIG. 49, two modes of a rectangle mode and a closed curve mode can be switched by using two icons 4802 and 4803 or 4902 and 4903 which are provided below the image field 4801 or 4901.

Figures 50, 51:
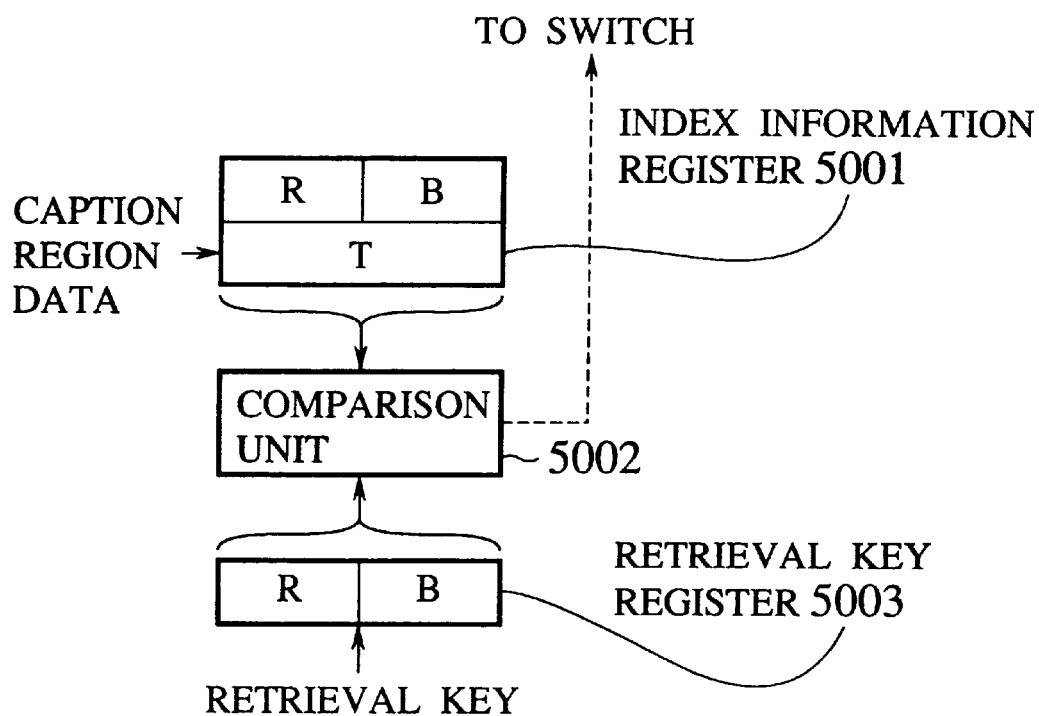
FIG. 50 is a block diagram showing one exemplary configuration of a selection unit in the apparatus of FIG. 42.
FIG. 51 is a table summarizing comparison results obtained by two types of comparison that can be used in a comparison unit in the selection unit of FIG. 50.

FIG. 50 shows one exemplary configuration of the selection unit 4202 in the apparatus of FIG. 42.

In this selection unit of FIG. 50, the spatial position data of the caption is stored into a caption field T in an index information register 5001 according to the entered caption region data. The caption field T is further divided into a circumscribing rectangle field R and a bit map field B, but either one of the circumscribing rectangle field R and the bit map field B in the index information register 5001 may be omitted depending on a method for expressing the spatial position of a caption on an image field.

On the other hand, the retrieval key obtained by the retrieval key input unit 4203 is stored into a retrieval key register 5003. Then, a value of the index information register 5001 and a value of the retrieval key register 5003 are compared by a comparison unit 5002, and the obtained comparison result is supplied to the switch 4205 as an ON/OFF information for controlling the switch 4205.

The comparison unit 5002 may use either one of the following two types of comparison: (1) a comparison to judge whether the spatial position D of the caption is contained in a range K specified by the retrieval key or not, and (2) a comparison to judge whether the spatial position D of the caption overlaps with a range K specified by the retrieval key or not. The comparison results that can be obtained by these two types of comparison are summarized in FIG. 51. For the type (1), the comparison result is "true" only when D is contained in K, and "false" otherwise. For the type (2), the comparison result is also "true" when D and K at least partially overlaps, and "false" only when D and K do not overlap at all.

The comparison result for the type (1) can be obtained as follows. When the spatial position of the caption on an image field is expressed by the circumscribing rectangle, D can be expressed as (Xd, Yd, Wd, Hd) and K can be expressed as (Xk, Yk, Wk, Hk). Then, a case of the comparison result "true" can be distinguished by using the following condition.

$$Xk \leq Xd \land (Xk+Wk) \geq (Xd+Wd) \land Yk \leq Yd \land (Yk+Hk) \geq (Yd+Hd)$$

On the other hand, when the spatial position of the caption on an image field is expressed by the bit map, a case of the comparison result "true" can be distinguished by using the following bit calculation.

$$D \land K = D$$

Similarly, the comparison result for the type (2) can be obtained as follows. When the spatial position of the caption on an image field is expressed by the circumscribing rectangle, a case of the comparison result "true" can be distinguished by using the following condition.

$$Xk \leq (Xd+Wd) \land Xd \leq (Xk+Wk) \land Yk \leq (Yd+Hd) \land Yd \leq (Yk+Hk)$$

On the other hand, when the spatial position of the caption on an image field is expressed by the bit map, a case of the comparison result "true" can be distinguished by using the following bit calculation.

$$D \land K \neq 0$$

which indicates that the logical product (AND) of D and K is not null.

Figure 52:
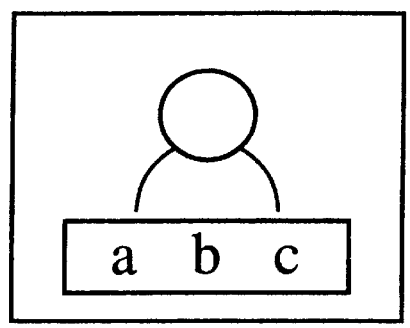
FIG. 52 is a diagram showing an exemplary display of a retrieval result by a display unit in the apparatus of FIG. 42.

FIG. 52 shows an exemplary display of the retrieval result by the display unit 4204 of the apparatus of FIG. 42. Here, the display unit 4204 displays the video image frame which has the desired caption according to the entered retrieval key.

Figure 53:
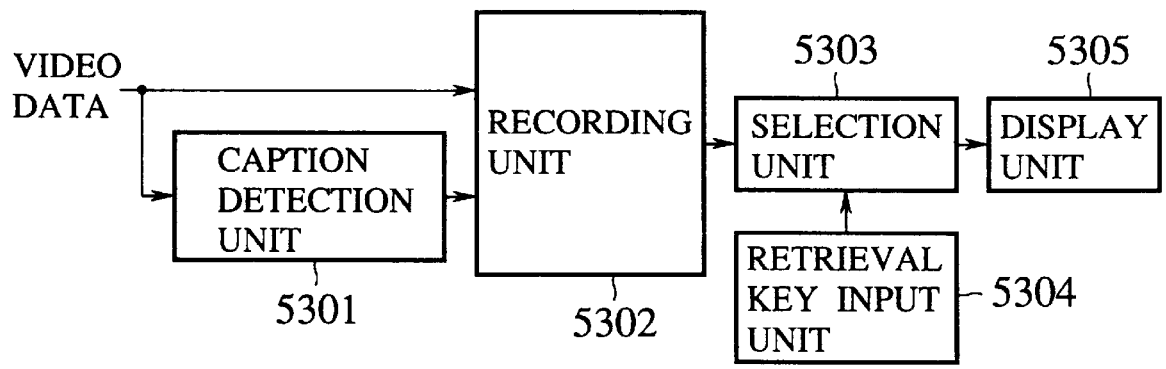
FIG. 53 is a block diagram showing another exemplary schematic configuration of a video caption detection apparatus in the fourth embodiment of the video caption detection scheme according to the present invention.

FIG. 53 shows another exemplary schematic configuration of a video caption detection apparatus in the fourth embodiment of a video caption detection scheme according to the present invention, which incorporates the video retrieval function.

This configuration of FIG. 53 differs from that of FIG. 42 in that a recording unit 5302 for recording a combination of the video data and the spatial position of the caption on an image field as the index information is provided, in addition to a caption detection unit 5301, a selection unit 5303, a retrieval key input unit 5304, and a display unit 5305 which are similar to those of FIG. 42, so that the selection at the selection unit 5303 according to the index information becomes possible. In this configuration of FIG. 53, the caption detection unit 5301 and the retrieval key input unit 5304 are substantially the same as those of FIG. 42.

Figure 54:
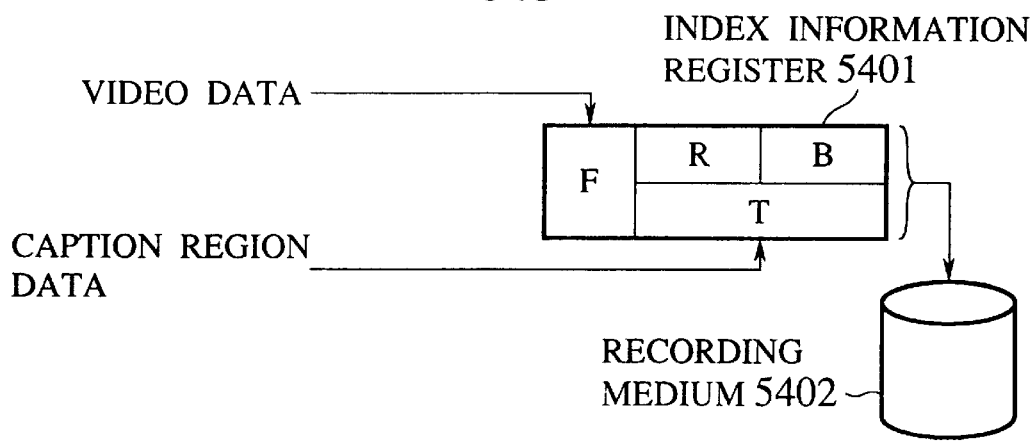
FIG. 54 is a block diagram showing one exemplary configuration of a recording unit in the apparatus of FIG. 53.

FIG. 54 shows one exemplary configuration of the recording unit 5302 in the apparatus of FIG. 53.

In this recording unit of FIG. 54, the entered video data is stored in a frame field F of an index information register 5401. At this point, the frame image or the frame number can also be stored. Also, the spatial position data of the caption is stored into a caption field T of the index information register 5401 according to the entered caption region data. The caption field T is further divided into a circumscribing rectangle field R and a bit map field B, but either one of the circumscribing rectangle field R and the bit map field B in the index information register 5001 may be omitted depending on a method for expressing the spatial position of a caption on an image field.

The value of the index information register 5401 is recorded in a recording medium 5402. Here, the recording medium 5402 can be provided in a form of any of a semiconductor memory, a magnetic disk, a CD, and a magnetic tape.

Figure 55:
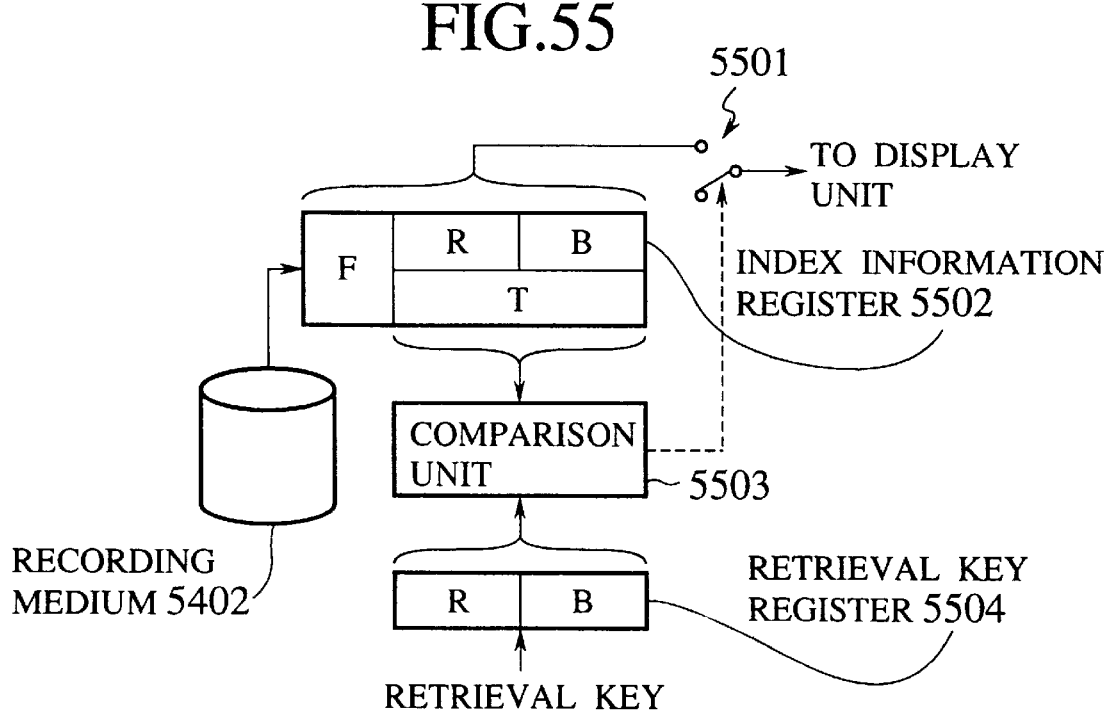
FIG. 55 is a block diagram showing one exemplary configuration of a selection unit in the apparatus of FIG. 53.

FIG. 55 shows one exemplary configuration of the selection unit 5303 in the apparatus of FIG. 53.

In this selection unit of FIG. 55, the index information is sequentially read out from the recording medium 5402 of the recording unit 5302, and stored into an index information register 5502. On the other hand, the retrieval key obtained by the retrieval key input unit 5304 is stored into a retrieval key register 5504.

Then, a value of the caption field T in the index information register 5502 and a value of the retrieval key register 5504 are compared by a comparison unit 5503. Here, either one of the two types of comparison described above can be used. The obtained comparison result is supplied to a switch 5501 as an ON/OFF information for controlling the switch 5501 so as to determine whether or not to output the value of the index information register 5502 to the display unit 5305.

Figure 56:
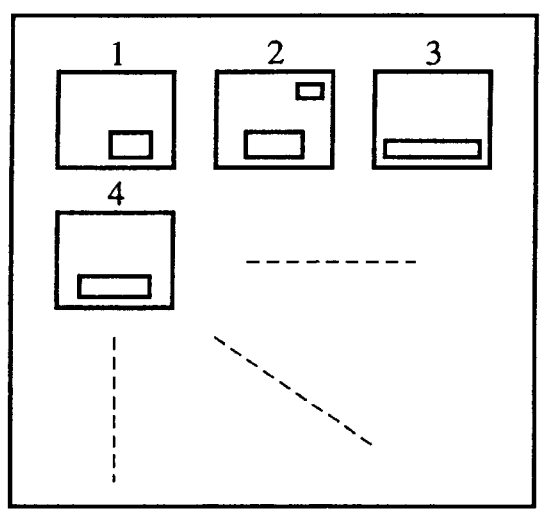
FIG. 56 is a diagram showing an exemplary display of a retrieval result by a display unit in the apparatus of FIG. 53.

FIG. 56 shows an exemplary display by the display unit 5305 in the apparatus of FIG. 53.

At the display unit 5305, a list of frame images in the video data is displayed on a display device such as CRT, by using the value of the frame field F in the index information selected by the selection unit 5303. Here, the frame images may be displayed in appropriately contracted forms. In addition, the region at which the caption exists may be emphasized in the display by using the value of the caption field T in the index information. As a method of emphasized display, it is possible to use a method for depicting the circumscribing rectangle in a prominent color such as red, or a method for raising the intensity of the caption region while lowering the intensity of the other region.

Moreover, a desired one of the frame image in the list display can be specified by an input device such as mouse, so that the video starting from the corresponding frame is playbacked on the CRT at the display unit 5305.

It is to be noted that the fourth embodiment described above can be further modified to register several retrieval keys corresponding to several typical caption positions at the retrieval key input unit 4203 or 5304, so that the video retrieval can be carried out by selecting a desired retrieval key from the registered retrieval keys.

As described, according to the fourth embodiment, it becomes possible to select and display the video according to the spatial position of the caption appearing on the video, by using the spatial position of the caption on an image field as the retrieval key. Here, there is no need for a character recognition processing or a high quality caption region image extraction, so that it becomes possible to select and display the video at a low processing cost.

In addition, according to the fourth embodiment, it becomes possible to retrieve the video according to the spatial position of the caption appearing on the video, and display the retrieval result in a form of a list of frame images in the video. Here, there is no need for a character recognition processing or a high quality caption region image extraction, so that it becomes possible to realize the video retrieval and the list display at a low processing cost.

Also, according to the fourth embodiment, the spatial position of the caption on an image field as the retrieval key can be specified by drawing a figure indicating a desired range of the spatial position of the caption on an image field by using an input device.

Also, according to the fourth embodiment, the video can be selected according to the spatial position of the caption appearing on the video by comparing the spatial position of the caption on an image field and the retrieval key and selecting those spatial positions which are contained within or overlapping with a range specified by the retrieval key.

Also, according to the fourth embodiment, the retrieved video can be displayed by providing a display device for displaying the selected frame image of the video or the corresponding video.

Referring now to FIG. 57 to FIG. 72, the fifth embodiment of a video caption detection scheme according to the present invention will be described in detail. This fifth embodiment is directed to a case of utilizing the video caption detection scheme of the present invention as described above for the purpose of video content indication display.

Figure 57:
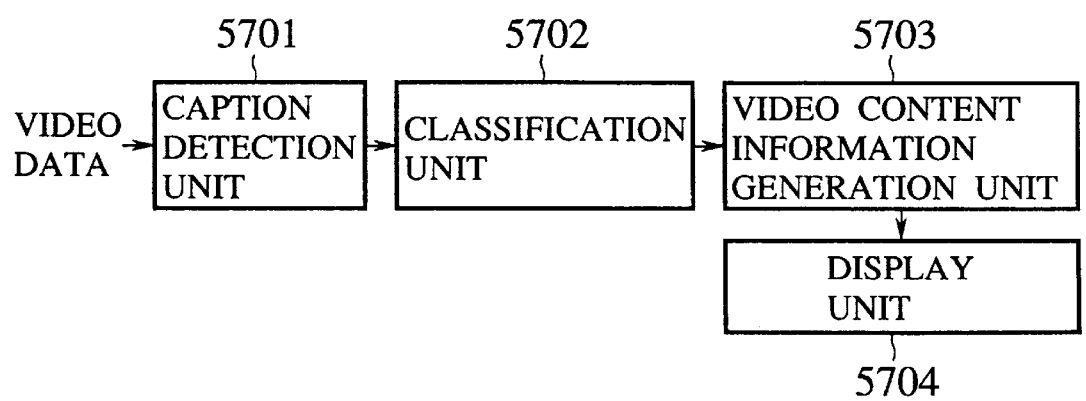
FIG. 57 is a block diagram showing one exemplary schematic configuration of a video caption detection apparatus in the fifth embodiment of the video caption detection scheme according to the present invention.

FIG. 57 shows one exemplary schematic configuration of a video caption detection apparatus in the fifth embodiment of a video caption detection scheme according to the present invention, which incorporates the video content indication display function.

This apparatus of FIG. 57 comprises a caption detection unit 5701, a classification unit 5702, a video content indication generation unit 5703, and a display unit 5704.

The caption detection unit 5701 detects captions contained in the video from the input video data. The information on the detected captions is then entered into the classification unit 5702 which classifies captions into different types. The video content indication generation unit 5703 manages caption existing time sections for each type of caption, and generates the video content indication information. The display unit 5704 displays the caption existing time sections on a time axis for each classified type of caption, according to the video content indication information.

For the caption detection by the caption detection unit 5701, it is possible to use a method which utilizes the caption information given to the video data in advance, or a method which automatically detects the caption region by processing the video data using the image processing and image recognition techniques. For the latter method, the video caption detection scheme of any of the first to third embodiments described above can be used. In a case of using the video caption detection scheme of FIG. 2 described above, the caption detection unit 5701 can be realized in a configuration of FIG. 29 described above.

The classification unit 5702 classifies the captions into several types according to the caption information. At this point, when a caption type is given as the caption information, this information can be utilized for the classification purpose. It is also possible to classify the captions into a person's name, a location's name, a time, etc., by analyzing the text content appearing in the caption. It is also possible to classify the captions according to an information on the spatial position of a caption on an image field as will be described in further detail below.

The video content indication generation unit 5703 manages the caption existing time sections for each type of caption classified by the classification unit 5702. It is also possible to carry out an operation such as merging or dividing of section and noise removal with respect to the caption existing time section. In the following, a bit sequence is used as a video content indication information for each type of caption, where bit positions are set in correspondence to frames and a value "1" is assigned to a bit corresponding to a frame at which the caption exist while a value "0" is assigned to any other bit. As a method for expressing the video content indication information, it is also possible to use a table format for managing the detailed information such as a position of a caption on an image field, instead of the bit sequence described above.

Figures 58, 59:
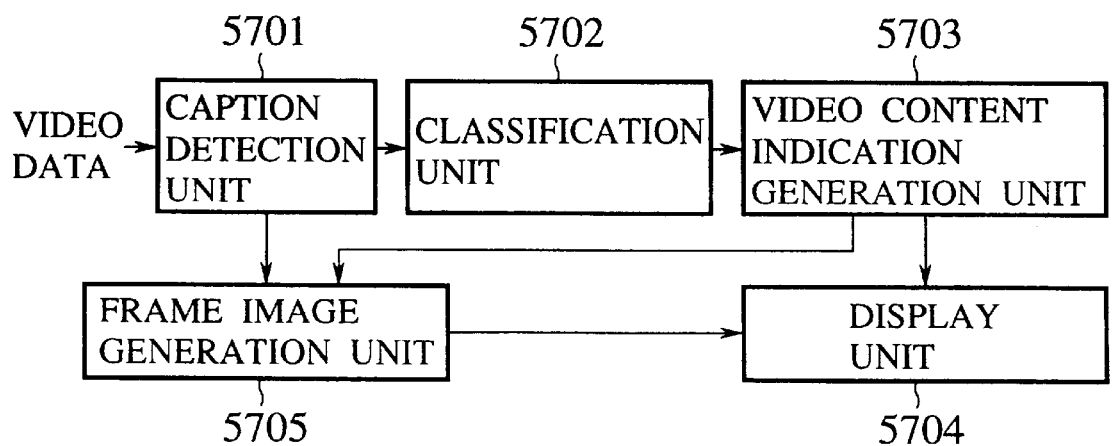
FIG. 58 is a diagram showing an exemplary display of a video content indication by a display unit in the apparatus of FIG. 57.
FIG. 59 is a block diagram showing another exemplary schematic configuration of a video caption detection apparatus in the fifth embodiment of the video caption detection scheme according to the present invention.

FIG. 58 shows an exemplary display of the video content indication by the display unit 5704 in the apparatus of FIG. 57. Here, the captions are classified into five types of a title, a name, a location, a time, and a logo. A time axis is provided for each type of caption in a form of a horizontal axis, and the caption existing time section for each type of caption is indicated by a thick line on the time axis. In addition, the caption existing time section for the unclassified captions is also similarly indicated.

In this fifth embodiment, the caption existing time section for each classified type of caption is positioned on the time axis, so that it is possible to provide the video content indication based on the caption type. For example, sections at which the titles appear in the video are indicated by thick lines on the time axis for the title, so that the video can be handled in time divisions according to the titles.

FIG. 59 shows another exemplary schematic configuration of a video caption detection apparatus in the fifth embodiment of a video caption detection scheme according to the present invention, which incorporates the video content indication display function.

This configuration of FIG. 59 differs from that of FIG. 57 in that a frame image generation unit 5705 for generating the frame images containing the captions is additionally provided, so that the frame images can be displayed in correspondence to the video content indication information at the display unit 5704. In this configuration of FIG. 59, the caption detection unit 5701, the classification unit 5702, and the video content indication generation unit 5703 are substantially the same as those of FIG. 57.

At the frame image generation unit 5705, the frame images containing the captions are generated from the entered video data according to signals supplied from the caption detection unit 5701, and the generated frame images are set in correspondence to the caption existing time sections managed by the video content indication generation unit 5703.

Figure 60:
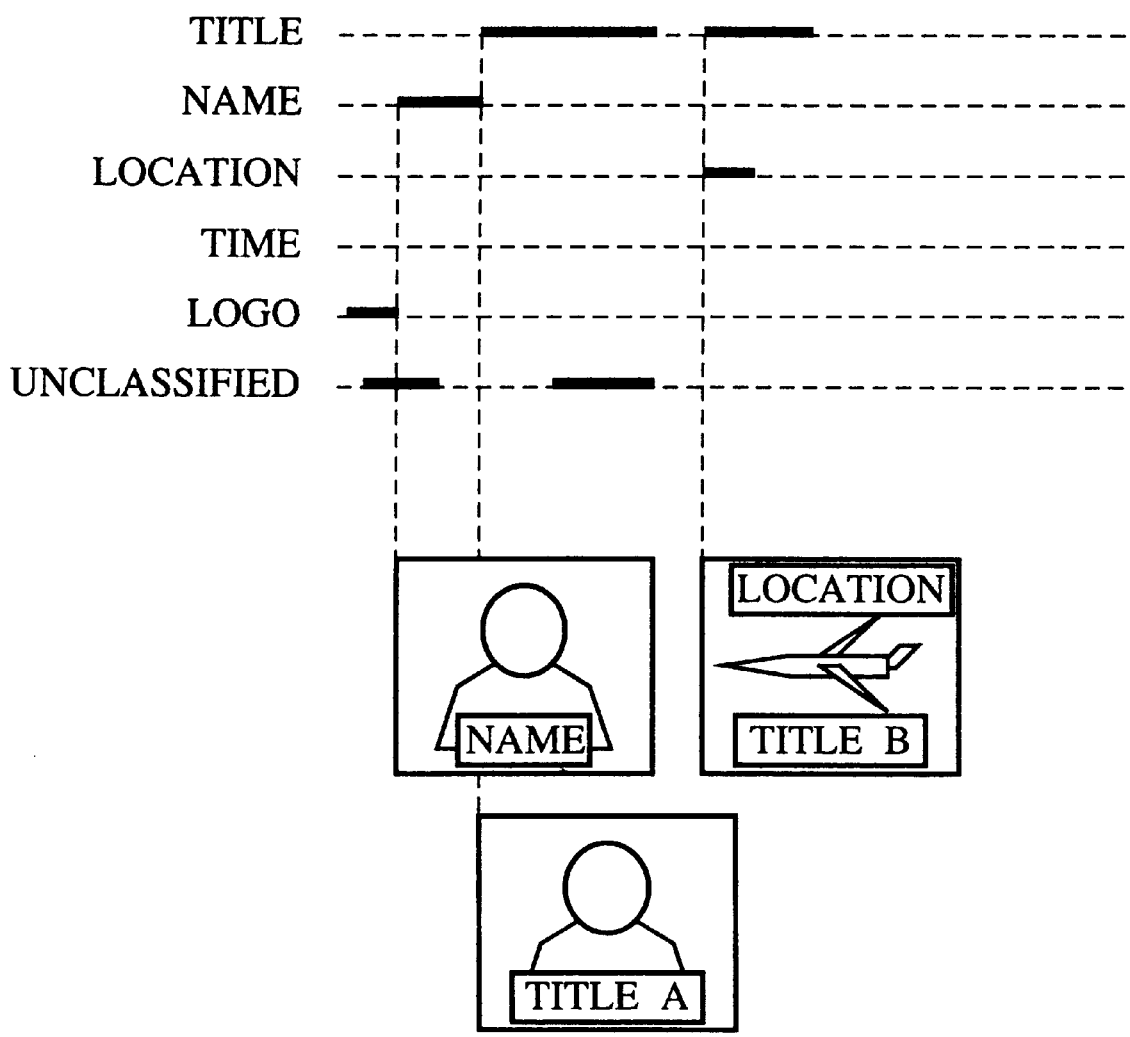
FIG. 60 is a diagram showing an exemplary display of a video content indication by a display unit in the apparatus of FIG. 59.

FIG. 60 shows an exemplary display of the video content indication by the display unit 5704 in the apparatus of FIG. 59. In this case, the caption existing time section for each type of caption is indicated by a thick line on the time axis similarly as the video content indication display by the apparatus of FIG. 57, and in addition, the frame image containing each type of caption is displayed in alignment with a starting point of the thick line for the caption existing time section.

By means of this video content indication display, the caption existing time section for each type of caption is positioned on the time axis while the frame image corresponding to each caption existing time section is displayed, so that it is possible to provide the video content indication based on the caption type along with the video content indication based on the concrete caption content. For example, by watching the thick lines for indicating the time sections at which the titles appear in the video along with the frame images displayed in correspondence to these thick lines, it becomes possible to handle the video in time divisions according to the titles by attaching a concrete title to each divided video part.

Note that the frame image corresponding to the thick line for indicating the caption existing time section can be aligned with an end point or a middle point of the thick line rather than a starting point of the thick line as described above.

Figure 61:
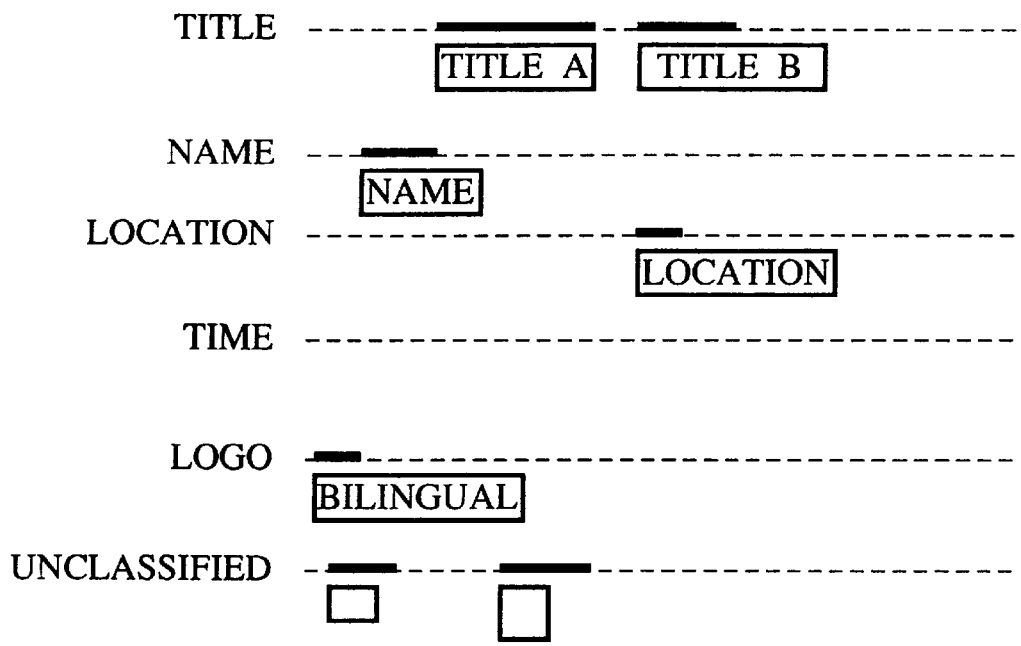
FIG. 61 is a diagram showing another exemplary display of a video content indication by a display unit in the apparatus of FIG. 59.

FIG. 61 shows another exemplary display of the video content indication by the display unit 5704 in the apparatus of FIG. 59. In this case, instead of displaying the entire frame image in correspondence to the thick line for indicating the caption existing time section, only a caption region in the frame image is displayed in correspondence to the thick line for indicating the caption existing time section.

According to this video content indication display of FIG. 61, in addition to the video content indication based on the caption type, the video content indication based on the concrete caption content can be provided similarly as in a case of FIG. 60. In this video content indication display of FIG. 61, the classified caption region image is positioned on the time axis so that the time change of the video content can be expressed more effectively compared with the video content indication display of FIG. 60. For example, by sequentially watching the change of the caption region images classified as the title, it is possible to comprehend the topics appearing in the video.

Figure 62:
FIG. 62 is a diagram showing another exemplary display of a video content indication by a display unit in the apparatus of FIG. 59.

FIG. 62 shows another exemplary display of the video content indication by the display unit 5704 in the apparatus of FIG. 59. In this case, the caption existing time section is not indicated, and only caption region images are displayed sequentially.

According to this video content indication display of FIG. 62, it is possible to provide the video content indication based on the concrete caption content for each type of caption, independently from the time axis. In this manner, it is possible to generate and display a table of contents according to the titles, a table of contents according to the names, etc.

Note that the caption region images are displayed in an order of their appearances in the above, but when the text information can be detected by analyzing the caption region image, the caption region images may be arranged in an alphabetical order.

Figure 63:
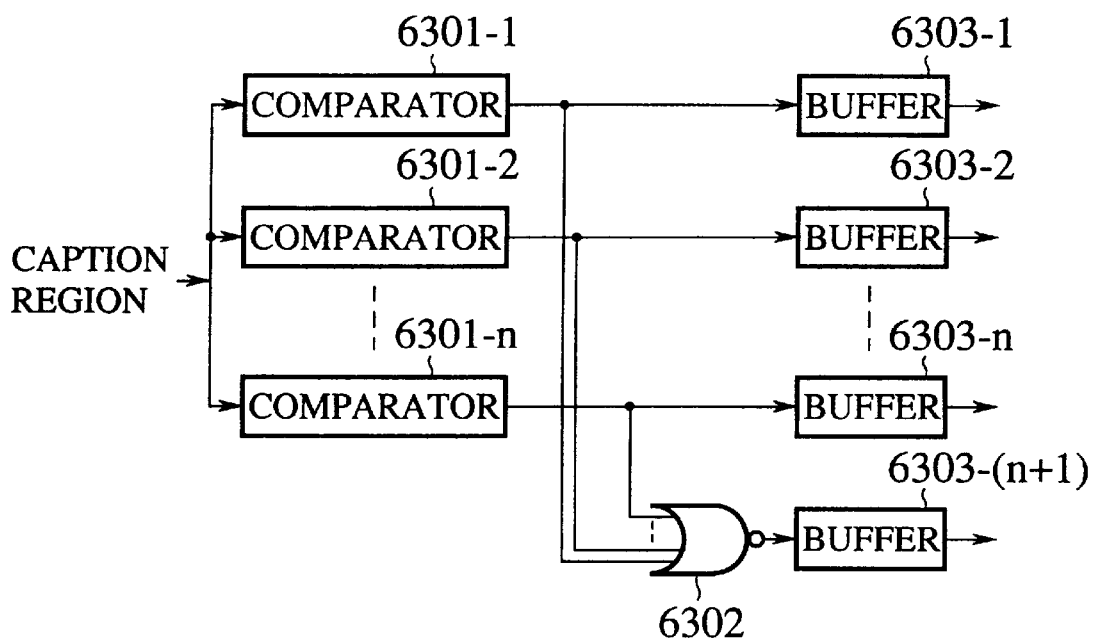
FIG. 63 is a block diagram showing one exemplary configuration of a classification unit in the apparatus of FIG. 57 or FIG. 59.

FIG. 63 shows one exemplary configuration of the classification unit 5702 in the apparatus of FIG. 57 or FIG. 59.

Figure 64:
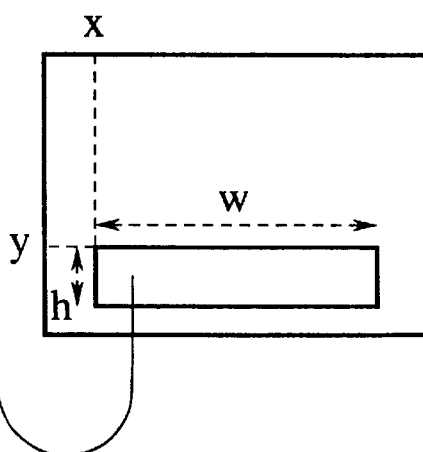
FIG. 64 is a diagram showing a table for indicating each caption region used by each comparator in the classification unit of FIG. 63.

In this classification unit of FIG. 63, each of comparators 6301-1 to 6301-n compares a prescribed spatial position range for a respective type of caption with each caption region according to a table shown in FIG. 64, and outputs a value "1" when the caption region is within the spatial position range or a value "0" otherwise to a corresponding one of buffers 6303-1 to 6303-n. In addition, an NOR circuit 6302 calculates an inverse of the logical sum of the outputs of the comparators 6301-1 to 6301-n, and outputs the calculation result as a value for the unclassified captions to a buffer 6303-(n+1).

Note that there is a possibility for more than one captions to appear in one frame, and in such a case, the comparison with the spatial position range is to be carried out for every caption region contained in each frame, and the logical sum of the comparison results for more than one captions is to be stored into the buffers 6303-1 to 6303-(n+1). For instance, when there are two classified types c1 and c2, it is possible to obtain the following three outputs for the buffers 6303-1, 6303-2 and 6303-(n+1).

$$<c1, c2, \overline{c1 \lor c2}>$$

Now, when one caption classified as c1 and one caption classified as c2 appear in a certain frame, the outputs of the two comparators 6301-1 and 6301-2 and the NOR circuit 6302 for these two captions are respectively as follows.

$$<1, 0, 0> \text{ and } <0, 1, 0>$$

By taking the logical sum of these outputs, the values stored in the buffers 6303-1, 6303-2 and 6303-(n+1) are:

$$<1, 1, 0>$$

and these values will be used as the output of the classification unit 5702. Thus the output of the classification unit 5702 contains all the classification results for one frame.

The reason for dealing with the unclassified captions in addition to the classified captions is as follows. In a case of using the automatic caption detection, the non-caption regions are often erroneously detected as captions. Such noises exist randomly over an entire image field, and such a noise may possibly be erroneously classified as one of the given caption types but may also possibly be not classified as any of the given caption types. Consequently, by looking at the existence of the unclassified captions, it is possible to detect the presence/absence of noises and evaluate the accuracy of the classification.

Figure 65:
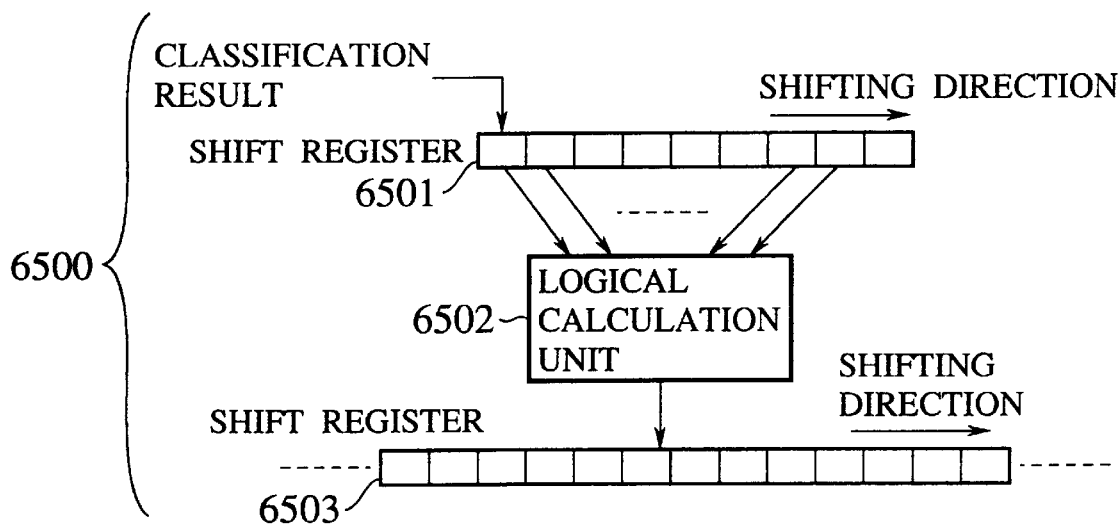
FIG. 65 is a block diagram showing one exemplary configuration of a video content indication generation unit in the apparatus of FIG. 57 or FIG. 59.

FIG. 65 shows one exemplary configuration of the video content indication generation unit 5703 in the apparatus of FIG. 57 or FIG. 59. Note that this configuration of FIG. 65 only shows a part for one type of caption, and in practice, the video content indication generation unit 5703 should have as many of this configuration of FIG. 65 as (a number of types of caption)+1 (for the unclassified captions)).

This video content indication generation unit of FIG. 65 comprises a shift register 6501 which receives the output of the classification unit 5702, a logical calculation unit 6502 for carrying out the logical calculation among bits of the shift register 6501, and a long shift register 6503 for receiving the logical calculation result from the logical calculation unit 6502. The shift register 6501 is shifted into the right direction for each frame, and the long shift register 6503 functions to maintain the caption existing time section. Namely, by setting a bit position on the shift register 6501 in correspondence a frame, it is possible to manage which type of caption exists in which frame.

Figure 66:
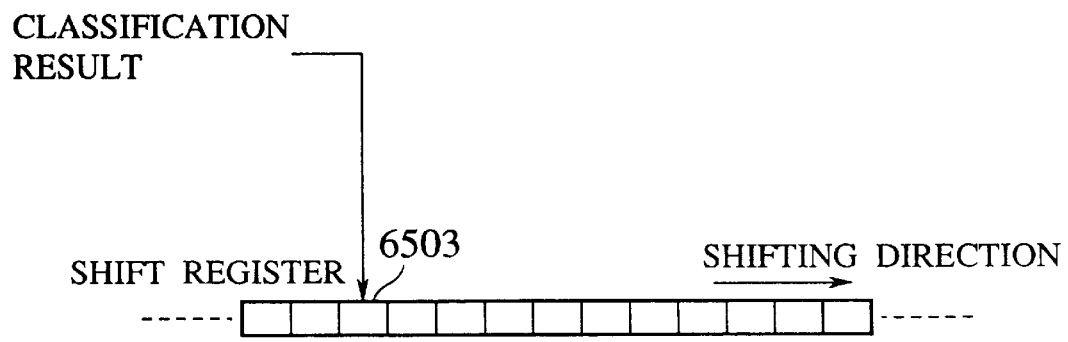
FIG. 66 is a block diagram showing one exemplary configuration of a logical calculation unit in the video content indication generation unit of FIG. 65.

FIG. 66 shows one exemplary configuration of the logical calculation unit 6502 in the video content indication generation unit of FIG. 65, in which a value of the shift register 6501 is directly entered into the shift register 6503. In other words, this is a configuration suitable for a case which takes the output of the classification unit 5702 directly as the caption existing time section.

Figures 67, 68:
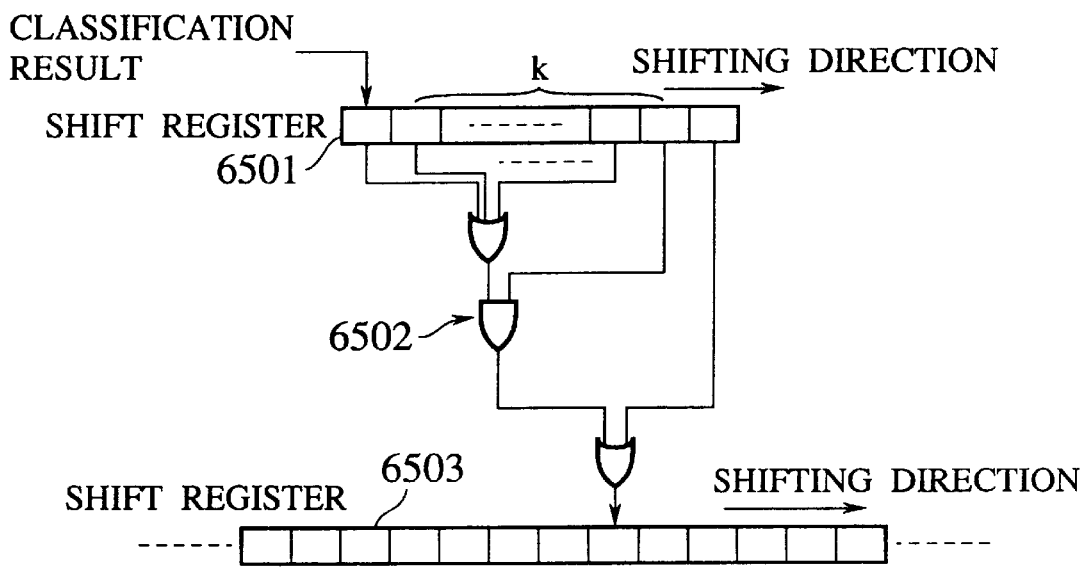
FIG. 67 is a block diagram showing another exemplary configuration of a logical calculation unit in the video content indication generation unit of FIG. 65.
FIG. 68 is a table summarizing states of various bit sequences before and after a logical calculation by the logical calculation unit of FIG. 67.

FIG. 67 shows another exemplary configuration of the logical calculation unit 6502 in the video content indication generation unit of FIG. 65. In this configuration of FIG. 67, when there are two bits with a bit value "1", and these two bits are separated by no more than k bits, each of these no more than k bits is set to have a bit value "1". For instance, when k=2, various bit sequences can be converted from a state before this logical calculation to a state after this logical calculation as summarized in FIG. 68.

This configuration of FIG. 67 has a function to compensate for a case in which the caption was not detected instantaneously despite of the fact that the caption was detected before and after that, so that it is possible to deal with a situation of caption overlooking that is frequently encountered in a case of using the automatic caption detection.

Figures 69, 70:
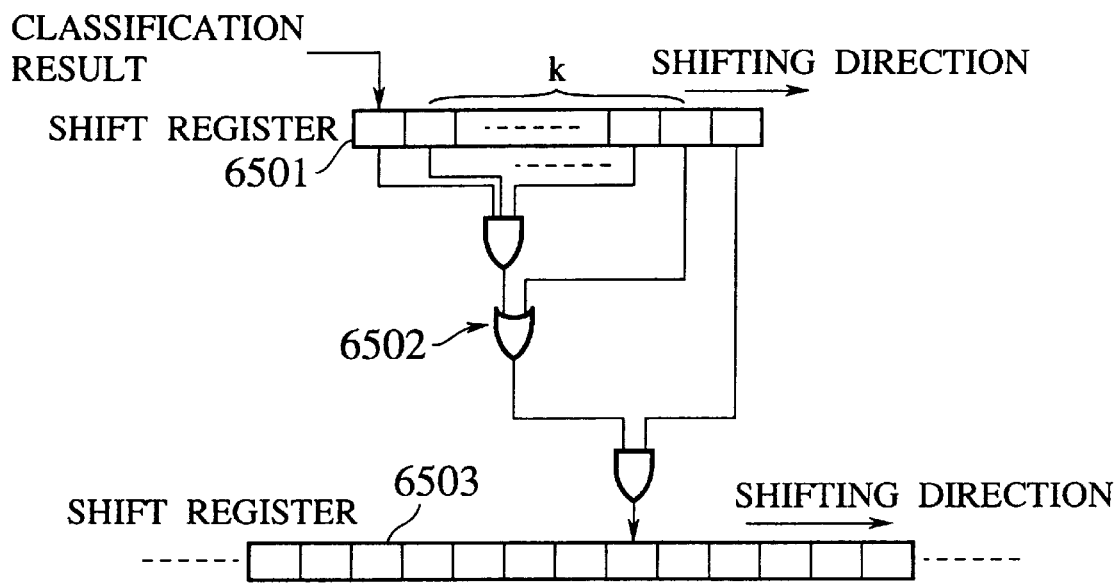
FIG. 69 is a block diagram showing another exemplary configuration of a logical calculation unit in the video content indication generation unit of FIG. 65.
FIG. 70 is a table summarizing states of various bit sequences before and after a logical calculation by the logical calculation unit of FIG. 69.

FIG. 69 shows another exemplary configuration of the logical calculation unit 6502 in the video content indication generation unit of FIG. 65. In this configuration of FIG. 69, when there are two bits with a bit value "0", and these two bits are separated by no more than k bits, each of these no more than k bits is set to have a bit value "0". For instance, when k=2, various bit sequences can be converted from a state before this logical calculation to a state after this logical calculation as summarized in FIG. 70.

This configuration of FIG. 69 has a function to eliminate a case in which the caption was detected instantaneously despite of the fact that the caption was not detected before and after that, so that it is possible to deal with a situation of excessive caption detection that is frequently encountered in a case of using the automatic caption detection.

Figure 71:
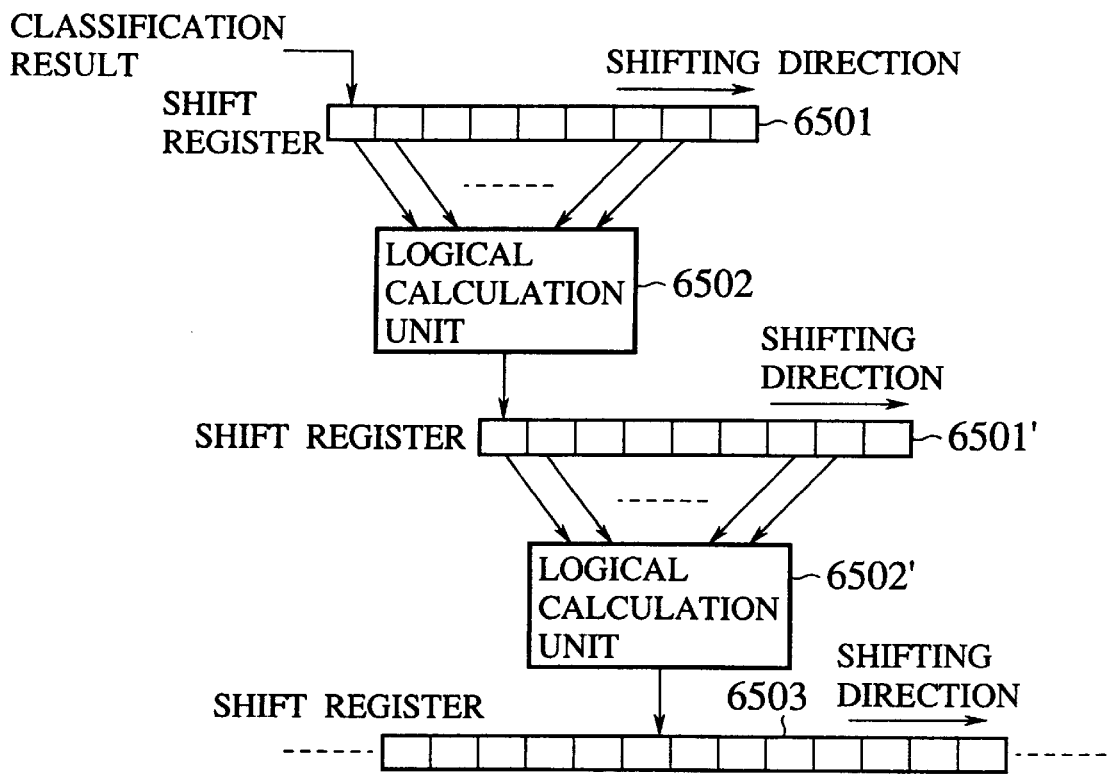
FIG. 71 is a block diagram showing another exemplary configuration of a logical calculation unit in the video content indication generation unit of FIG. 65.

Note that the shift register and the logical calculation unit of the video content indication generation unit can be provided in more than one stages as shown in FIG. 71. For example, it is possible to provide the shift register 6501' and the logical calculation unit 6502' in a configuration of FIG. 69 after the shift register 6501 and the logical calculation unit 6502 in a configuration of FIG. 67. A number of stages is not necessarily limited to two as shown in FIG. 71, and can be three or more if desired.

Figure 72:
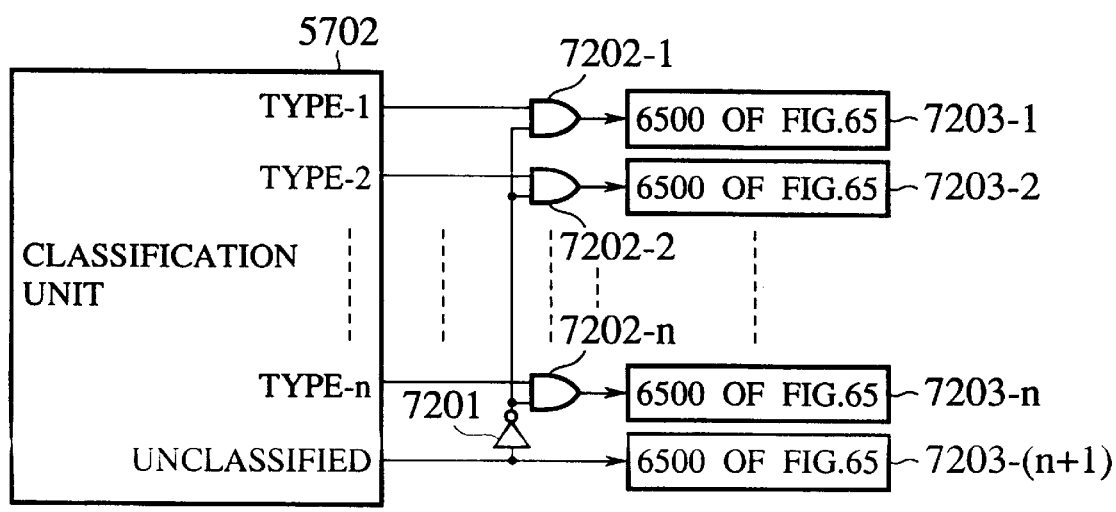
FIG. 72 is a block diagram showing another exemplary configuration of a video content indication generation unit in the apparatus of FIG. 57 or FIG. 59.

FIG. 72 shows another exemplary configuration of the video content indication generation unit 5703 in the apparatus of FIG. 57 or FIG. 59. In this video content indication generation unit of FIG. 72, an inverter 7201 obtains an inversion of the output for the unclassified captions among the outputs of the classification unit 5702, and each of AND circuits 7202-1 to 7202-n calculates the logical product of the caption existing time section for each type of caption and the output of the inverter 7201, and enters the logical product result into a corresponding one of circuits 7203-1 to 7203-n, while the classification unit's output for the unclassified captions is also entered into another circuit 7203-(n+1), where each of the circuits 7203-1 to 7203-(n+1) has a configuration 6500 shown in FIG. 65.

In other words, a section at which the unclassified caption exists is regarded as containing noises caused by the automatic caption detection or the automatic classification according to the caption spatial position, so that such a section is regarded to have no significant caption. This configuration of FIG. 72 has a drawback that not all the captions are necessarily reflected in the video content indication, but there is an advantage that it is possible to generate the video content indication with no or very few errors.

It is to be noted that the fifth embodiment described above can be further modified to display the frame image by emphasizing the caption region in a case of the video content indication display of FIG. 60.

As described, according to the fifth embodiment, the video content indication based on the caption type can be generated and displayed, so that it becomes possible to provide the video content indication which reflects the video content well.

In addition, according to the fifth embodiment, the frame image containing the caption or the caption region of the frame image can be generated and displayed in correspondence to the caption existing time section, so that it becomes possible to provide the video content indication based on the concrete caption content.

Also, according to the fifth embodiment, the captions can be classified according to the spatial positions of the captions, so that the captions can be classified in accordance with the typical caption appearance patterns.

Also, according to the fifth embodiment, the automatic caption detection result or the automatic classification result can be processed by the logical calculation so that the caption overlooking or the excessive caption detection can be compensated and the effective video content indication can be generated even from an incomplete caption detection result.

Referring now to FIG. 73 to FIG. 77, the sixth embodiment of a video caption detection scheme according to the present invention will be described in detail. This sixth embodiment is directed to a case of utilizing the video caption detection scheme of the present invention as described above for the purpose of video display.

Figure 73:
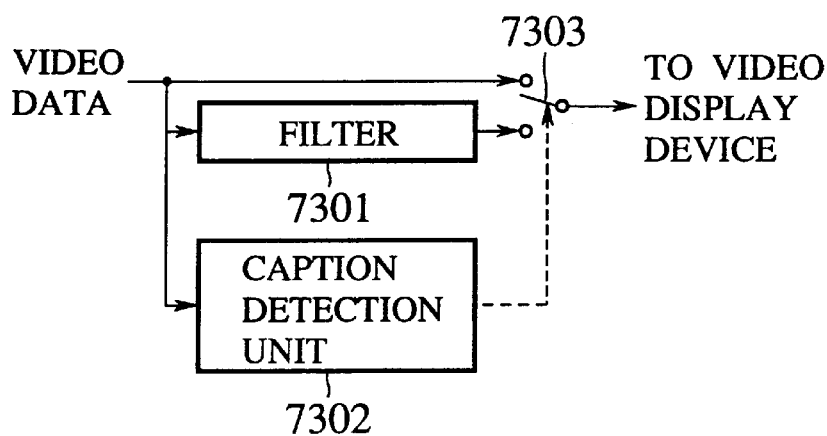
FIG. 73 is a block diagram showing one exemplary schematic configuration of a video caption detection apparatus in the sixth embodiment of the video caption detection scheme according to the present invention.

FIG. 73 shows one exemplary schematic configuration of a video caption detection apparatus in the sixth embodiment of a video caption detection scheme according to the present invention, which incorporates the video display function.

In this apparatus of FIG. 73, a caption detection unit 7302 detects caption regions contained in the video from the input video data, and controls a switch 7303 according to the detection result. When a pixel of the video belongs to the caption region, the switch 7303 is controlled to output the pixel as processed by a filter 7301 to a video display device, whereas otherwise the switch 7303 is controlled to output the pixel of the original video as it is to a video display device.

For the caption detection by the caption detection unit 5701, it is possible to use a method which utilizes the caption information given to the video data in advance, or a method which automatically detects the caption region by processing the video data using the image processing and image recognition techniques. For the latter method, the video caption detection scheme of any of the first to third embodiments described above can be used. In a case of using the video caption detection scheme of FIG. 2 described above, the caption detection unit 5701 can be realized in a configuration of FIG. 29 described above.

The filter 7301 carries out a processing for obscuring the video. For this processing, it is possible to any of the painting processing for replacing each pixel by a constant pixel value, the tessellation processing for dividing pixels into blocks and using an average pixel value within each block for every pixel within each block, the filter processing for blurring the video by means of a smoothing filter such as Gaussian filter, the scrambling processing for scrambling the video by randomly rearranging pixels, or the scrambling processing for scrambling the video by adding random noises.

Figure 74:
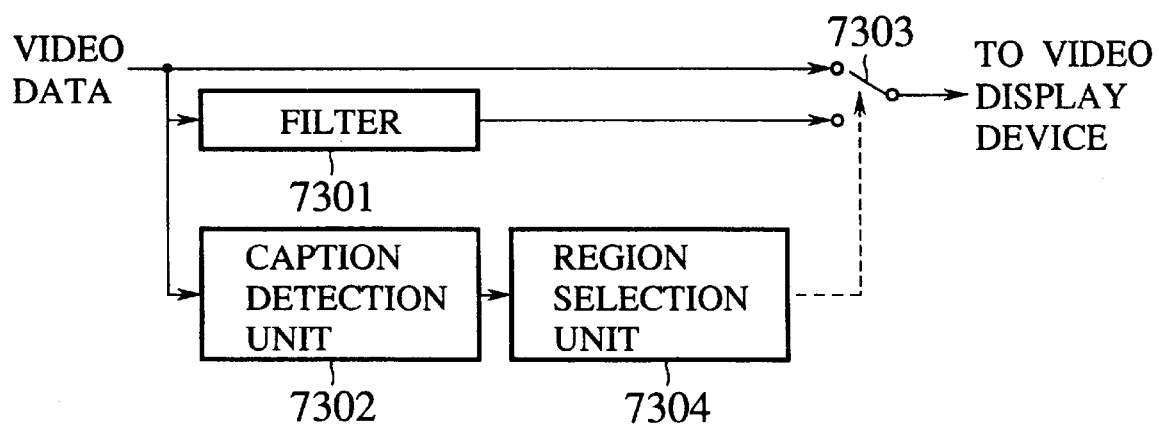
FIG. 74 is a block diagram showing another exemplary schematic configuration of a video caption detection apparatus in the sixth embodiment of the video caption detection scheme according to the present invention.

FIG. 74 shows another exemplary schematic configuration of a video caption detection apparatus in the sixth embodiment of a video caption detection scheme according to the present invention, which incorporates the video display function.

This configuration of FIG. 74 differs from that of FIG. 73 in that a region selection unit 7304 for selecting a region to be obscured from the detected caption region according to the caption region information supplied from the caption detection unit 7302 is additionally provided, so that only the selected region can be obscured in the displayed video. In this configuration of FIG. 74, the filter 7301, the caption detection unit 7302, and the switch 7303 are substantially the same as those of FIG. 73.

Here, the region selection by the region selection unit 7304 can be carried out as follows.

First, the region selection according to the caption type will be described. When a caption type is given in advance, this information can be utilized for the classification purpose. It is also possible to classify the captions by applying the character recognition to the caption region image and analyzing the text content appearing in the caption. When the captions can be classified in such a manner, it is possible to select only those captions of the specific types and ignore any other captions.

Next, the region selection according to the caption position will be described. As already described with reference to FIG. 46, there are some typical caption appearance patterns. Consequently, by specifying a range for the caption position, it is possible to select only those captions located within the specified range, and ignore any other captions.

Next, a case of handling the video data coded by using the inter-frame correlation such as the coded video data of H.261 or MPEG will be described.

Figure 75:
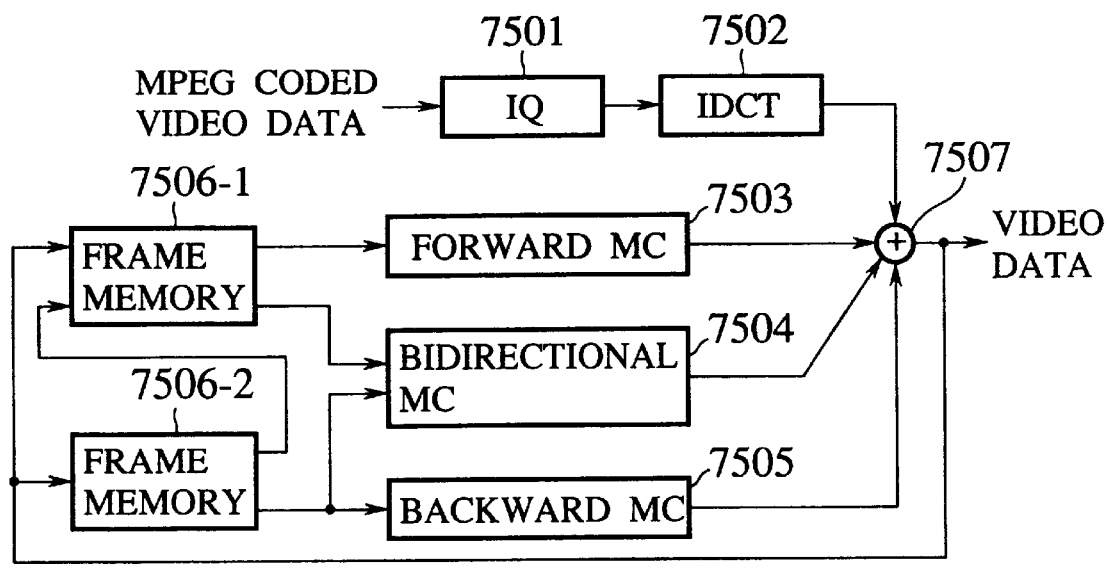
FIG. 75 is a block diagram showing one exemplary configuration of an MPEG video data decoding device that can be used in obtaining input video data suitable for the apparatus of FIG. 73 or FIG. 74.

FIG. 75 shows one exemplary configuration of an MPEG video data decoding device which is to be used in obtaining the input video data suitable for apparatus of FIG. 73 or FIG. 74 by decoding the coded video data of MPEG. In this decoding device of FIG. 75, the input MPEG coded video data are inverse quantized by an IQ 7501, and applied with the inverse discrete cosine transform by an IDCT 7502. Then, the motion compensation components obtained by a forward MC 7503, a bidirectional MC 7504, and a backward MC 7505 from frames sequentially stored in frame memories 7506-1 and 7506-2 are added at an adder 7507 so as to produce the decoded video data.

Figure 76:
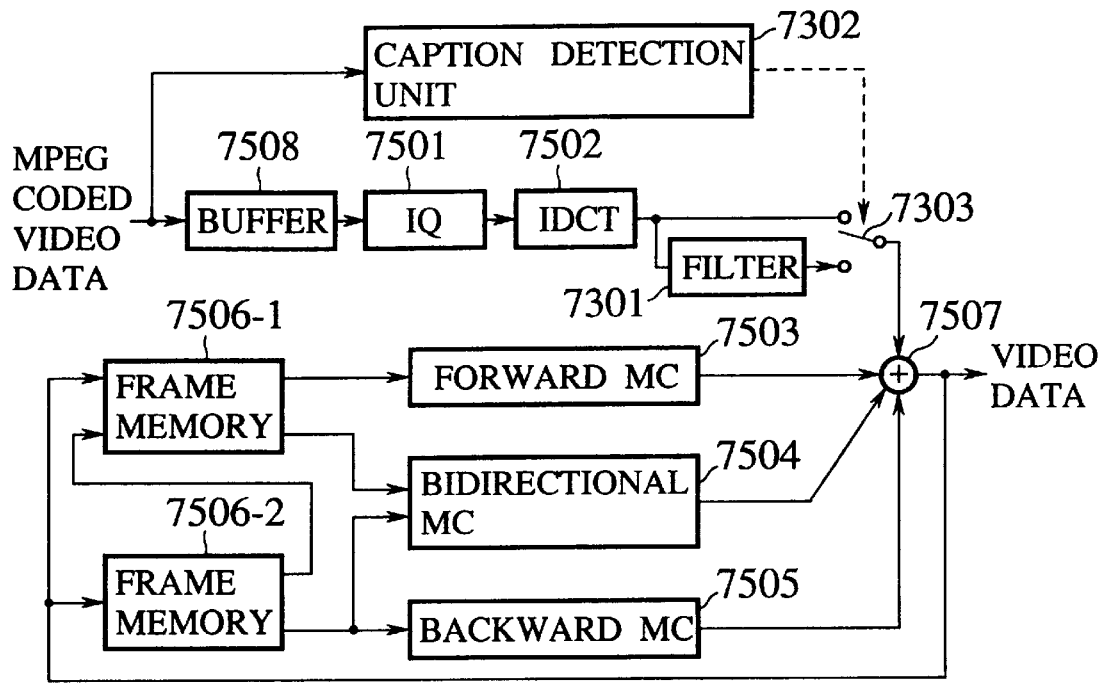
FIG. 76 is a block diagram showing another exemplary schematic configuration of a video caption detection apparatus in the sixth embodiment of the video caption detection scheme according to the present invention.

FIG. 76 shows another exemplary schematic configuration of a video caption detection apparatus in the sixth embodiment of a video caption detection scheme according to the present invention, which incorporates the video display function.

In this configuration of FIG. 76, the filter 7301, the caption detection unit 7302, and the switch 7303 of the configuration of FIG. 73 are incorporated into the MPEG video data decoding device configuration of FIG. 75. The filter 7301 processes the output of the IDCT 7502, and the switch is provided at an output side of the IDCT 7502. The caption detection unit 7302 detects caption regions from the MPEG coded video data directly.

This configuration of FIG. 76 also incorporates a buffer 7508 at an input side of the IQ 7501, which functions to temporarily store the coded video data as much as a time required for the caption detection, so as to compensate for the time delay caused by the caption detection and the caption obscuring processing.

Figure 77:
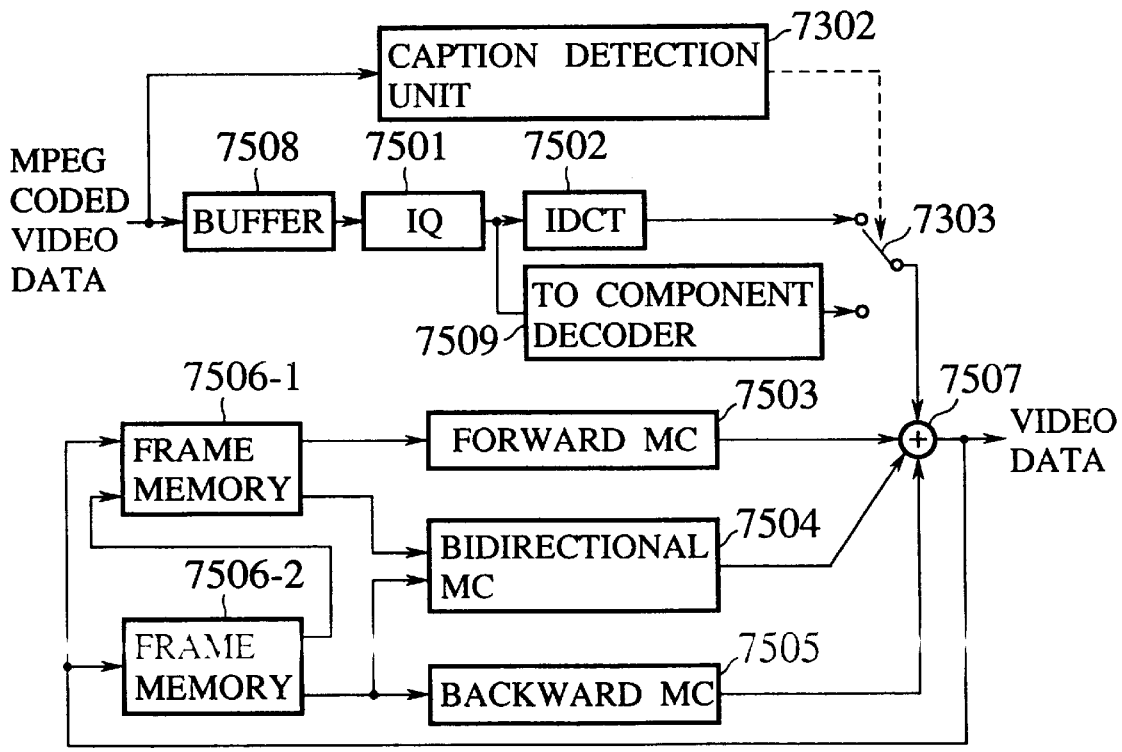
FIG. 77 is a block diagram showing another exemplary schematic configuration of a video caption detection apparatus in the sixth embodiment of the video caption detection scheme according to the present invention.

FIG. 77 shows another exemplary schematic configuration of a video caption detection apparatus in the sixth embodiment of a video caption detection scheme according to the present invention, which incorporates the video display function.

This configuration of FIG. 77 differs from that of FIG. 76 in that a DC component decoder 7509 connected to an output side of the IQ 7501 is provided instead of the filter 7301 of FIG. 76. In this configuration of FIG. 77, the property that the DC component of the discrete cosine transform data indicates the average pixel value for the pixel block is utilized so that the pixels which contain the caption are decoded by using the DC component for the pixel block at the DC component decoder 7509 instead of applying the inverse discrete cosine transform. In this manner, the tessellation processing on the caption region can be carried out at a higher speed.

Note that the configurations of FIGS. 75 to FIG. 77 are not necessarily limited to a case of handling the MPEG coded video data, and can be used in handling any other type of coded video data.

As described, according to the sixth embodiment, the caption contained in the video can be detected and displayed in an obscured form. Consequently, there is no need for human workers to manually specify the caption regions to be obscured one by one in the work for increasing the reusability of the video by obscuring the captions, and therefore it becomes possible to carry out such a work at a higher speed while reducing the work load required for such a work.

Also, according to the sixth embodiment, whether or not to obscure each detected caption can be controlled by using the suitable region selection.

Also, according to the sixth embodiment, the pixels of the captions appearing in the video data coded by using the inter-frame correlation can be decoded in an obscured form while decoding any other pixels normally.

It is to be noted that a video caption detection system based on the video caption detection scheme of any of the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

Such a software package can be a computer program product which employs a storage medium including stored computer code which is used to program a computer to perform the disclosed function and process of the present invention. The storage medium may include, but is not limited to, any type of conventional floppy discs, optical discs, CD-ROMs, magneto-optical discs, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for detecting a caption region from video data coded by using a combination of predictive coding and motion compensation, comprising the steps of:

judging whether each pixel/block in the video data is coded by using inter-frame correlation without using motion compensation or not; and detecting a region in the video data at which pixels/blocks judged by the judging step as being coded by using inter-frame correlation without using motion compensation are concentrated time-wise and space-wise, as a caption region;

wherein the detecting step includes the steps of:

counting a frequency of appearance of a pixel/block which is judged by the judging step as being coded by using inter-frame correlation without using motion compensation, at each pixel/block position of a frame over a prescribed counting period;

selecting the caption region by comparing the frequency of appearance counted by the counting step with a prescribed threshold value;

forming a two-dimensional counting matrix indicating the frequency of appearance at each pixel/block position as counted by the counting step; and producing a projection histogram by projecting the counting matrix into at least one direction defining the counting matrix;

wherein the producing step obtains a first projection histogram by projecting the counting matrix into a first direction, determines a first action along the first direction in which the frequency of appearance as indicated by the first projection histogram is greater than a first prescribed threshold value, and obtains the projection histogram by projecting the first projection histogram into a second direction within the first section; and wherein the selecting step compares the frequency of appearance as indicated by the projection histogram with the prescribed threshold value, and determines a second section along the second direction in which the frequency of appearance as indicated by the projection histogram is greater than the prescribed threshold value, and selects those pixels/blocks which are within the first section and the second section as the caption region.

2. A method for detecting a caption region from video data coded by using a combination of predictive coding and motion compensation, comprising the steps of:

judging whether each pixel/block in the video data is coded by using inter-frame correlation without using motion compensation or not; and detecting a region in the video data at which pixels/blocks judged by the judging step as being coded by using inter-frame correlation without using motion compensation are concentrated time-wise and space-wise, as a caption region;

wherein the detecting step includes the steps of:

counting a frequency of appearance of a pixel/block which is judged by the judging step as being coded by using inter-frame correlation without using motion compensation, at each pixel/block position of a frame over a prescribed counting period; and selecting the caption region by comparing the frequency of appearance counted by the counting step with a prescribed threshold value;

wherein the counting step counts the frequency of appearance by incrementing the frequency of appearance by a value "1" for each appearance of a pixel/block which is judged by the judging step as being coded by using inter-frame correlation without using motion compensation, which decrementing the frequency of appearance by a value "–1" for each appearance of a pixel/block which is not judged by the judging step as being coded by using inter-frame correlation without using motion compensation.

3. A method for detecting a caption region from video data coded by using a combination of predictive coding and motion compensation, comprising the steps of:

judging whether each pixel/block in the video data is coded by using inter-frame correlation without using motion compensation or not;

detecting a region in the video data at which pixels/blocks judged by the judging step as being coded by using inter-frame correlation without using motion compensation are concentrated time-wise and space-wise, as a caption region;

storing pixels/blocks of a plurality of caption regions detected by the detecting step at different timings into a three-dimensional buffer defined by two spatial axes and one time axis, as caption candidate pixels/blocks; and merging a plurality of caption candidate pixels/blocks for different timings as stored in the three-dimensional buffer;

wherein the merging step applies a dilation processing to replace a pixel/block value of each caption candidate pixel/block by a maximum value of pixel/block values among neighboring caption candidate pixels/blocks, and an erosion processing to replace a pixel/block value of each caption candidate pixel/block by a minimum value of pixel/block values among neighboring caption candidate pixels/blocks.

4. A method for detecting a caption region from video data coded by using a combination of predictive coding and motion compensation, comprising the steps of:

judging whether each pixel/block in the video data is coded by using inter-frame correlation without using motion compensation or not;

detecting a region in the video data at which pixels/blocks judged by the judging step as being coded by using inter-frame correlation without using motion compensation are concentrated time-wise and space-wise, as a caption region;

storing pixels/blocks of a plurality of caption regions detected by the detecting step at different timings into a three-dimensional buffer defined by two spatial axes and one time axis, as caption candidate pixels/blocks;

merging a plurality of caption candidate pixels/blocks for different timings as stored in the three-dimensional buffer, and judging a frame immediately before or after a time section at which no caption candidate pixel/block exists as a representative frame of a caption which exists immediately before or after the time section.

5. A method for detecting a caption region from video data coded by using a combination of predictive coding and motion compensation, comprising the steps of:

judging whether each pixel/block in the video data is coded by using inter-frame correlation without using motion compensation or not;

detecting a region in the video data at which pixels/blocks judged by the judging step as being coded by using inter-frame correlation without using motion compensation are concentrated time-wise and space-wise, as a caption region;

storing pixels/blocks of a plurality of caption regions detected by the detecting step at different timings into a three-dimensional buffer defined by two spatial axes and one time axis, as caption candidate pixels/blocks;

merging a plurality of caption candidate pixels/blocks for different timings as stored in the three-dimensional buffer; and labeling each connected component of the caption candidate pixels/blocks as merged by the merging step distinctively; and judging a frame containing a caption candidate pixel/block of each connected component which is labeled distinctively by the labeling step as a representative frame of a caption formed by the caption candidate pixels/blocks of each connected component.

6. A method for detecting a caption region from video data coded by using a combination of predictive coding and motion compensation, comprising the steps of:

judging whether each pixel/block in the video data is coded by using inter-frame correlation without using motion compensation or not;

detecting a region in the video data at which pixels/blocks judged by the judging step as being coded by using inter-frame correlation without using motion compensation are concentrated time-wise and space-wise, as a caption region;

producing a caption candidate image from one frame image of the video data by assigning a value "1" to each caption region detected by the detecting step while assigning a value "0" to any other regions;

producing a difference image between said one frame image and another frame image of the video data;

extracting difference image portions according to a value of the caption candidate image at each portion of the difference image; and judging an existence of a caption according to the caption candidate image and the difference image portions.

7. The method of claim 6, wherein the extracting step extracts portions of the difference image at which the caption candidate image has a value "1" as the difference image portions.

8. The method of claim 7, wherein the extracting step includes the steps of:

generating a mask which has a value "1" at each region for which the caption candidate image and the difference image portions are to be evaluated in order to judge the existence of the caption, and a value "0" at any other region, from the caption candidate image and the difference image; and extracting portions of the difference image at which the mask has a value "1" as the difference image portions.

9. The method of claim 8, wherein the generating step includes the steps of:

detecting each unchanged pixel/block for which a pixel/block value is unchanged between said one frame image and said another frame image;

detecting each newly appeared caption candidate region in said one frame image; and producing the mask by assigning a value "1" to each region at which at least one of the unchanged pixel/block and the newly appeared caption candidate region exists, and a value "0" to any other region.

10. The method of claim 6, wherein the judging step includes the steps of:

counting a first number of pixels/blocks at which the caption candidate image has a value "1";

counting a second number of pixels/blocks at which the difference image portions have a pixel/block value greater than a prescribed threshold value;

determining the existence of the caption according to the first number of pixels/blocks and the second number of pixels/blocks.

11. The method of claim 10, wherein the determining step determines that the caption exists when an area of a judging region at which the caption candidate image has a value "1" is judged as sufficiently large and a change in said one frame image within the judging region is judged as sufficiently small, according to the first number of pixels/blocks and the second number of pixels/blocks.

12. The method of claim 10, wherein the determining step measures a period of time for which the caption continues to appear according to the first number of pixels/blocks and the second number of pixels/blocks, and determines that the caption exists when the measured period of time is longer than a prescribed period of time.

13. A method for detecting a caption region from video data coded by using a combination of predictive coding and motion compensation, comprising the steps of:

judging whether each pixel/block in the video data is coded by using inter-frame correlation without using motion compensation or not;

detecting a region in the video data at which pixels/blocks judged by the judging step as being coded by using inter-frame correlation without using motion compensation are concentrated time-wise and space-wise, as a caption region;

entering an information on a spatial position range on an image field of a desired caption to be retrieved, as a retrieval key;

selecting a part of the video data corresponding to the desired caption to be retrieved, by comparing each caption region detected by the detecting step and the retrieval key entered by the entering step;

displaying said part of the video data selected by the selecting step; and recording a combination of the video data and an information on a spatial position on an image field of each caption region detected by the detecting step as an index information;

wherein the selecting step selects said part of the video data by comparing the index information and the retrieval key.

14. The method of claim 13, wherein the entering step enters a figure drawn by using an input device which indicates a spatial position range on an image field of the desired caption to be retrieved as the retrieval key.

15. The method of claim 13, wherein the selecting step compares a spatial position on an image field of each caption region detected by the detecting step with a spatial position range on an image field indicated by the retrieval key, and selects each part of the video data at which the spatial position is contained within the spatial position range or the spatial position overlaps with the spatial position range.

16. The method of claim 13, wherein the displaying step displays each frame image of said part of the video data selected by the selecting step along with an indication of the desired caption to be retrieved within each frame image.

17. The method of claim 13, wherein the displaying step displays the video data playbacked starting from a frame corresponding to said part of the video data selected by the selecting step.

18. An apparatus for detecting a caption region from video data coded by using a combination of predictive coding and motion compensation, comprising:

a judgment unit for judging whether each pixel/block in the video data is coded by using inter-frame correlation without using motion compensation or not;

a detection unit for detecting a region in the video data at which pixels/blocks judged by the judgment unit as being coded by using inter-frame correlation without using motion compensation are concentrated time-wise and space-wise, as a caption region;

a caption candidate image production unit for producing a caption candidate image from one frame image of the video data by assigning a value "1" to each caption region detected by the detection unit while assigning a value "0" to any other regions;

a difference image production unit for producing a difference image between said one frame image and another frame image of the video data;

an extraction unit for extracting difference image portions according to a value of the caption candidate image at each portion of the difference image; and a judgment unit for judging an existence of a caption according to the caption candidate image and the difference image portions.

19. An article of manufacture, comprising:

a computer usable medium having computer readable program code means embodied therein for causing a computer to function as a system for detecting a caption region from video data coded by using a combination of predictive coding and motion compensation, the computer readable program means including;

first computer readable program code means for causing the computer to function as a judgement unit for judging whether each pixel/block in the video data is coded by using inter-frame correlation without using motion compensation or not;

second computer readable program code means for causing the computer to function as a detection unit for detecting a region in the video data at which pixels/blocks judged by the first computer readable program code means as being coded by using inter-frame correlation without using motion compensation are concentrated time-wise and space-wise, as a caption region;

third computer readable program code means for causing the computer to function as a caption candidate image production unit for producing a caption candidate image from one frame image of the video data by assigning a value "1" to each caption region detected by the second computer readable program code means while assigning a value "0" to any other regions;

fourth computer readable program code means for causing the computer to function as a difference image production unit for producing a difference image between said one frame image and another frame image of the video data;

fifth computer readable program code means for causing the computer to function as an extraction unit for extracting difference image portions according to a value of the caption candidate image at each portion of the difference image; and sixth computer readable program code means for causing the computer to function as a judgment unit for judging an existence of a caption according to the caption candidate image and the difference image portions.

* * * * *